United States Patent
Nhep et al.

(10) Patent No.: US 10,620,385 B2
(45) Date of Patent: Apr. 14, 2020

(54) FIBER OPTIC CONNECTOR AND ASSEMBLY THEREOF

(71) Applicant: COMMSCOPE TECHNOLOGIES LLC, Hickory, NC (US)

(72) Inventors: Ponharith Nhep, Savage, MN (US); Michael James Ott, Hudson, WI (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/780,150

(22) PCT Filed: Nov. 30, 2016

(86) PCT No.: PCT/US2016/064223
§ 371 (c)(1),
(2) Date: May 30, 2018

(87) PCT Pub. No.: WO2017/095928
PCT Pub. Date: Jun. 8, 2017

(65) Prior Publication Data
US 2018/0348447 A1    Dec. 6, 2018

Related U.S. Application Data

(60) Provisional application No. 62/261,107, filed on Nov. 30, 2015, provisional application No. 62/268,331,
(Continued)

(51) Int. Cl.
*G02B 6/38* (2006.01)
*G02B 6/44* (2006.01)

(52) U.S. Cl.
CPC ......... *G02B 6/3847* (2013.01); *G02B 6/3821* (2013.01); *G02B 6/3851* (2013.01);
(Continued)

(58) Field of Classification Search
None
See application file for complete search history.

(56) References Cited

U.S. PATENT DOCUMENTS

| | | | |
|---|---|---|---|
| 4,691,988 A | 9/1987 | Tremblay et al. | |
| 5,640,476 A | 6/1997 | Womack et al. | |

(Continued)

FOREIGN PATENT DOCUMENTS

| | | |
|---|---|---|
| EP | 2 031 719 B1 | 1/2013 |
| JP | 2008-152266 A | 7/2008 |

(Continued)

OTHER PUBLICATIONS

International Search Report and Written Opinion of the International Searching Authority for International Patent Application No. PCT/US2016/064223 dated Feb. 13, 2017, 18 pages.
(Continued)

*Primary Examiner* — Jerry Rahll
(74) *Attorney, Agent, or Firm* — Merchant & Gould P.C.

(57) ABSTRACT

A factory processed and assembled optical fiber arrangement is configured to pass through tight, tortuous spaces when routed to a demarcation point. A connector housing attaches to the optical fiber arrangement at the demarcation point (or after leaving the tight, tortuous spaces) to form a connectorized end of the optical fiber. A fiber tip is protected before leaving the factory until connection is desired.

20 Claims, 41 Drawing Sheets

Related U.S. Application Data filed on Dec. 16, 2015, provisional application No. 62/412,027, filed on Oct. 24, 2016.

(52) U.S. Cl.
CPC ............ *G02B 6/387* (2013.01); *G02B 6/3831* (2013.01); *G02B 6/3881* (2013.01); *G02B 6/3887* (2013.01); *G02B 6/4466* (2013.01)

(56) References Cited

U.S. PATENT DOCUMENTS

| | | |
|---|---|---|
| 5,863,083 A | 1/1999 | Giebel et al. |
| 6,396,993 B1 | 5/2002 | Giebel et al. |
| 6,672,774 B2 | 1/2004 | Theuerkorn et al. |
| 7,676,132 B1 | 3/2010 | Mandry et al. |
| 8,577,199 B2 | 11/2013 | Pierce et al. |
| 9,229,173 B2 | 1/2016 | Yamauchi et al. |
| 9,285,559 B1 | 3/2016 | Stockton et al. |
| 2009/0148101 A1 | 6/2009 | Lu et al. |
| 2009/0148109 A1 | 6/2009 | Takahashi et al. |
| 2011/0002586 A1 | 1/2011 | Nhep |
| 2012/0170896 A1 | 7/2012 | Skluzacek et al. |
| 2013/0058615 A1 | 3/2013 | Mathew et al. |
| 2013/0094828 A1 | 4/2013 | Loeffelholz et al. |
| 2014/0023326 A1 | 1/2014 | Anderson et al. |
| 2014/0153878 A1 | 6/2014 | Mullaney |

FOREIGN PATENT DOCUMENTS

| | | |
|---|---|---|
| WO | 2017/106507 A1 | 6/2017 |
| WO | 2017/106514 A1 | 6/2017 |

OTHER PUBLICATIONS

Partial Supplementary European Search Report for European Patent Application No. 16871425.1 dated Jul. 9, 2019, 14 pages.
Extended European Search Report for corresponding European Patent Application No. 16871425.1 dated Oct. 10, 2019, 12 pages.

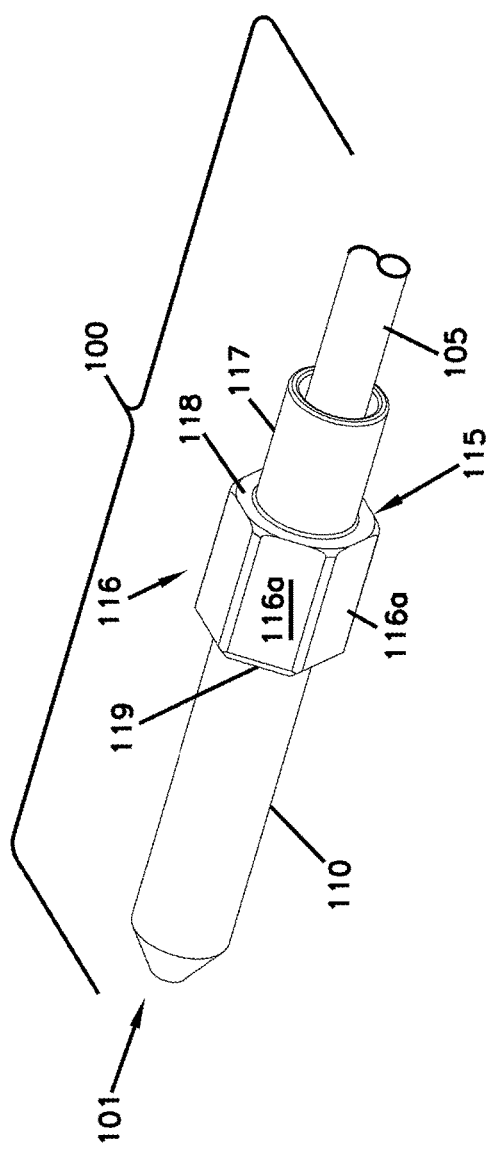
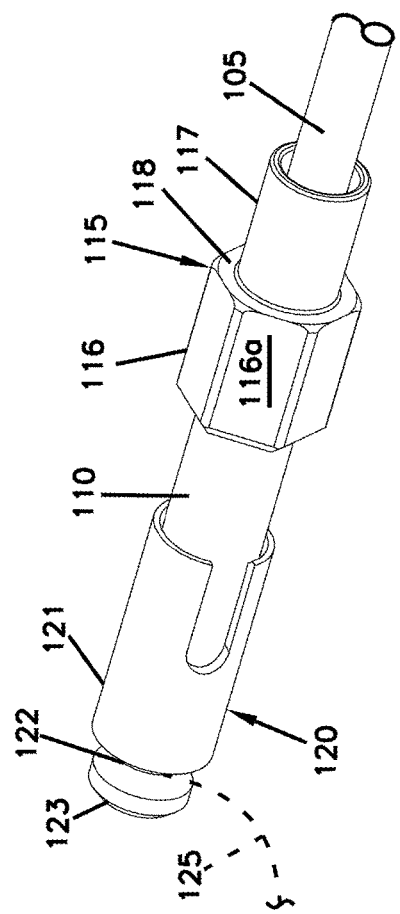

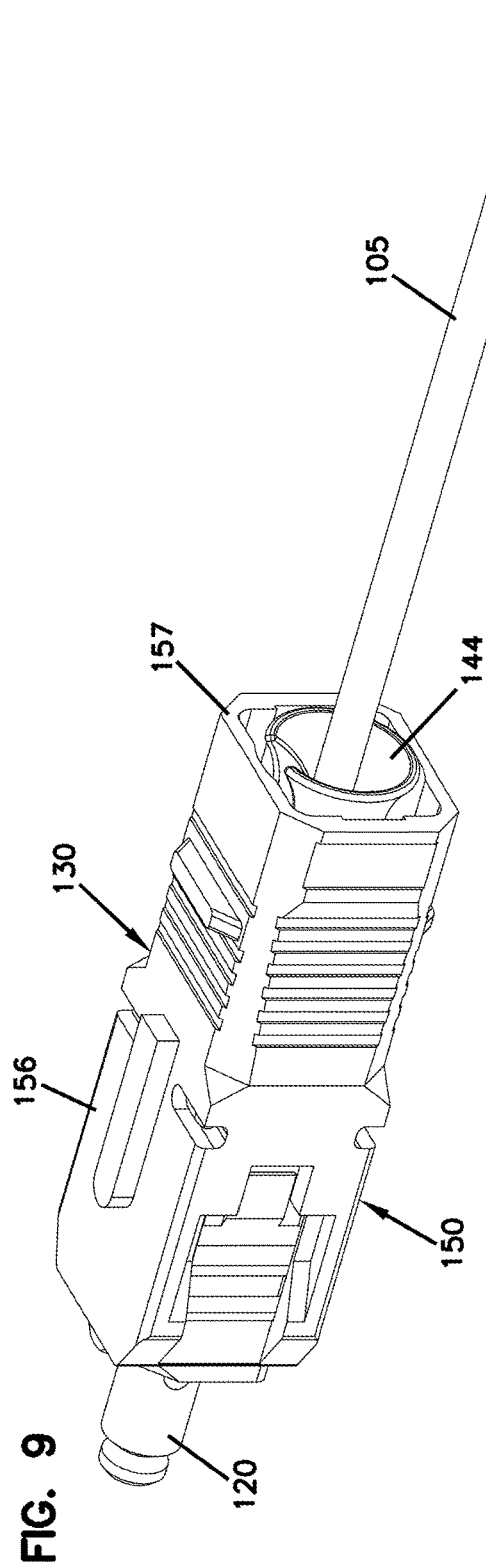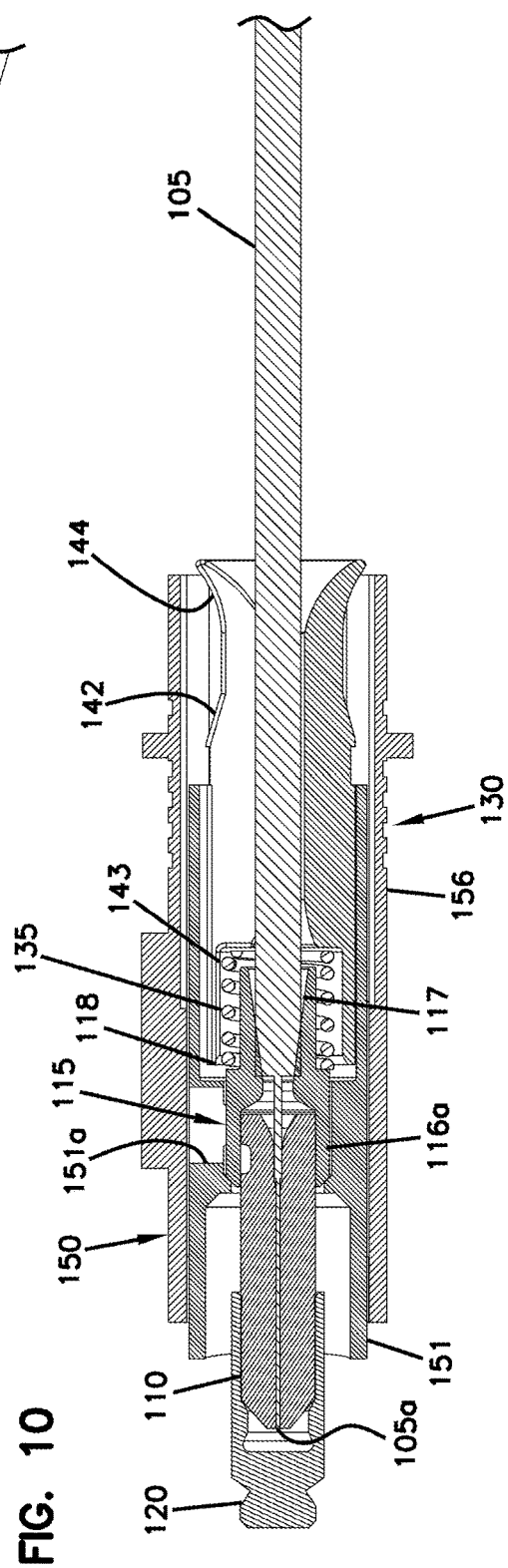

FIBER OPTIC CONNECTOR AND ASSEMBLY THEREOF

CROSS-REFERENCE TO RELATED APPLICATIONS

This application is a National Stage Application of PCT/US2016/064223, filed on 30 Nov. 2016, which claims the benefit of U.S. Patent Application Ser. No. 62/261,107, filed on Nov. 30, 2015, and claims the benefit of U.S. Patent Application Ser. No. 62/268,331, filed on Dec. 16, 2015, and claims the benefit of U.S. Patent Application Ser. No. 62/412,027, filed on Oct. 24, 2016, the disclosures of which are incorporated herein by reference in their entireties. To the extent appropriate, a claim of priority is made to each of the above disclosed applications.

BACKGROUND

As fiber deployments continue, more and more interest is being generated in placing the optical network terminals (ONT) inside the living areas of dwellings (e.g., in proximity to televisions and computers). This is especially true today in multifamily dwelling units (MDU) applications.

Because of the location and other constraints, pre-terminated assemblies are often threaded through small holes in walls of the dwellings, through small openings in cabinetry, and through small ducts. These applications demands that the pre-terminated parts pass through a narrow, tortuous path before being mated to traditional connectors in the ONT equipment. However, such mating performed in the field can result in poorly functioning optical connectors.

Improvements are desired.

SUMMARY

Some aspects of the disclosure are directed to an optical fiber arrangement suitable for passing through tight, tortuous spaces. Other aspects of the disclosure are directed to a connector housing suitable for easily attaching to such an optical fiber arrangement. Still other aspects of the disclosure are directed to methods of cabling a dwelling.

Certain types of fiber optic arrangements can be assembled in a factory. In certain implementations, the fiber optic arrangement includes an optical fiber having a fiber tip that is coupled to an optical ferrule, prepared, and protected at the factory. For example, the fiber tip can be tuned and polished at the factory and a dust cap can be mounted to the optical ferrule to cover and optionally seal the fiber tip.

The fiber optic arrangement is routed to a demarcation point (e.g., an ONT, a wall outlet, etc.) when installed in the field. Certain types of fiber optic arrangements have sufficiently small form factors to fit through narrow, tortuous routing paths (e.g., wall ducts) en route to the demarcation point. In some examples, the fiber optic arrangement can be pulled through the routing path. In other examples, the fiber optic arrangement can be blown through the routing path.

At the demarcation point, the fiber optic arrangement is assembled with an optical connector body to form a connectorized end of the optical fiber. To plug the connectorized end into the ONT, wall outlet, or other connection point in the field, the dust cap is removed to provide access to the fiber tip. In certain examples, the dust cap is not removed until connection is desired. Accordingly, the fiber tip is protected between processing in the factory and connection in the field.

In certain implementations, an optical fiber arrangement has an end terminated in the factory. In certain implementations, the factory terminated end of the optical fiber arrangement has a form factor of less than 4 mm. In certain examples, the factory terminated end of the optical fiber arrangement has a form factor of no more than 3.8 mm. In certain examples, the factory terminated end of the optical fiber arrangement has a form factor of no more than 3.7 mm. In certain examples, the factory terminated end of the optical fiber arrangement has a form factor of no more than 3.6 mm.

In certain implementations, the factory terminated end of the optical fiber arrangement is configured to mate with an optical connector body. In some examples, the factory terminated end of the optical fiber arrangement is configured to mate with the connector body of an SC connector. In other examples, the factory terminated end of the optical fiber arrangement is configured to mate with the connector body of an LC connector. In some examples, the factory terminated end of the optical fiber arrangement is configured to mate with the connector body of an LX.5 connector. In some examples, the factory terminated end of the optical fiber arrangement is configured to mate with the connector body of an ST connector.

Some aspects of the disclosure are directed to a method of connecting an optical fiber of an optical network to a demarcation point in the field. The method includes obtaining a fiber optic arrangement including an optical fiber including an optical fiber having a polished tip held at an optical ferrule; routing the fiber optic arrangement through a duct having a maximum inner diameter of no more than 4 mm; and assembling an optical connector body around the polished tip of the fiber optic arrangement by sandwiching the optical ferrule between a proximal housing and a distal housing of the optical connector to form an assembled optical connector. The optical fiber arrangement has a largest outer diameter of no more than 4 mm.

In certain implementations, the optical fiber arrangement has a largest outer diameter of no more than 3.9 mm. In certain implementations, the optical fiber arrangement has a largest outer diameter of no more than 3.8 mm. In certain implementations, the optical fiber arrangement has a largest outer diameter of no more than 3.7 mm. In certain implementations, the optical fiber arrangement has a largest outer diameter of no more than 3.6 mm.

In certain implementations, the polished tip is tuned relative to a ferrule hub coupled to the optical ferrule.

In certain implementations, the method also includes removing a dust cap from the optical ferrule of the assembled optical connector; and plugging the assembled optical connector into a connection site.

Some aspects of the disclosure related to a kit for assembling a fiber optic connector. The kit includes a fiber optic arrangement; a proximal housing; and a distal housing. The fiber optic arrangement includes an optical cable having an optical fiber terminated at an optical ferrule assembly including a ferrule hub, the ferrule hub carrying a keying member that is rotationally keyed to the hub. The proximal housing has a proximal portion and a distal portion. The distal portion is configured to limit rotation and axial movement of the hub relative to the proximal housing. The distal housing defines a proximal interior portion and a distal interior portion. The proximal interior portion is configured to receive at least part of the distal portion of the proximal housing. The distal housing is configured to latch to the proximal housing so that the distal and proximal housings cooperate to limit axial movement of the hub relative to the distal and proximal housings.

In certain implementations, the optical cable has a jacket terminated at a cable anchor. The optical fiber extends distally beyond the cable anchor. The proximal portion of the proximal housing is configured to couple to the anchor member to limit rotation and axial movement of the anchor member relative to the proximal housing.

In some examples, the anchor member is positioned at the ferrule hub. In other examples, the anchor member is spaced along the optical fiber of the fiber optic arrangement from the ferrule hub.

In some implementations, the fiber optic arrangement includes a spring pre-mounted over the hub at a factory during manufacturing. In other implementations, a spring mounts over the ferrule hub in the field during installation.

In certain implementations, the proximal housing defines a first slot separated from a second slot by an abutment member, wherein the hub is inserted into the distal portion of the proximal housing until a key of the keying member engages the abutment member of the proximal housing. In certain examples, the key of the keying member includes two spaced apart stop members, and wherein the key of the keying member engages the abutment member when one of the stop members passes beyond the abutment into the first slot while the other of the stop members remains in the second slot with the abutment member disposed in between the stop members.

In certain implementations, the distal portion of the proximal housing has a smaller cross-dimension than the proximal portion In certain implementations, the proximal housing defines slots sized to receive tabs of the anchor member.

In certain implementations, the proximal housing includes tabs that latch into slots defined in the distal housing to latch the proximal housing to the distal housing.

In certain examples, the tabs define arrow heads.

In certain implementations, the distal housing defines an interior keyed region that mates with a keyed portion of the hub separate from the keying member.

In certain implementations, interaction between the keyed portion of the hub and the interior keyed region, interaction between the tabs and the slots, and interaction between the key of the keying member and the proximal interior portion of the distal housing restricts insertion of a combination of the fiber optic arrangement and the proximal housing into the distal housing to only one rotational orientation.

In certain implementations, the proximal housing has a frustro-conical shaped proximal end.

In certain implementations, a grip housing that mounts over the distal housing.

Other aspects of the disclosure relate to a method of connecting an optical fiber of an optical network to a demarcation point in the field. The method includes obtaining a fiber optic arrangement including an optical fiber including an optical fiber having a polished tip held at an optical ferrule, the optical fiber arrangement having a largest outer diameter of no more than 4 mm; routing the fiber optic arrangement through a duct having a maximum inner diameter of no more than 4 mm; and assembling an optical connector body around the polished tip of the fiber optic arrangement by sandwiching the optical ferrule between a proximal housing and a distal housing of the optical connector to form an assembled optical connector.

In certain implementations, routing the fiber optic arrangement includes assembling a protective arrangement around the fiber optic arrangement, the protective arrangement including a first housing and second housing that cooperate to enclose the fiber optic arrangement; and pushing the protective arrangement through the duct.

In certain implementations, the polished tip is tuned relative to a ferrule hub coupled to the optical ferrule.

Other aspects of the disclosure relate to an assembled fiber optic connector including a fiber optic arrangement including an optical fiber having a prepared fiber tip held by an optical ferrule arrangement; a proximal housing disposed over the optical fiber, the proximal housing defining an interior spring stop and an exterior catch member; a spring disposed over the optical fiber; and a distal housing having an open rear through which the fiber optic arrangement, spring, and proximal housing can be inserted. The spring has a first end engaging a spring stop defined by the optical ferrule arrangement and a second end engaging the spring stop defined by the proximal housing. The distal housing defines an aperture configured to latchably receive the exterior catch member of the proximal housing.

Other aspects of the disclosure relate to a factory assembled optical fiber arrangement including an optical ferrule extending from a first end to a second end; an optical fiber having a first end defining a fiber tip, a ferrule hub coupled to the second end of the ferrule, and a dust cap mounted to the first end of the optical ferrule to cover the fiber tip. The optical fiber extends through the optical ferrule from the second end to the first end. The fiber tip is accessible from the first end of the optical ferrule. The fiber tip is polished. The fiber tip is tuned relative to the optical ferrule. The ferrule hub has a forward portion and a rearward portion. The forward portion defines flat surfaces around a circumference of the ferrule hub. One of the flat surfaces is marked to indicate a tuning orientation of the optical fiber tip. The forward portion has a largest outer diameter of no more than 4 mm. The dust cap physically contacts the optical ferrule and does not physically contact the ferrule hub. The dust cap has a largest outer diameter that is less than 4 mm, the dust cap being configured to receive a pulling lead.

Other aspects of the disclosure relate to a fiber optic arrangement including an optical cable; an optical ferrule arrangement; a keying member; and a cable anchor. The optical cable has a fiber, a strength layer, and a jacket surrounding the fiber and the strength layer. The jacket is terminated so that a portion of the fiber is exposed. The portion of the fiber has a prepared fiber tip spaced from the terminated jacket. The optical ferrule arrangement holds the prepared fiber tip at a location spaced along the fiber from the terminated jacket. The optical ferrule arrangement also includes a hub. The keying member is installed on the hub in a particular rotational orientation based on a tuning analysis. The keying member includes a key to inhibit rotation of the keying member relative to the hub. The cable anchor is mounted over the cable at the terminated jacket. The cable anchor is spaced along the optical fiber from the optical ferrule arrangement. The cable anchor has a radially extending end wall and an annular wall extending axially from the end wall. The end wall defines an aperture through which the fiber extends, the annular wall extending over the jacket of the optical cable. The annular wall includes a tab defining a shoulder facing away from the optical ferrule arrangement.

Other aspects of the disclosure relate to a fiber optic connector including a distal housing defining a proximal interior portion and a distal interior portion, the proximal interior portion defining a keyed region, the distal housing defining slots with distal open ends; a proximal housing having a proximal portion and a distal portion, the distal portion sized to fit within the proximal interior portion of the distal housing, the proximal housing including tabs that fit within the slots of the distal housing to retain the proximal housing at the distal housing; a ferrule hub disposed within the proximal interior portion of the distal housing and within the distal portion of the proximal housing, the ferrule hub including a first keyed portion, a second portion, and a spring support portion, the first keyed portion mating with the keyed region of the distal housing; a keying member mounted to the second portion of the hub in a rotationally fixed position, the keying member being rotationally fixed relative to the proximal housing, the keying member being engaged with the proximal housing so as to enable limited travel of the keying member relative to the proximal housing; and a spring mounted over the third portion of the hub, the spring abutting an interior spring stop defined by the proximal housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 illustrates a fiber optic arrangement including an optical fiber having a fiber tip held at an optical ferrule, which is coupled to a ferrule hub in accordance with the principles of the present disclosure;

FIG. 4 is a perspective view of the optical fiber arrangement of FIG. 1 with a dust cap mounted over the optical ferrule;

FIG. 9 is a perspective view of the optical connector and optical fiber arrangement of FIG. 8 fully assembled as a connectorized fiber end;

FIG. 10 is an axial cross-section of the connectorized fiber end of FIG. 9;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a fiber optic arrangement that is assembled in a factory. In certain implementations, the fiber optic arrangement includes an optical fiber having a fiber tip that is coupled to an optical ferrule, prepared, and protected at the factory. For example, the fiber tip can be tuned and polished at the factory and a dust cap can be mounted to the optical ferrule to cover and protect the fiber tip. The fiber optic arrangement is routed to a demarcation point (e.g., an ONT, a wall outlet, etc.) when installed in the field. At the demarcation point, the fiber optic arrangement is assembled with an optical connector body to form a connectorized end of the optical fiber. To plug the connectorized end into the ONT, wall outlet, or other connection point, the dust cap is removed to provide access to the fiber tip.

Figure 1:
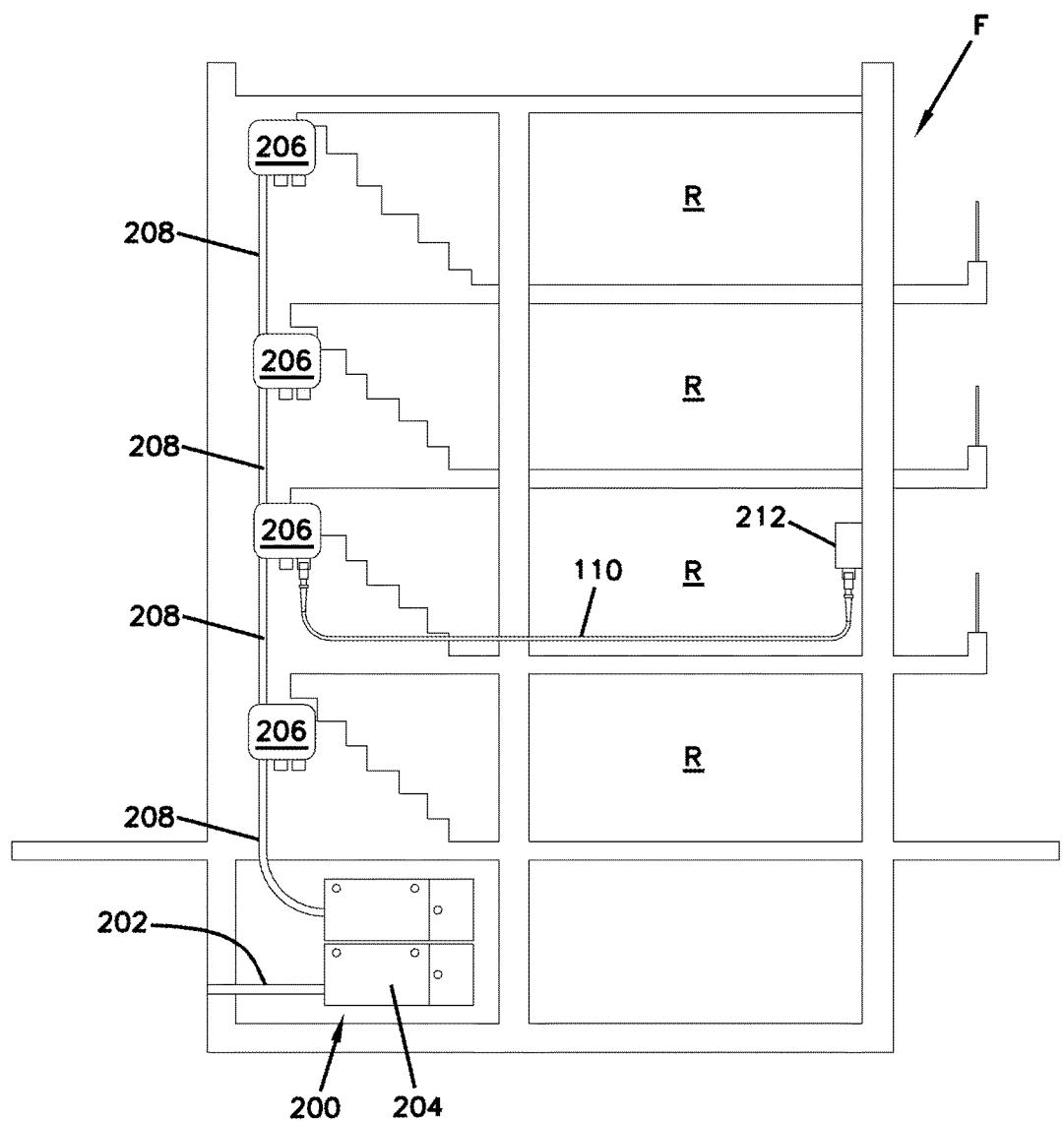
FIG. 1 is a schematic representation of a fiber optic network disposed in a facility.

FIG. 1 is a schematic representation of a fiber optic network 200 disposed in a facility F. In examples, the facility F includes multiple individual residences R (e.g., apartments, condominiums, businesses, etc.). In the example shown, the facility F includes five floors, including a basement, that each have one or more residences R located thereat. In other examples, the facility F can have a greater or lesser number of floors.

The fiber optic network 200 includes a feeder cable 202 from a central office (not shown). The feeder cable 202 enters a feeder cable input location 204 (e.g., a fiber distribution hub, a network interface device, etc.) disposed at the facility F (e.g., in the basement of the facility). The fiber distribution hub 204 has one or more optical splitters (e.g., 1-to-8 splitters, 1-to-16 splitters, or 1-to-32 splitters) that generate a number of individual fibers.

At least one fiber optic enclosure 206 is mounted at each floor of the facility F. In the example shown, a fiber optic enclosure 206 is mounted at each floor above the basement. The individual fibers generated by the optical splitters are routed to the fiber optic enclosures 206 via one or more riser cables 208. Examples of fiber optic enclosures 206 suitable for use in the fiber optic network 200 can be found in U.S. Publication No. 2013/0094828, the disclosure of which is hereby incorporated herein by reference in its entirety.

Subscriber cables 210 are routed from the fiber optic enclosures 206 to respective residences R. The subscriber cable 210 includes an optical fiber disposed in a jacket or protective tubing. For example, the subscriber cable 210 can include any of the fiber optic arrangements 100, 300 that will be described herein. In some implementations, the subscriber cable 210 is routed to a transition box at the respective residence R. In other examples, the subscriber cable 210 is routed through the walls of the residence R (e.g., within ducts) towards a wall outlet 212. For example, the fiber optic arrangement 100 can be routed through the walls of the residence R towards the wall outlet 212, ONT, or other demarcation point.

Figure 2:
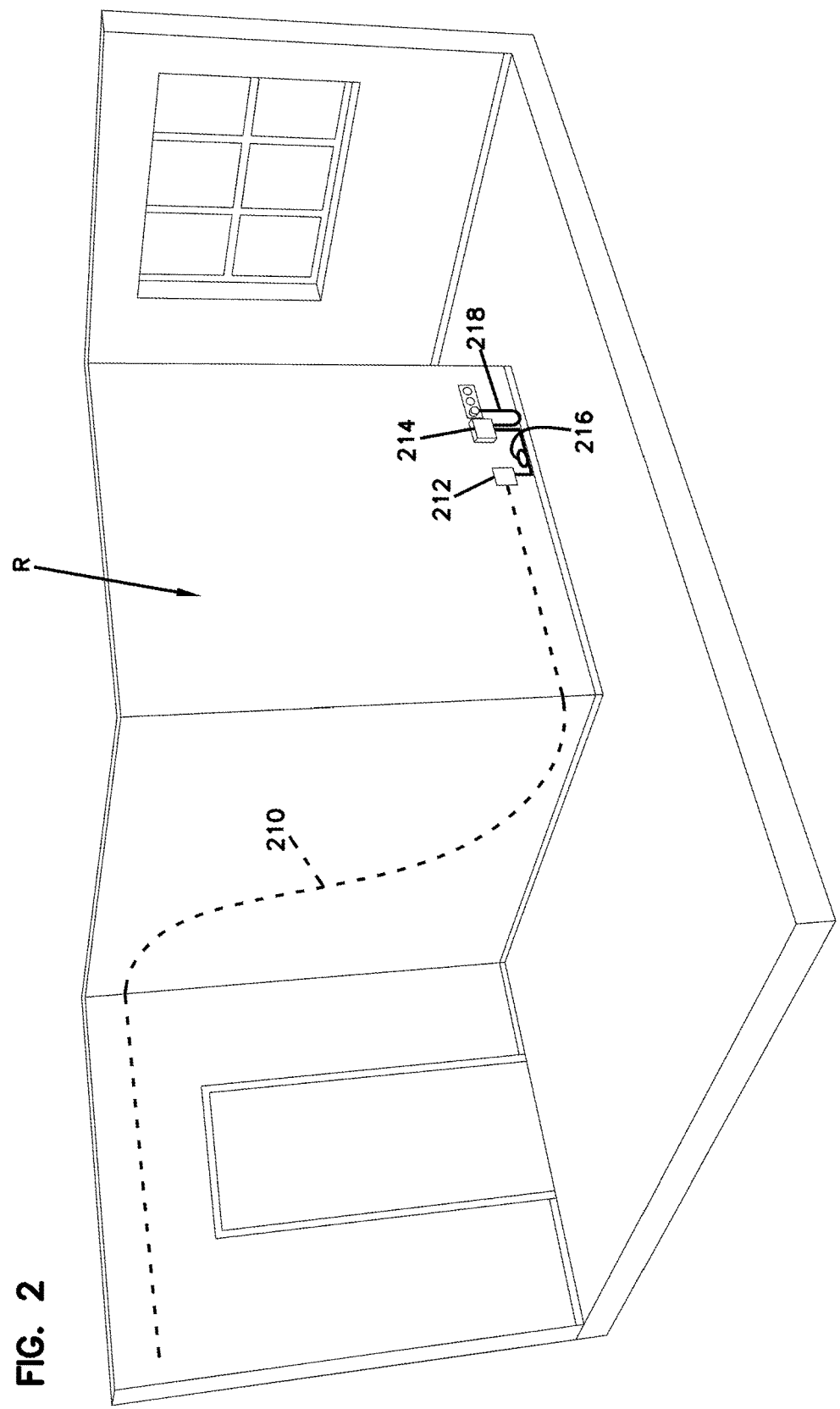
FIG. 2 is a schematic representation of an example residence R including walls and a floor defining a room in the facility of FIG. 1.

FIG. 2 is a schematic representation of an example residence R including walls and a floor defining a room. A wall box 212 is disposed at a desirable location within the residence R for optical and/or optoelectronic equipment. In some implementations, the subscriber cable 210 extends through ducts in the wall and enters the residence R behind the wall outlet 212. The subscriber cable 210 can have a partially terminated end as described above that is fully connectorized with an optical connector body in the field and plugged into a port at the wall outlet 212. Partially terminated ends can be advantageously routed through small ducts to facilitate passage through walls of the residence R. The partially terminated end can be quickly installed in the field without tools, such as an optical fusion splicer.

The wall box 212 serves as a demarcation point within the residence R for the optical service provider. The subscriber cable 210 is optically coupled to an optical connector at the wall outlet 212. Accordingly, optical signals carried by the subscriber cable 210 are available at the optical connector.

A user can choose to connect an optical network terminal (ONT) 214 or other equipment to the connector of the wall outlet 212 to connect the ONT 214 or other equipment to the fiber optic network 200. For example, a jumper cable 216 can extend between the ONT 214 and the wall outlet 212. The ONT 214 also can have a power cord 218 that plugs into an electrical outlet to provide power to the ONT 214.

Figure 19:
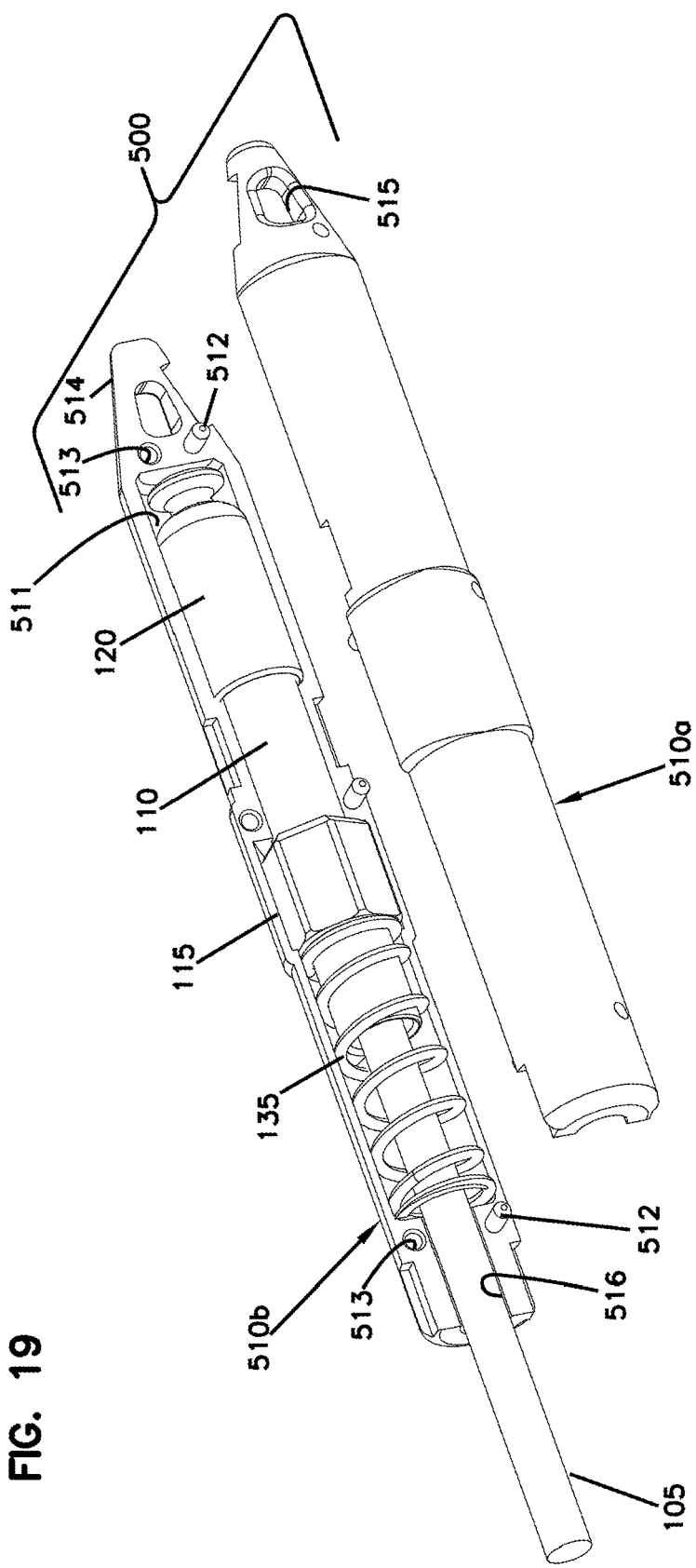
FIG. 19 is a perspective view of an example protective arrangement suitable for use in covering the fiber optic arrangement of FIG. 3 or 12 during installation.

FIG. 19 illustrates an example protective arrangement 500 that can be mounted around any of the fiber optic arrangements 100, 300 disclosed herein. For ease in viewing, FIG. 19 shows the protective arrangement 500 disposed about the fiber optic arrangement 100. It will be understood, however, that the protective arrangement 500 can be used with the fiber optic arrangement 300. The protective arrangement 500 can then be pulled or pushed through the duct. In certain implementations, the protective arrangement 500 includes a first housing piece 510a and a second housing piece 510b that cooperate to enclose the fiber optic arrangement 100.

Each housing piece 510a, 510b defines a cavity 511 sized and shaped to accommodate the components of the fiber optic arrangement 100. For example, the cavity 511 may be sized and shaped to accommodate the ferrule 110, dust cap 120, and ferrule hub 115 after termination of the optical fiber. In certain examples, the cavity 511 is sized and shaped to accommodate the keying member 360 of FIGS. 11-18. In certain examples, the cavity 511 is sized and shaped to accommodate the spring 135, 335 of FIGS. 7 and 11. In certain examples, the cavity 511 is sized and shaped to accommodate the cable anchor 470 of FIG. 15. In certain implementations, the protective arrangement 500 is assembled about the fiber optic arrangement 100 in the factory after termination of the optical fiber 105 at the ferrule 110 and before shipping of the fiber optic arrangement 100 to an installation site.

In certain implementations, the housing pieces 510a, 510b define alignment keys that aid in mating the housing pieces 510a, 510b. In the example shown, the alignment keys include pegs 512 and holes 513. In other implementations, other types of alignment keys can be used. In certain implementations, the forward end of the protective arrangement 500 defines a tapered nose 514 to aid in navigation through ducts. In certain implementations, the tapered nose 514 defines an aperture 515. A pulling string could be inserted through the aperture to attach the pulling string to the protective arrangement 500, thereby allowing the protective arrangement 500 to be pulled through the housing. Alternatively, the protective arrangement 500 could be pushed through the housing using a stiffening member.

Examples of various pushing techniques for use with the protective arrangement 500 are shown in U.S. Application No. 62/268,379, filed Dec. 16, 2015, and titled "Arrangements for Pushing and Pulling Cables; and Methods," the disclosure of which is incorporated herein by reference in its entirety.

FIG. 3 illustrates an example fiber optic arrangement 100 including an optical fiber 105, a ferrule 110, and a ferrule hub 115. The fiber optic arrangement 100 has a largest outer diameter of no more than 4 mm. In certain implementations, the fiber optic arrangement 100 has a largest outer diameter of no more than 3.8 mm. In certain implementations, the fiber optic arrangement 100 has a largest outer diameter of no more than 3.7 mm. In certain implementations, the fiber optic arrangement 100 has a largest outer diameter of no more than 3.6 mm. In certain implementations, the fiber optic arrangement 100 has a largest outer diameter of no more than 3.5 mm.

A first end 101 of the optical fiber 105 is terminated at the ferrule 110 in a fiber processing procedure. For example, the first end 101 of the optical fiber 105 can be inserted into the ferrule 110 from a rear of the ferrule 110 so that a fiber tip is accessible from a front end of the ferrule 110. The first end 101 of the optical fiber 105 can be secured to the ferrule. For example, epoxy can be inserted into the ferrule from the rear to coat a bare portion of the fiber (i.e., a portion from which the coating has been stripped). In certain examples, the epoxy also can coat strength members (e.g., aramid yarns) forming part of the optical fiber 105. The epoxy is cured to secure the fiber 105 to the ferrule 110. The secured fiber tip can be tuned (e.g., a marking can be made to the ferrule 110 or ferrule hub 115 to indicate a tuning direction). The secured fiber tip can be polished.

A ferrule hub 115 can be disposed on the fiber optic arrangement 100 to surround the rear of the ferrule 110 and a portion of the fiber 105 extending out of the rear of the ferrule 110. In certain implementations, the ferrule hub 115 defines the largest outer diameter of any part of the fiber optic arrangement 100. In certain implementations, the ferrule hub 115 includes a forward section 116 and a rearward section 117. The forward section 116 surrounds the rear of the ferrule 110. The rearward section 117 surrounds the optical fiber 105.

In certain implementations, the forward section 116 has a larger outer diameter than the rearward section 117. In certain examples, a radial step 118 transitions the forward section 116 to the rearward section 117. In certain examples, the forward section 116 has a leading taper 119 facing forwardly. In certain implementations, the forward section 116 defines the largest outer diameter of the ferrule hub 115. In certain implementations, the outer diameter of the forward section 116 is no more than 3.8 mm. In certain implementations, the outer diameter of the forward section 116 is no more than 3.7 mm. In certain implementations, the outer diameter of the forward section 116 is no more than 3.6 mm. In certain implementations, the outer diameter of the forward section 116 is no more than 3.5 mm.

In certain implementations, the forward section 116 of the ferrule hub 110 defines one or more flat surfaces 116a. In certain implementations, the forward section 116 defines at least two flat surfaces 116a. In the example shown, the forward section 116 defines six flat surfaces 116a. In certain examples, the flat surfaces 116a are configured to be marked to indicate a tuning orientation of the optical fiber arrangement 100. For example, a mark can be made on the flat surface 116a to indicate a tuning direction. In certain implementations, the outer diameter of the forward section measured at the flat surfaces 116a is no more than 3.5 mm. In certain implementations, the outer diameter of the forward section measured at the flat surfaces 116a is no more than 3.4 mm. In certain implementations, the outer diameter of the forward section measured at the flat surfaces 116a is no more than 3.3 mm.

As shown in FIG. 4, in certain implementations, the optical fiber tip and ferrule 110 are cleaned and a dust cap 120 is disposed over the front of the ferrule 110 to cover the fiber tip. In an example, the dust cap 120 is friction fit to the ferrule 110 in an axially fixed position until a predetermine amount of axial force is applied to the dust cap 120. In certain implementations, the fiber processing procedure, from insertion of the fiber into the ferrule to mounting the dust cap, occurs in a factory. The dust cap 120 maintains the cleanliness of the fiber tip during shipping and installation. The dust cap 120 includes a main body 121 covering at least the front of the ferrule 110. A necked down portion 122 of the main body 121 steps or tapers radially inwardly to define an annular groove. A front portion 123 of the main body 121 steps or tapers radially outwardly to define a pulling stop 123. In other implementations, the front of the dust cap 120 can define a hook or loop.

The fiber optic arrangement 100 can be coiled, boxed, or otherwise stored or packaged until installation is desired. To install the fiber optic arrangement 100 (e.g., at a dwelling), a pulling lead 125 can be secured to the dust cap 120. In the example shown, the pulling lead 125 can be wrapped around and secured at the groove defined at the necked down portion 122 of the dust cap. Pulling on the pulling lead 125 causes the pulling lead 125 to abut the pulling stop 123, thereby pulling the fiber optic arrangement 100. Accordingly, the pulling lead 125 can be utilized to pull the fiber optic arrangement 100 through a hole, duct, or other path.

In certain implementations, the hole, duct, or other path through which the fiber optic arrangement 100 is pulled has a maximum internal diameter of no more than 4 mm. In certain implementations, the hole, duct, or other path through which the fiber optic arrangement 100 is pulled has a maximum internal diameter of no more than 4.1 mm. In certain implementations, the hole, duct, or other path through which the fiber optic arrangement 100 is pulled has a maximum internal diameter of no more than 4.2 mm. In certain implementations, the hole, duct, or other path through which the fiber optic arrangement 100 is pulled has a maximum internal diameter of no more than 3.9 mm. In certain implementations, the hole, duct, or other path through which the fiber optic arrangement 100 is pulled has a maximum internal diameter of no more than 3.8 mm. In certain implementations, the hole, duct, or other path through which the fiber optic arrangement 100 is pulled has a maximum internal diameter of no more than 3.7 mm. In certain implementations, the hole, duct, or other path through which the fiber optic arrangement 100 is pulled has a maximum internal diameter of no more than 4.3 mm. In certain implementations, the hole, duct, or other path through which the fiber optic arrangement 100 is pulled has a maximum internal diameter of no more than 4.4 mm. In certain implementations, the hole, duct, or other path through which the fiber optic arrangement 100 is pulled has a maximum internal diameter of no more than 4.5 mm.

After exiting the hole, duct, or other pathway, the first end 101 of the fiber optic arrangement 100 is connectorized by inserting the first end 101 into an optical connector 130. Accordingly, the first end 101 of the fiber optic arrangement 100 can be optically coupled to another fiber optic connector at a connection site. In the example shown, the first end 101 of the fiber optic arrangement 100 is connectorized with an SC connector. In other implementations, however, the first end 101 of the fiber optic arrangement 100 can be connectorized with an LC connector, an ST connector, an FC connector, an LX.5 connector, or any other desired connector.

Figure 5:
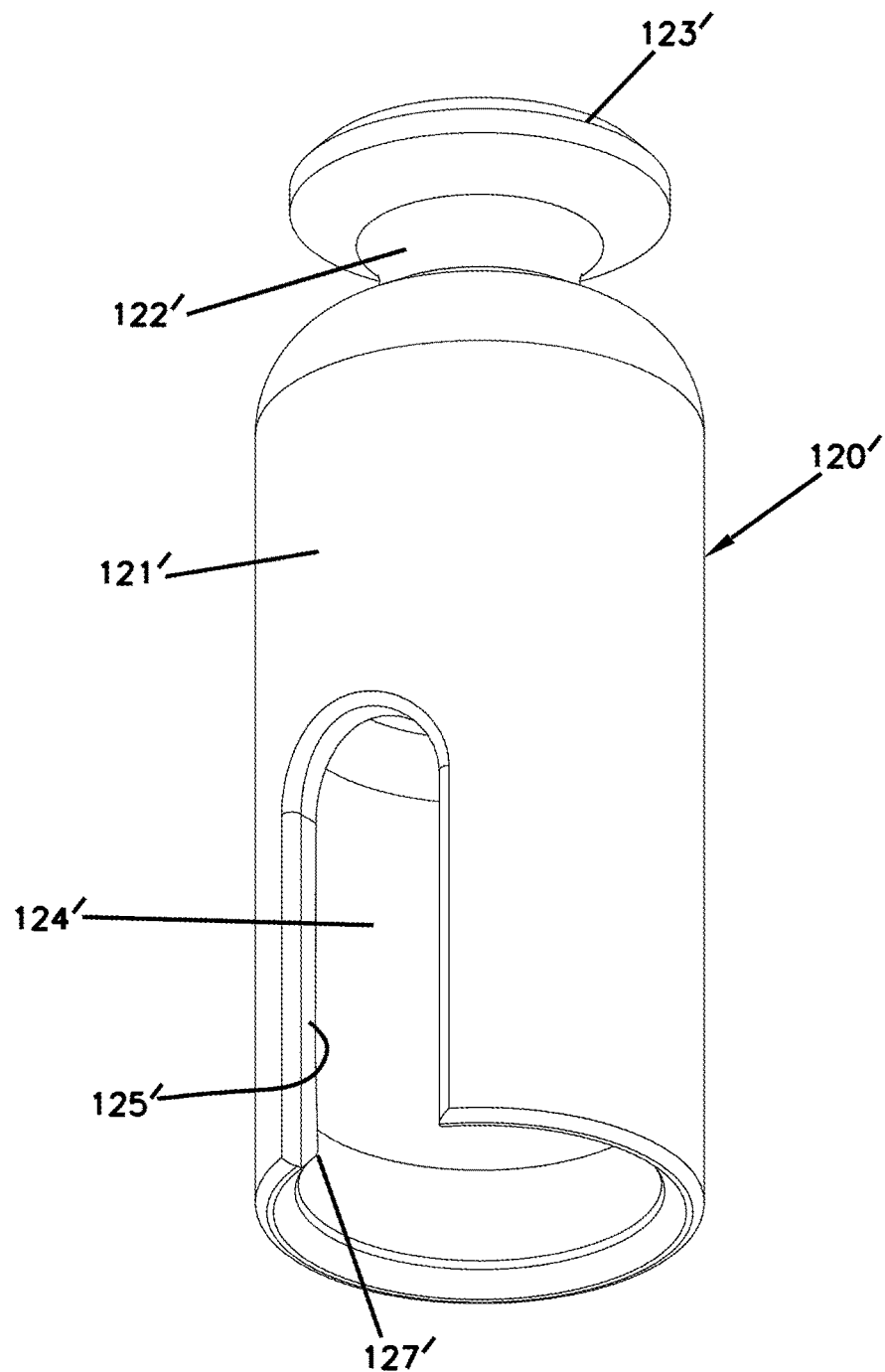
FIGS. 5 and 6 illustrate another example dust cap suitable for use to cover the optical fiber tip of the fiber optic arrangement.
Figure 6:
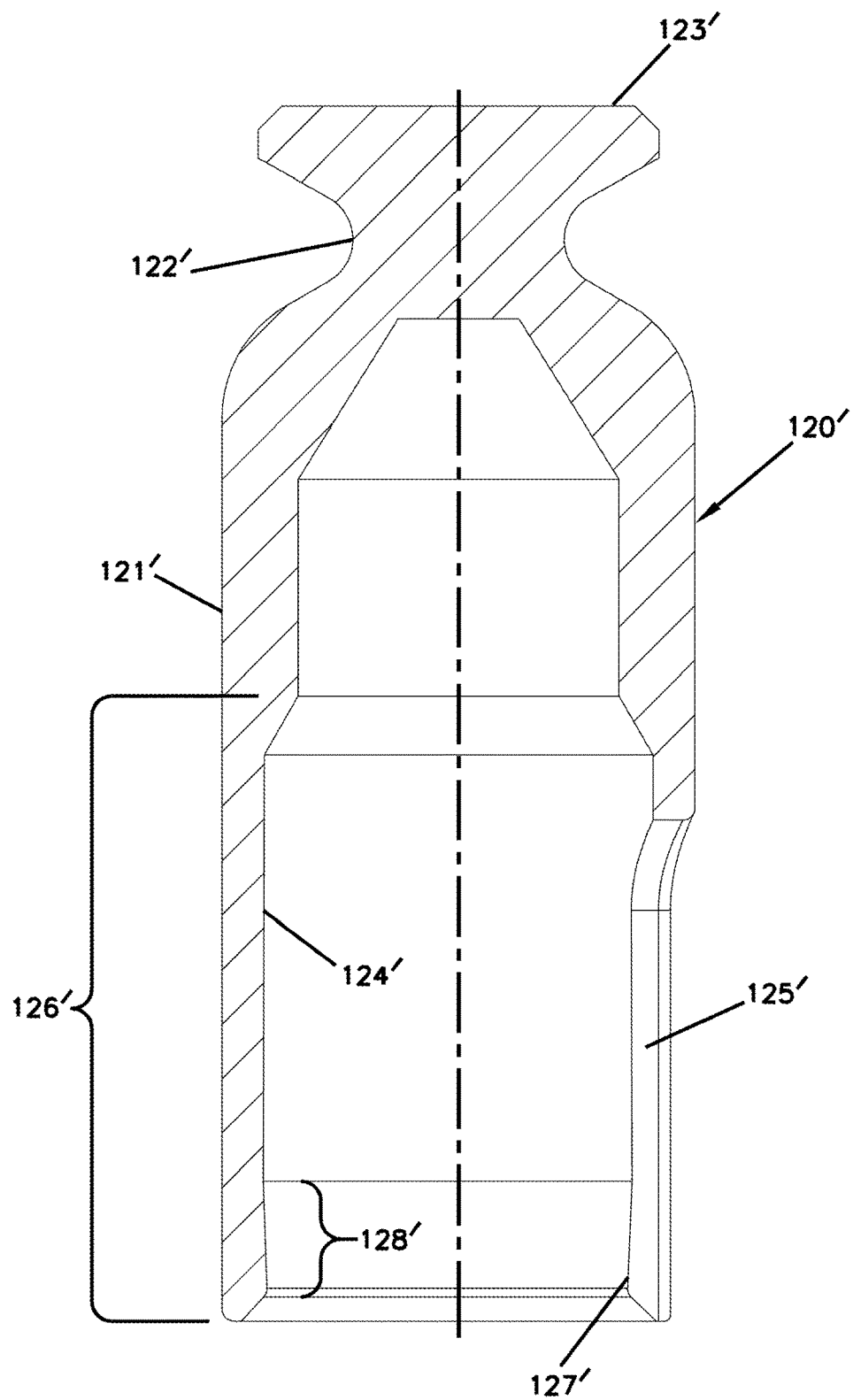

FIGS. 5 and 6 illustrate another example dust cap 120' suitable for use to cover the optical fiber tip of the fiber optic arrangement 100. The dust cap 120' is configured to be friction fit to the ferrule 110 in an axially fixed position until a predetermined amount of axial force is applied to the dust cap 120'. In certain implementations, the fiber processing procedure, from insertion of the fiber into the ferrule to mounting the dust cap, occurs in a factory. The dust cap 120' maintains the cleanliness of the fiber tip during shipping and installation.

The dust cap 120' includes a main body 121' covering at least the front of the ferrule 110. A necked down portion 122' of the main body 121' steps or tapers radially inwardly to define an annular groove. A pulling lead 125 (e.g., see FIG. 4) can be wrapped around and secured at the groove defined at the necked down portion 122' of the dust cap 120'. A front portion 123' of the main body 121' steps or tapers radially outwardly to define a pulling stop 123'. In other implementations, the front of the dust cap 120' can define a hook or loop.

An open end of the main body 121' leads to an interior of the dust cap 120'. A portion 126' of the interior is configured to receive the ferrule 110. In certain implementations, at least a portion of an interior surface 124' of the ferrule-receiving portion 126' extends radially inwardly. For example, the interior surface 124' may extend sufficiently inwards so that a smallest interior dimension (e.g., inner diameter) of the ferrule-receiving portion 126' is less than an outer dimension (e.g., outer diameter) of the ferrule.

In some examples, the portion 128' of the interior surface 124' may taper radially inwardly as the interior surface 124' extends towards the open end of the main body 121'. In other examples, the portion 128' may define a bump, hook, or other such shape. In certain examples, the portion 128' of the interior surface 124' extends over less than a majority of a length of the ferrule-receiving portion 126'. In examples, the portion 128' of the interior surface 124' extends over no more than a third of the ferrule-receiving portion 126'. In examples, the portion 128' of the interior surface 124' extends over no more than a fourth of the ferrule-receiving portion 126'.

An axial notch 125' extends from the open end of the main body 121' to an intermediate location along the length of the main body 121'. In certain examples, the axial notch 125' extends along at least a majority of the length of the ferrule-receiving portion 126' of the main body 121'. The notch 125' allows the main body 121' to flex radially outwardly at the open end sufficient to enable passage of the ferrule 110 past the radially inwardly extending portion 128' and into the interior of the dust cap 120'. The resilient main body 121' applies a radially inwardly directed spring force to the ferrule 110. This spring force helps to maintain the ferrule 110 within the interior of the dust cap 120' despite axial pull on the dust cap 120' relative to the ferrule 110 during installation. The notch 125' is sized so that the spring force can be overcome without the use of tools when removing the dust cap 120' from the ferrule 110 when connection is desired.

Figure 7:
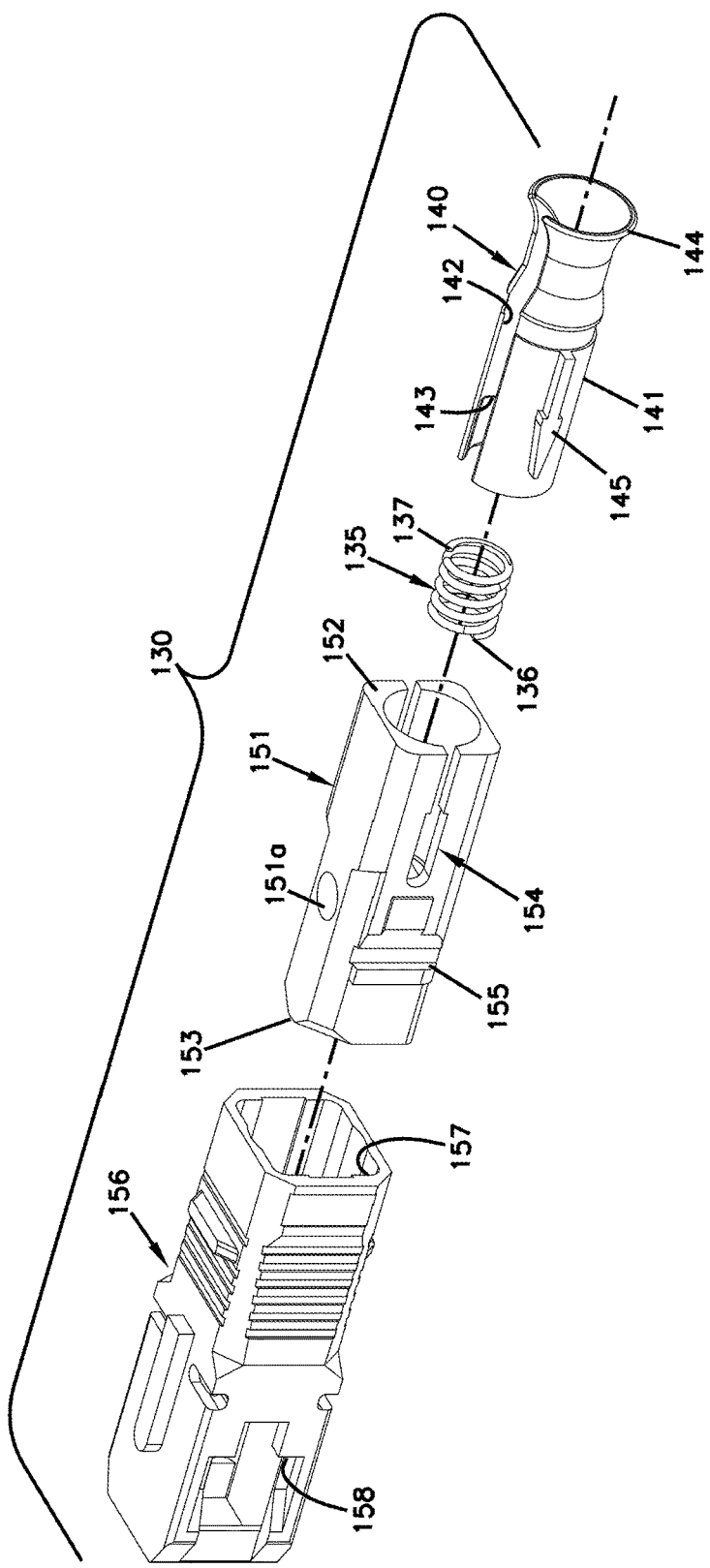
FIG. 7 is a perspective view of an example optical connector with the components axially exploded away from each other for ease in viewing.

FIG. 7 illustrates one example of a fiber optic connector 130. In some implementations, the fiber optic connector 130 includes a distal housing 150, a spring 135, and a proximal housing 140. When the connector 130 is assembled, the first end 101 of the fiber optic arrangement 100 and the spring 135 are sandwiched between the proximal housing 140 and the distal housing 150. For example, the forward section 116 of the ferule hub 115 abuts an interior stop defined by the distal housing 150 (e.g., see FIG. 10). A first axial end 136 of the spring 135 abuts the radial step 118 of the ferrule hub 115 of the fiber optic arrangement 100 and a second axial end 137 of the spring 135 abuts a spring stop 143 within the rear housing 140 (FIG. 10). Accordingly, the spring 135 biases the ferrule 110 and fiber tip forwardly relative to the distal housing 150 while allowing for limited rearward axial movement of the ferrule 110 and fiber tip relative to the distal housing 150.

Figure 8:
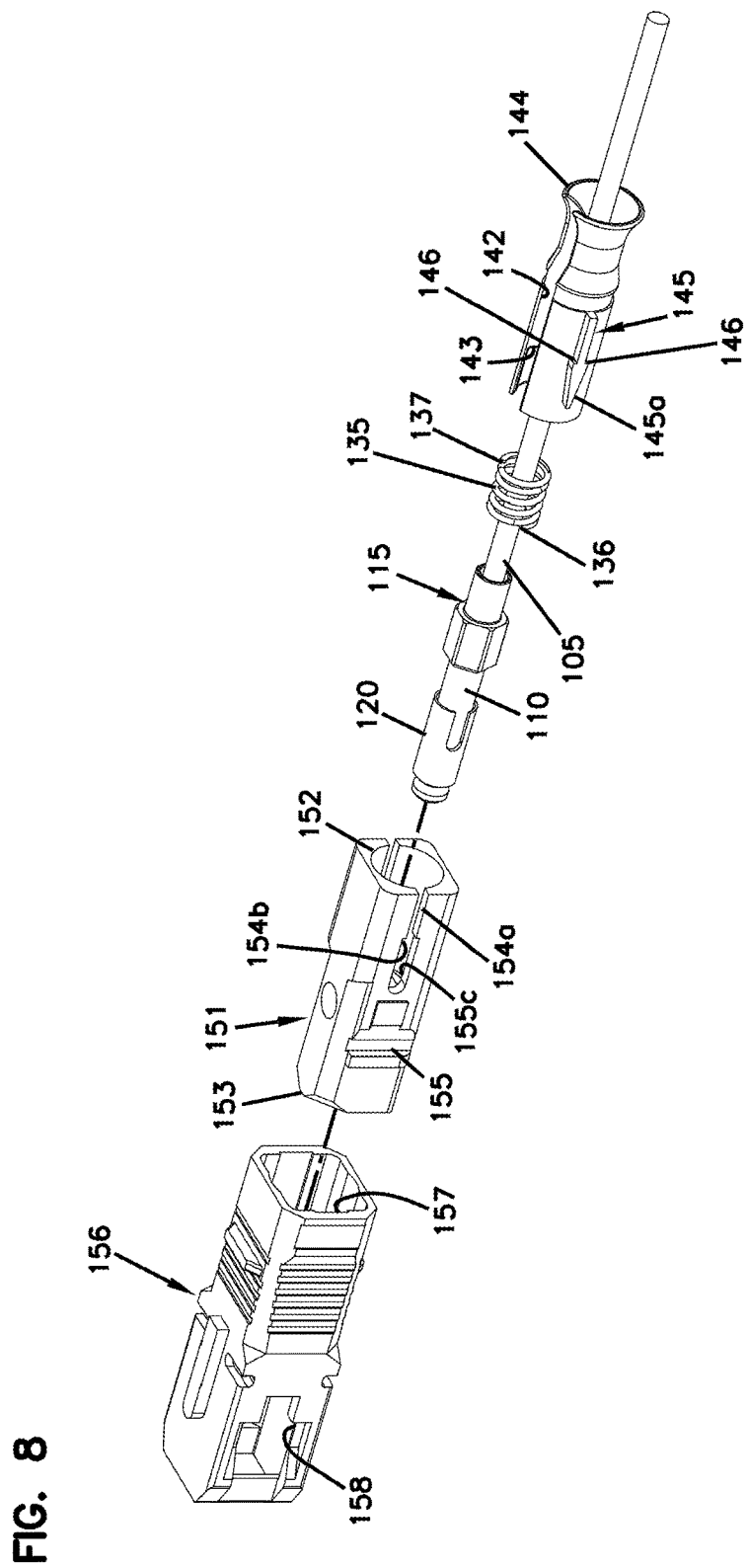
FIG. 8 illustrates the optical connector of FIG. 7 partially assembled over the optical fiber arrangement of FIG. 3.

As shown in FIG. 8, the proximal housing 140 and spring 135 are configured to be mounted to the optical fiber 105 when the first end 101 of the fiber optic arrangement 100 has been routed to the demarcation point (e.g., a site at which the optical fiber is to be connected in the field). For example, the spring 135 may be a coil spring. In such an example, the optical fiber 105 may be laterally inserted between two adjacent coils of the spring 135. The spring 135 can then be rotated by a user so that the optical fiber 105 threads down between the coils until the optical fiber 105 reaches one end of the spring 135. The user then reverses the rotation direction of the spring 135 relative to the optical fiber 105 to thread the spring 135 onto the optical fiber 105 until the optical fiber 105 extends axially through the coils of the spring 135 (see FIG. 8).

The proximal housing 140 includes a body 141 defining an axial slot 142 extending from a front of the body 141 to a rear of the body 141. Accordingly, the proximal housing 140 is mounted to the optical fiber 105 by sliding the optical fiber 105 through the axial slot 142. In certain implementations, the body 141 is resilient and the slot 142 is sized so that the optical fiber 105 pushes edges of the body 141 outwardly to enlarge the slot 142 as the fiber 105 passes through the slot 142. Accordingly, the proximal housing 140 inhibits removal of the fiber 105 after snapping over the fiber 105.

The proximal housing 140 defines a frustro-conical tail 144 that accommodates lateral pulling and bending of the optical fiber 105 as the fiber 105 exits the proximal housing 140. In some implementations, the rear of the proximal housing 140 is configured to mitigate the need for a separate strain-relief boot at the rear of the fiber optic connector 130. For example, the frustro-conical tail 144 may obviate the need for a separate strain-relief boot. Accordingly, the example fiber optic connector 130 shown in FIGS. 9 and 10 does not include a separate strain-relief boot.

The proximal housing 140 also includes one or more catch members 145 configured to mate with receiving members of the distal housing 150. In certain implementations, the proximal housing 140 includes two catch members 145 positioned on opposite sides of the proximal housing 140. In certain implementations, the catch members 145 of the proximal housing 140 are elongated between the front and rear of the proximal housing 140. In certain implementations, the catch members 145 define catch surfaces 146. In certain examples, the catch members 145 define rearwardly facing catch surfaces 146. In an example, each catch member 145 is shaped as an arrow having a forwardly pointing arrowhead. Accordingly, the catch members 145 may facilitate alignment of the proximal housing 140 with the distal housing 150.

The distal housing 150 defines an interior accessible from a rearward end 152. The first end 101 of the fiber optic arrangement 100, the spring 135, and at least a forward portion of the proximal housing 140 are inserted into the interior through the rearward end 152. The distal housing 150 also defines catch apertures 154 configured to align with the catch members 145 of the proximal housing 140. In certain examples, the catch apertures 154 are elongated between the front and rear of the distal housing 150. Each catch aperture 154 defines catch surfaces 154b configured to engage the catch surfaces 146 of the catch members 145 of the proximal housing 140 when the proximal housing 140 is axially secured to the distal housing 150. In certain examples, each catch aperture 154 defines a narrow path 154a leading to a larger opening 154c. The catch surfaces 154b are defined at the transition between the narrow path 154a and the larger opening 154c.

During assembly of the connector 130, the proximal housing 140 is inserted into the distal housing 150 so that the arrowhead of the catch members 145 passes through the narrow path 154a. When the arrowhead reaches the larger opening 154c, the catch surfaces 146 of the catch members 145 engage the catch surfaces 154b of the catch apertures 154, thereby restraining rearward axial movement of the proximal housing 140 relative to the distal housing 150. Accordingly, the proximal housing 140 restrain rearward axial movement of the spring 135 and fiber optic arrangement 100 relative to the distal housing 150.

In some implementations, the distal housing 150 includes multiple housing pieces movable relative to each other. In the example shown, the distal housing 150 defines an SC plug housing including an inner body 151 and an outer body 156. The inner body 151 defines the rear opening 152 through which the first end 101 of the fiber optic arrangement 100, spring 135, and proximal housing 140 pass. The inner body 151 defines an aperture 151a through which a tuning mark on the ferrule hub 115 is visible. For example, a marking on the flat 116a on the forward portion 116 of the hub 115 is visible to a user through the aperture 151a when the fiber optic arrangement 100 is installed in the inner housing 151 in the correct rotational orientation.

The inner body 151 also defines the catch apertures 154. The inner body 151 also defines the interior stop that the forward end 116 of the hub 115 abuts. In certain implementations, a forward end 153 of the inner housing is inserted into the outer housing 156 through a rear end 157 of the outer housing 156. In certain implementations, wings 155 of the inner housing 151 latch into apertures 158 defined by the outer housing 156 (e.g., see FIG. 9). In other implementations, the inner housing 151 otherwise axially and rotationally secures to the outer housing 156. In other implementations, the distal housing 150 is integrally formed or formed from parts that are axially and rotationally fixed relative to each other.

In certain examples, the assembled optical connector 130 does not include a strain-relief boot. In certain examples, the assembled optical connector 130 does not include a crimp sleeve.

Figure 11:
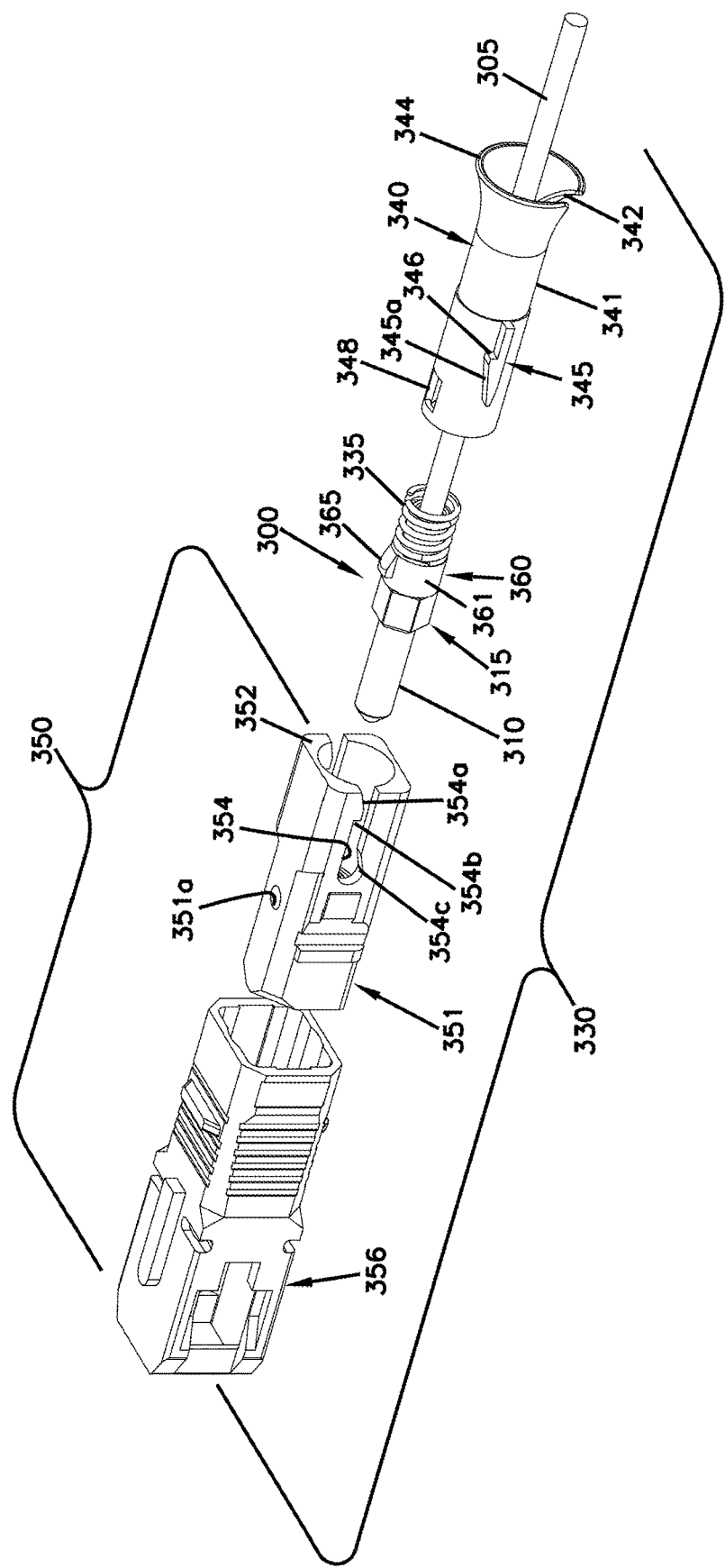
FIG. 11 is a perspective view of another example optical connector with the components axially exploded away from each other for ease in viewing.
Figure 12:
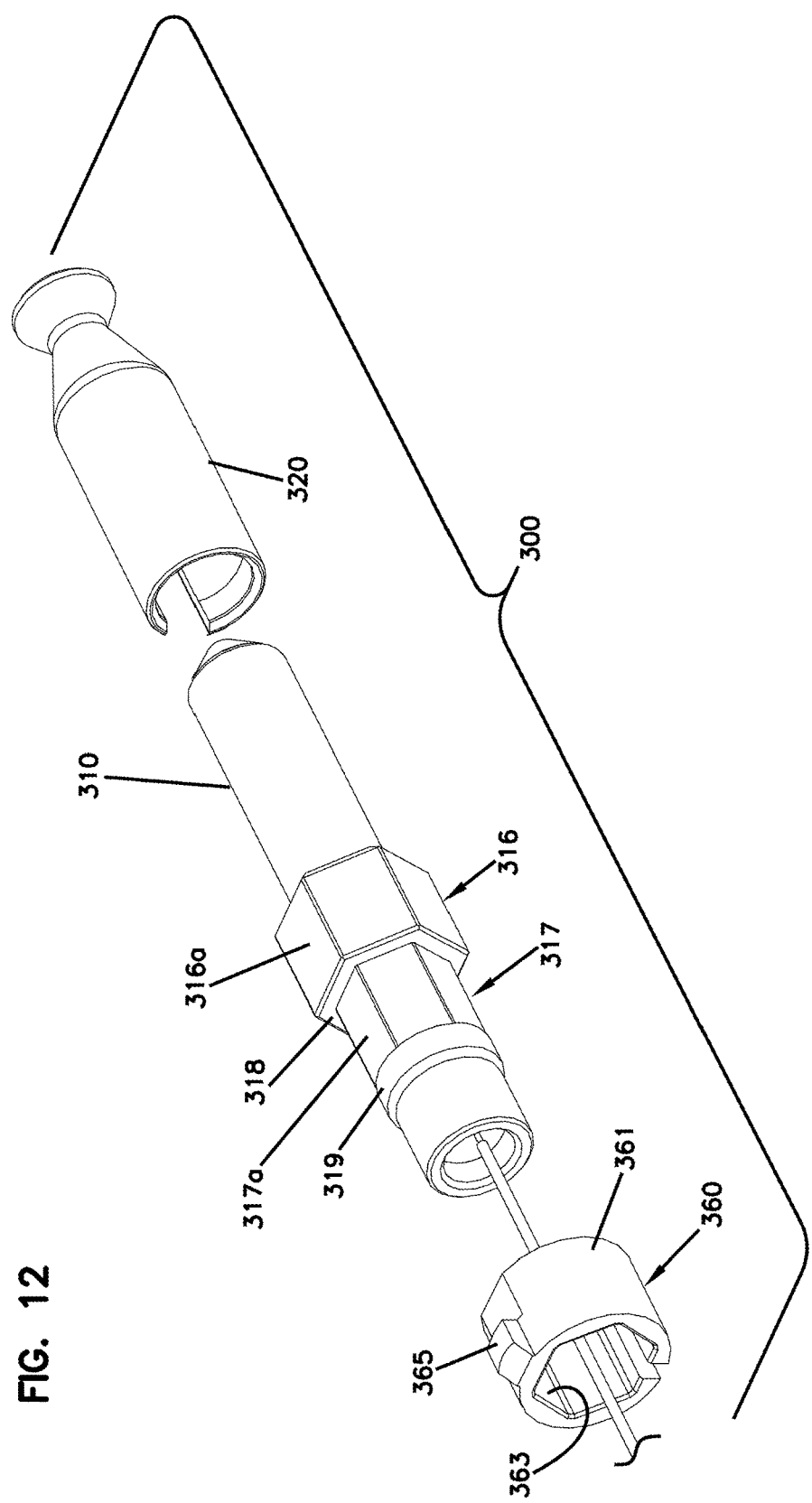
FIG. 12 is a perspective view of an example fiber optic arrangement that is connectorized in FIG. 11.

FIGS. 11-14 illustrate another example of a fiber optic connector 330 assembled about another example fiber optic arrangement 300. In some implementations, the fiber optic connector 330 includes a distal housing 350, a spring 335, and a proximal housing 340 (FIG. 11). When the connector 330 is assembled, the fiber optic arrangement 300 and the spring 335 are sandwiched between the proximal housing 340 and the distal housing 350. The example fiber optic arrangement 300 includes an optical fiber 305, a ferrule 310, and a ferrule hub 315 (FIG. 12).

In certain implementation, the fiber optic arrangement 300 includes a keying member 360 (FIG. 13) to lock the fiber optic arrangement 300 to the connector 330 at a particular rotational orientation. For example, the keying member 360 can be positioned on the fiber optic arrangement 300 in a particular rotational orientation based on a tuning analysis. The keying member 360 is structured to inhibit rotation of the keying member 360 relative to the fiber optic arrangement 300. The keying member 360 also is structured to inhibit rotation of the keying member 360 relative to the connector 330 when the connector 330 is assembled. In certain implementations, the keying member 360 and connector 330 are structured so that the connector 330 can only be assembled around the fiber optic arrangement 300 in one rotational configuration as will be described in more detail herein.

The fiber optic arrangement 300 has a largest outer diameter of no more than 4 mm. In certain implementations, the fiber optic arrangement 300 has a largest outer diameter of no more than 3.8 mm. In certain implementations, the fiber optic arrangement 300 has a largest outer diameter of no more than 3.7 mm. In certain implementations, the fiber optic arrangement 300 has a largest outer diameter of no more than 3.6 mm. In certain implementations, the fiber optic arrangement 300 has a largest outer diameter of no more than 3.5 mm.

The optical fiber 305 is terminated at the ferrule 310 (e.g., at the factory) as described above with reference to the optical fiber 105 and ferrule 110. In certain implementations, the optical fiber tip and ferrule 310 are cleaned and a dust cap 320 is disposed over the front of the ferrule 310 to cover the fiber tip. The ferrule hub 315 surrounds the rear of the ferrule 310 and a portion of the fiber 305 extending out of the rear of the ferrule 310. In certain implementations, the ferrule hub 315 includes a forward section 316 and a keying section 317 (see FIG. 12) rearward of the forward section 316. The forward section 316 has a larger outer dimension than the keying section 317.

In certain implementations, the forward section 316 defines one or more flat surfaces 316a (FIG. 12). In certain implementations, the forward section 316 defines at least two flat surfaces 316a. In the example shown, the forward section 316 defines six flat surfaces 316a. In certain examples, the flat surfaces 316a are configured to be marked to indicate a tuning orientation of the optical fiber arrangement 300. For example, a mark can be made on the flat surface 316a to indicate a tuning direction. In certain implementations, the outer diameter of the forward section measured at the flat surfaces 316a is no more than 3.5 mm. In certain implementations, the outer diameter of the forward section measured at the flat surfaces 316a is no more than 3.4 mm. In certain implementations, the outer diameter of the forward section measured at the flat surfaces 316a is no more than 3.3 mm.

As shown in FIG. 12, in certain implementations, the keying section 317 of the ferrule hub 315 defines one or more flat surfaces 317a. In certain implementations, the rearward section 317 defines at least two flat surfaces 317a. In the example shown, the rearward section 317 defines six flat surfaces 317a. In certain implementations, the keying section 317 defines the rear of the ferrule hub 315. In other implementations, the ferrule hub 315 defines a rear section 319 disposed rearward of the keying section 317. In certain examples, the rear section 319 provides at least partially support for the spring 335. In certain examples, at least a portion of the rear section 319 has a cross-dimension larger than a cross-dimension of the keying section 317.

Figure 13:
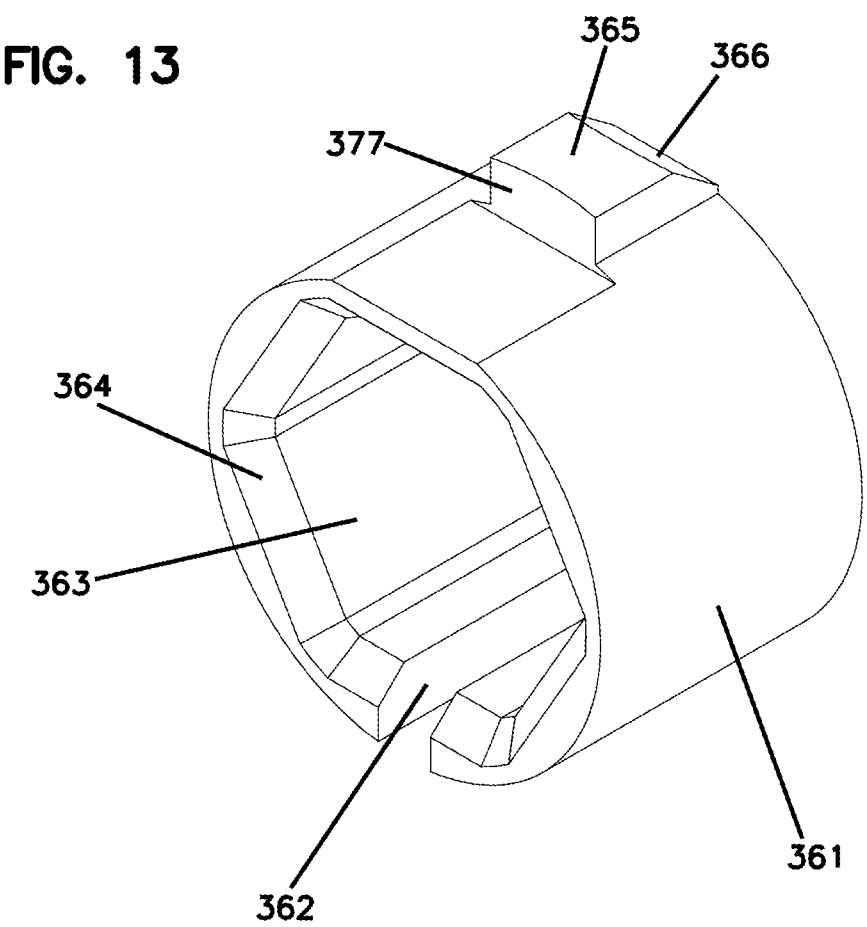
FIG. 13 is a perspective view of an example keying member suitable for use with the fiber optic arrangement of FIG. 12 and optical connector of FIG. 11.

As also shown in FIGS. 12 and 13, the keying member 360 includes a body 361 defining an axial passage through which the fiber 305 passes. The body 361 and passage are sized to fit around the keying section 317 of the hub 315. In certain examples, the body 361 defines an axial slot 362 that extends from the passage to an exterior of the body 361. The axial slot 362 enables the passage to expand sufficiently to pass over the rear section 319 of the hub 315 (or to be mounted laterally on the keying section 317).

An interior of the passage defines flat surfaces 363 that are sized and shaped to fit with the flat surfaces 317a of the keying section 317 of the hub 315. In the example shown, the passage has a hexagonal shape. In other examples, however, the passage can have any number of flat surfaces 317a. The engagement between the flat surfaces 363 of the keying member 360 and the flat surfaces 317a of the hub 315 inhibit rotation of the keying member 360 relative to the hub 315. Accordingly, the keying member 360 can be mounted to and maintained on the hub 315 in a particular rotational configuration.

The keying member 360 also includes an alignment member 365 at an exterior of the body 361. In certain implementations, the keying member 360 is mounted to the hub 315 so that the alignment member 365 indicates a tuning direction of the optical fiber 305. In certain implementations, the keying member 360 is configured to secure to the rear housing 340 to inhibit rotation of the keying member 360 relative to the rear housing 340. In the example shown in FIG. 11, the rear housing 340 defines an aperture 348 sized to receive the alignment member 365 of the keying member 360. The example alignment member 360 shown in FIG. 13 defines a rearwardly-facing ramp 366 and a forwardly-facing shoulder 377. Accordingly, a forward portion of the rear housing 340 can cam over the ramp 366 and snap over the shoulder 377.

In certain implementations, the keying member 360 defines the largest cross-dimension of the fiber optic arrangement 300. For example, the keying member 360 may define the largest cross-dimension at the alignment member 365. In certain examples, the cross-dimension of the keying member 360 at the alignment member 365 is larger than a cross-dimension of the forward section 316 of the hub 316.

In certain implementations, the cross-dimension of the keying member 360 at the alignment member 365 is no more than 4 mm. In certain implementations, the cross-dimension of the keying member 360 at the alignment member 365 is no more than 3.8 mm. In certain implementations, the cross-dimension of the keying member 360 at the alignment member 365 is no more than 3.5 mm. In certain implementations, the cross-dimension of the keying member 360 at the alignment member 365 is no more than 3.4 mm. In certain implementations, the cross-dimension of the keying member 360 at the alignment member 365 is no more than 3.3 mm.

The fiber optic arrangement 300 is connectorized by assembling the distal housing 350 and proximal housing 340 around the fiber optic arrangement 300. In some implementations, the distal housing 350 includes an inner housing 351 and an outer housing 356. In such implementations, the proximal housing 340 mounts to the inner housing 351. The spring 335 is held between a radial step 318, which transitions the forward and rearward sections 316, 317 of the ferrule hub 315, and a spring stop within the rear housing 340. The hub 315 abuts an interior stop defined by the distal housing 350. Accordingly, the spring 335 biases the ferrule 310 and fiber tip forwardly relative to the distal housing 350 while allowing for limited rearward axial movement of the ferrule 310 and fiber tip relative to the distal housing 350.

The proximal housing 340 is configured to be mounted to the optical fiber 305 when the fiber optic arrangement 300 has been routed to the demarcation point (e.g., a site at which the optical fiber is to be connected in the field). The proximal housing 340 includes a body 341 defining an axial slot 342 extending from a front of the body 341 to a rear of the body 341. Accordingly, the proximal housing 340 is mounted to the optical fiber 305 by sliding the optical fiber 305 through the axial slot 342. The proximal housing 340 defines a frustro-conical tail 344 that accommodates lateral pulling and bending of the optical fiber 305 as the fiber 305 exits the proximal housing 340. In the example shown in FIG. 14, the example fiber optic connector 330 does not include a separate strain-relief boot.

The proximal housing 340 also includes one or more catch members 345 configured to mate with receiving members of the distal housing 350. In certain implementations, the proximal housing 340 includes two catch members 345 positioned on opposite sides of the proximal housing 340. In certain implementations, the catch members 345 of the proximal housing 340 are elongated between the front and rear of the proximal housing 340. In certain implementations, each catch member 345 defines a catch surface 346. In certain examples, each catch member 345 defines a rearwardly facing catch surface 346. In an example, a front of each catch member 345 defines half an arrowhead. Accordingly, the catch members 345 may facilitate alignment of the proximal housing 340 with the distal housing 350.

The distal housing 350 defines an interior accessible from a rearward end 352. The fiber optic arrangement 300, the spring 335, and at least a forward portion of the proximal housing 340 are inserted into the interior through the rearward end 352. The distal housing 350 also defines catch apertures 354 that align with the catch members 345 of the proximal housing 340. In certain examples, the catch apertures 354 are elongated between the front and rear of the distal housing 350. Each catch aperture 354 defines a catch surface 354b configured to engage the catch surface 346 of the catch member 345 of the proximal housing 340. In certain examples, each catch aperture 354 defines a ramped surface 354a leading forwardly from the rearward end 352 of the distal housing 350. Each catch aperture 354 also defines a resilient section 354c that facilitates flexing of the rearward end 352 of the distal housing 350.

During assembly of the connector 330, the proximal housing 340 is inserted into the distal housing 350 so that the half arrowhead of the catch members 345 cam along the ramps 354a until the catch surfaces 346 of the half arrowheads 345 snap over the catch surfaces 354b of the apertures 354. Accordingly, the proximal housing 340 restrain rearward axial movement of the spring 335 and fiber optic arrangement 300 relative to the distal housing 350.

In some implementations, the distal housing 350 includes multiple housing pieces movable relative to each other. In the example shown, the distal housing 350 defines an SC plug housing including an inner body 351 and an outer body 356. The inner body 351 defines the rear opening 352, an aperture 351a through which a tuning mark on the ferrule hub 315 is visible, and the catch apertures 354. In certain implementations, a forward end of the inner housing 351 is inserted through a rear end of the outer housing 356. In certain implementations, wings of the inner housing 351 latch into apertures defined by the outer housing 356 (e.g., see FIG. 14). In other implementations, the inner housing 351 otherwise axially and rotationally secures to the outer housing 356. In other implementations, the distal housing 350 is integrally formed or formed from parts that are axially and rotationally fixed relative to each other.

Figure 14:
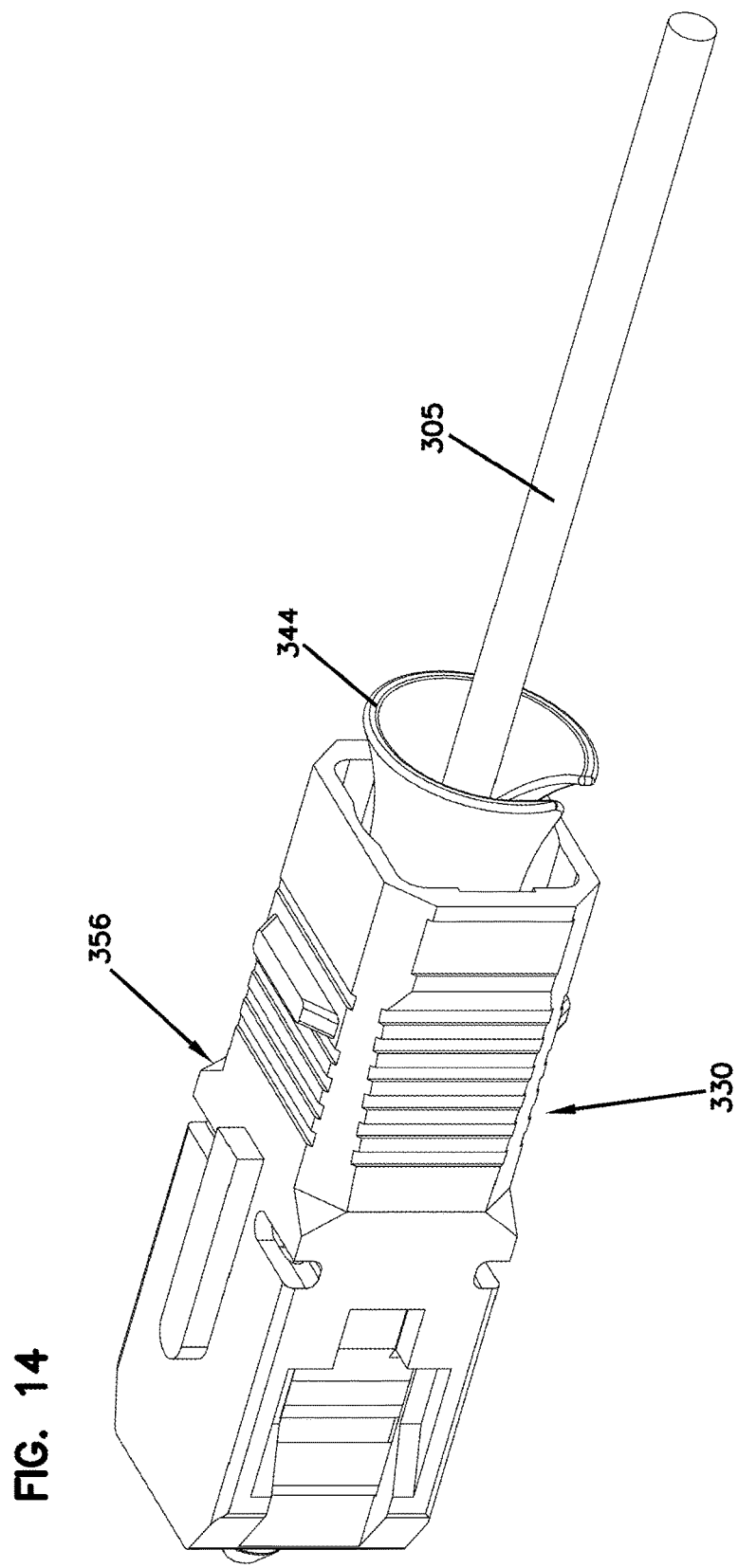
FIG. 14 is a perspective view of the assembled connector of FIG. 11.
Figure 15:
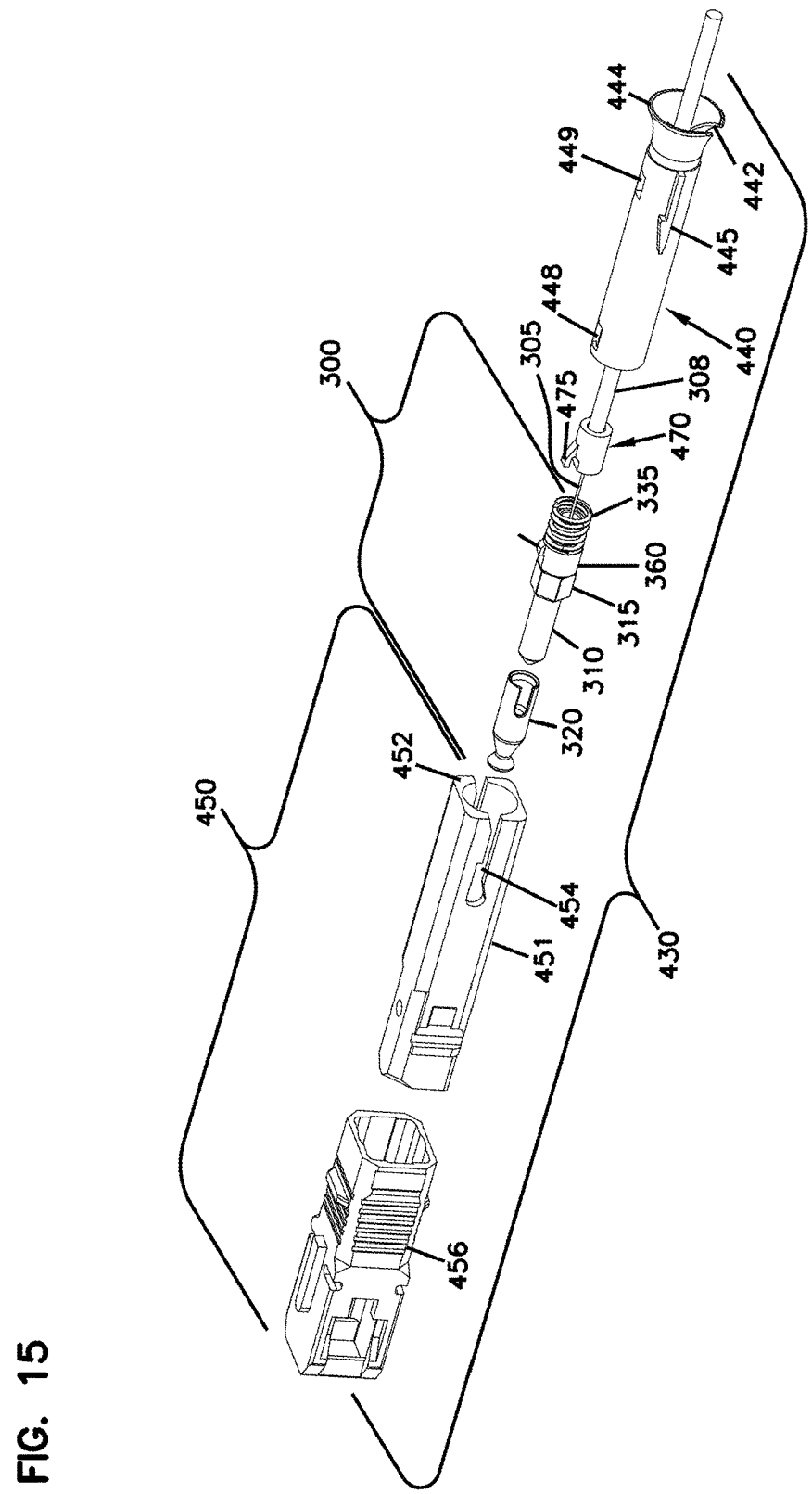
FIG. 15 is a perspective view of another example optical connector with the components axially exploded away from each other for ease in viewing.

FIGS. 15-18 illustrate another example of a fiber optic connector 430 assembled about the example fiber optic arrangement 300 discussed above with respect to FIGS. 11-14. As noted above, the example fiber optic arrangement 300 includes a ferrule 310, a ferrule hub 315, a keying member 360, and an optical fiber 305. In certain examples, the example fiber optic arrangement 300 can include the spring 335. In some implementations, the fiber optic connector 430 includes a distal housing 450, a spring 435, and a proximal housing 440 (FIG. 15). When the connector 430 is assembled, the fiber optic arrangement 300 and the spring 435 are sandwiched between the proximal housing 440 and the distal housing 450.

The distal housing 450 and the proximal housing 440 are assembled around the fiber optic arrangement 300. In some implementations, the distal housing 450 includes an inner housing 451 and an outer housing 456. In such implementations, the proximal housing 440 mounts to the inner housing 451. The spring 335 is held between the ferrule hub 315 and a spring stop within the rear housing 440. The ferrule hub 315 abuts an interior stop defined by the distal housing 450. Accordingly, the spring 335 biases the ferrule 310 and fiber tip forwardly relative to the distal housing 450 while allowing for limited rearward axial movement of the ferrule 310 and fiber tip relative to the distal housing 450.

The proximal housing 440 is configured to be mounted over the optical fiber 305 when the fiber optic arrangement 300 has been routed to the demarcation point (e.g., a site at which the optical fiber is to be connected in the field). The proximal housing 440 includes a body 441 defining an axial slot 442 extending from a front of the body 441 to a rear of the body 441. Accordingly, the proximal housing 440 is mounted over the optical fiber 305 by sliding the optical fiber 305 through the axial slot 442. The proximal housing 440 defines a frustro-conical tail 444 that accommodates lateral pulling and bending of the optical fiber 305 as the fiber 305 exits the proximal housing 440. In the example shown in FIG. 17, the example fiber optic connector 430 does not include a separate strain-relief boot.

The proximal housing 440 also includes one or more catch members 445 configured to mate with receiving members of the distal housing 450. In certain implementations, the proximal housing 440 includes two catch members 445 positioned on opposite sides of the proximal housing 440. In certain implementations, the catch members 445 of the proximal housing 440 are elongated between the front and rear of the proximal housing 440. In certain implementations, each catch member 445 defines a catch surface 446. In certain examples, each catch member 445 defines a rearwardly facing catch surface 446. In an example, a front of each catch member 445 defines half an arrowhead. The catch members 445 may facilitate alignment of the proximal housing 440 with the distal housing 450.

The distal housing 450 defines an interior accessible from a rearward end 452. The fiber optic arrangement 300, the spring 335, and at least a forward portion of the proximal housing 440 are inserted into the interior through the rearward end 452. The distal housing 450 also defines catch apertures 454 that align with the catch members 445 of the proximal housing 440. In certain examples, the catch apertures 454 are elongated between the front and rear of the distal housing 450. Each catch aperture 454 defines a catch surface 454b configured to engage the catch surface 446 of the catch member 445 of the proximal housing 440. In certain examples, each catch aperture 454 defines a ramped surface 454a leading forwardly from the rearward end 452 of the distal housing 450. Each catch aperture 454 also defines a resilient section 454c that facilitates flexing of the rearward end 452 of the distal housing 450.

During assembly of the connector 430, the proximal housing 440 is inserted into the distal housing 450 so that the half arrowhead of the catch members 445 cam along the ramps 454a until the catch surfaces 446 of the half arrowheads 445 snap over the catch surfaces 454b of the apertures 454. Accordingly, the proximal housing 440 restrains rearward axial movement of the spring 335 and fiber optic arrangement 300 relative to the distal housing 450.

In some implementations, the proximal housing 440 defines a forward aperture 448 sized to receive the alignment member 365 of the keying member 360 of the fiber optic arrangement 300. A forward portion of the rear housing 440 can cam over the ramp 466 of the alignment member 365 and snap over the shoulder 377 of the alignment member 365 until the alignment member 365 is disposed in the forward aperture 448 (e.g., see FIG. 18). In certain examples, the forward aperture 448 is sized to enable axial movement of the keying member 360 relative to the proximal housing 340 (see FIG. 18). For example, the forward aperture 448 can be sized to accommodate rearward movement of the ferrule 310 sufficient to compress the spring 335. The engagement between the alignment member 365 and the aperture 448 inhibits rotation of the keying member 360 relative to the proximal housing 440. Accordingly, the interaction between the alignment member 365 and the forward aperture 448 maintain a tuning position of the fiber optic arrangement 300 relative to the connector 430.

Figure 16:
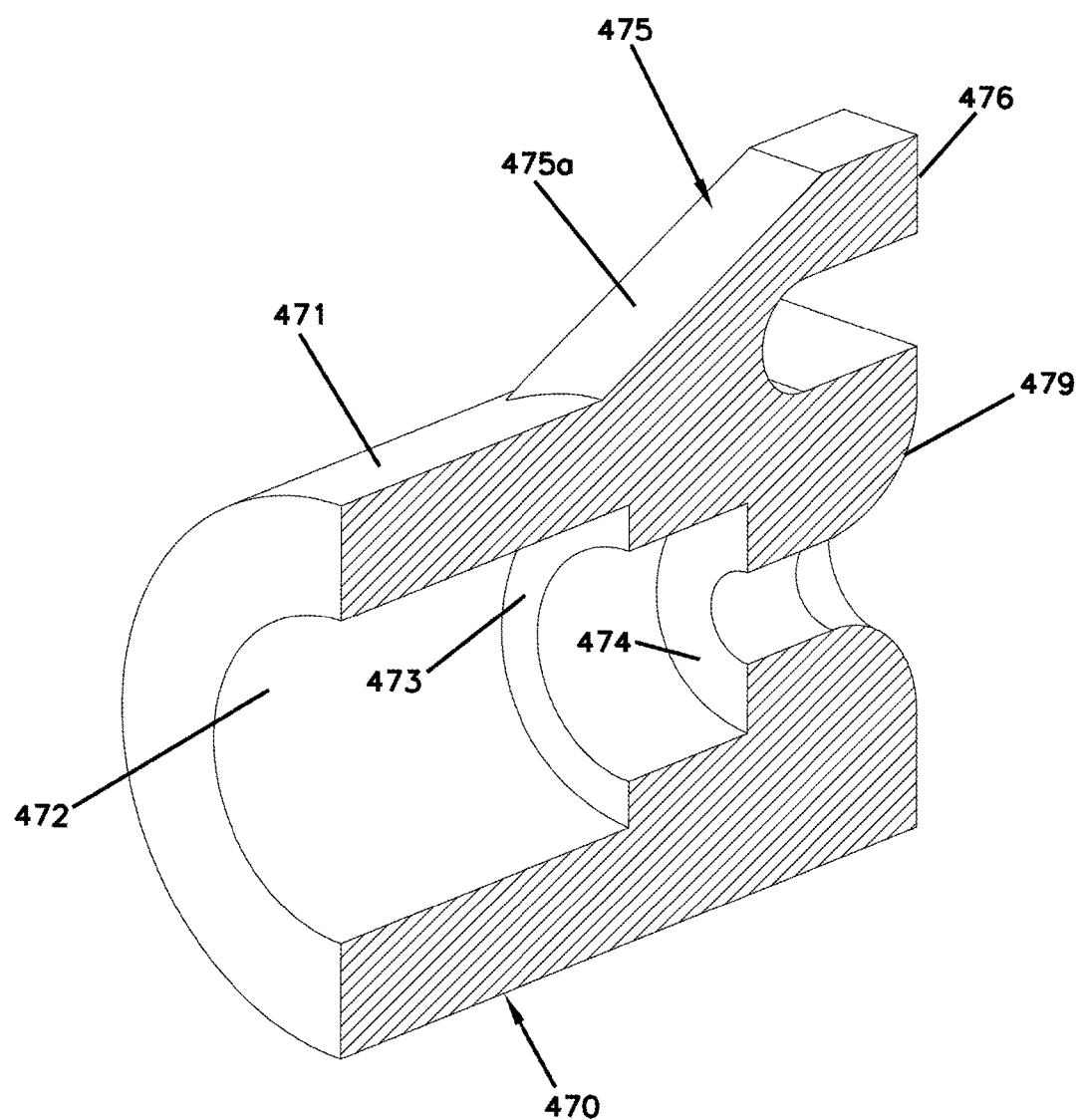
FIG. 16 is an axial cross-section of an example cable anchor suitable for use with the optical connector of FIG. 15.
Figure 17:
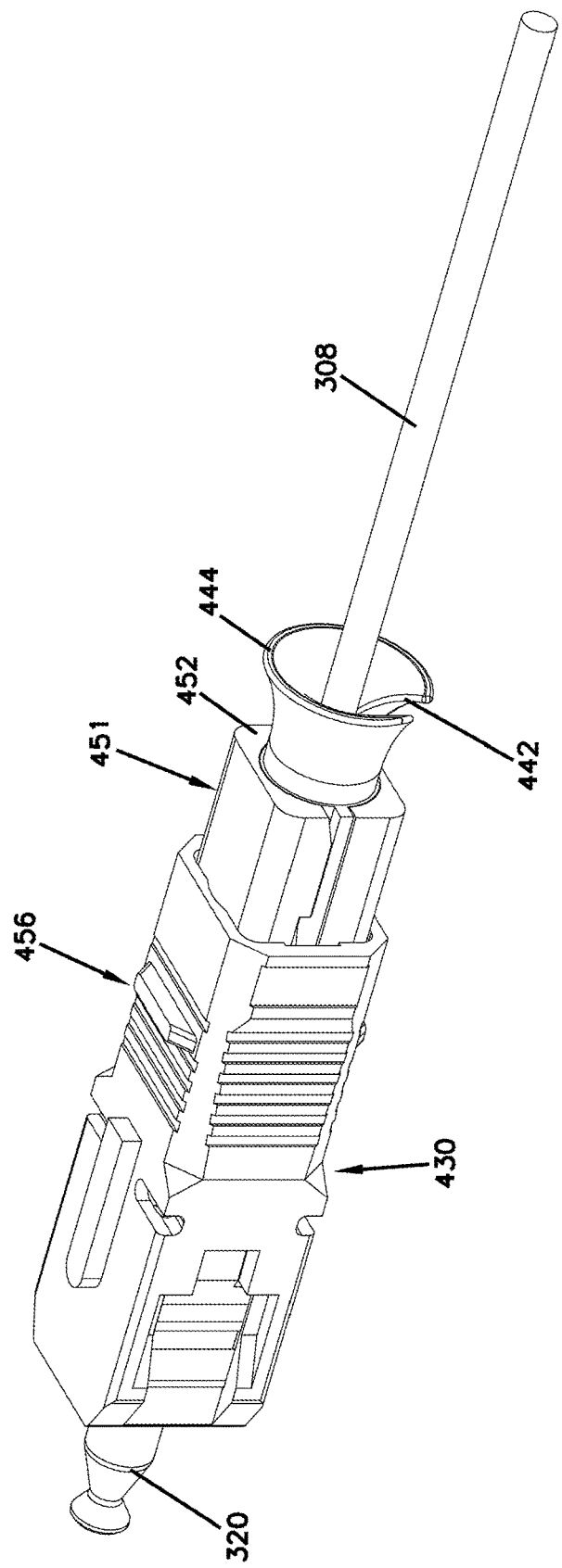
FIG. 17 is a perspective view of the assembled optical connector of FIG. 15.

In some implementations, the proximal housing 440 defines a rearward aperture 449 sized to receive a tab 475 of a cable anchor 470. The cable anchor 470 is attached to a jacket and/or strength layer 308 of the fiber 305 while allowing the fiber 305 to pass therethrough. As shown in FIG. 16, the cable anchor 470 includes a body 471 defining a passage 472. The jacket and/or strength layer 308 enters the passage 472 until reaching a stop surface 473. In certain implementations, the jacket and/or strength layer 308 can be epoxied within the passage 472. In some examples, the jacket reaches the stop surface 473 and the strength layer reaches a second stop surface 474. In other examples, epoxy is only provided within the passage 472 until the first stop surface 473.

Figure 18:
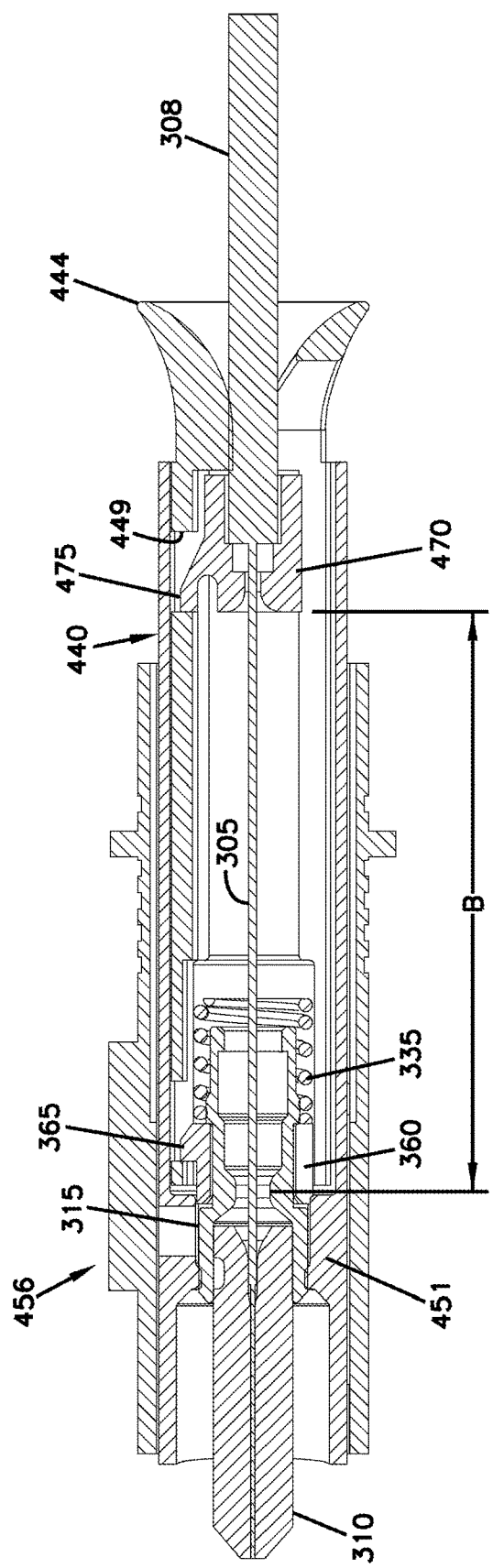
FIG. 18 is an axial cross-sectional view of the assembled optical connector of FIG. 17.

A tab 475 extends outwardly from an exterior of the anchor body 471. The tab 475 defines a rearwardly-facing ramped surface 475a and a forwardly-facing shoulder 476. As shown in FIG. 18, the tab 475 fits within the rearward aperture 449 of the proximal housing 440 to inhibit rotation of the cable anchor 470 relative to the proximal housing 440. Also as shown in FIG. 18, the cable anchor 470 abuts against an inner stop surface of the proximal housing 440. The interaction between the cable anchor 470 and the inner stop surface inhibits rearward axial movement of the jacket and/or strength layer 308 of the fiber 305 relative to the proximal housing 440.

As shown in FIG. 18, the proximal housing 440 is sufficiently long to provide a buckling/bowing region B for the optical fiber 305. The bucking/bowing region B is a region in which the optical fiber 305 can laterally flex to accommodate rearward movement of the ferrule 310 relative to the distal housing 450 and proximal housing 440. In certain implementations, the distal housing 450 also is sufficiently long to accommodate the proximal housing 440.

In certain examples, the frustro-conical portion 444 of the proximal housing 440 extends rearwardly from the distal housing 450.

In some implementations, the distal housing 450 includes multiple housing pieces movable relative to each other. In the example shown, the distal housing 450 defines an SC plug housing including an inner body 451 and an outer body 456. In the example shown in FIGS. 17 and 18, the inner body 451 is longer than the outer body 456. For example, the inner body 451 is sufficiently long that a majority of the catch aperture 454 is disposed outside of the outer body 456 when the distal housing 450 is assembled.

The inner body 451 defines the rear opening 452, an aperture 451a through which a tuning mark on the ferrule hub 315 is visible, and the catch apertures 454. In certain implementations, a forward end of the inner housing 451 is inserted through a rear end of the outer housing 456. In certain implementations, wings of the inner housing 451 latch into apertures defined by the outer housing 456 (e.g., see FIG. 17). In other implementations, the inner housing 451 otherwise axially and rotationally secures to the outer housing 456. In other implementations, the distal housing 450 is integrally formed or formed from parts that are axially and rotationally fixed relative to each other. Other examples of connectorizing the fiber optic arrangements 100, 300 are shown in U.S. Application No. 62/268,418, filed Dec. 16, 2015, titled "Field Installed Fiber Optic Connector," the disclosure of which is hereby incorporated herein by reference in its entirety.

Figure 20:
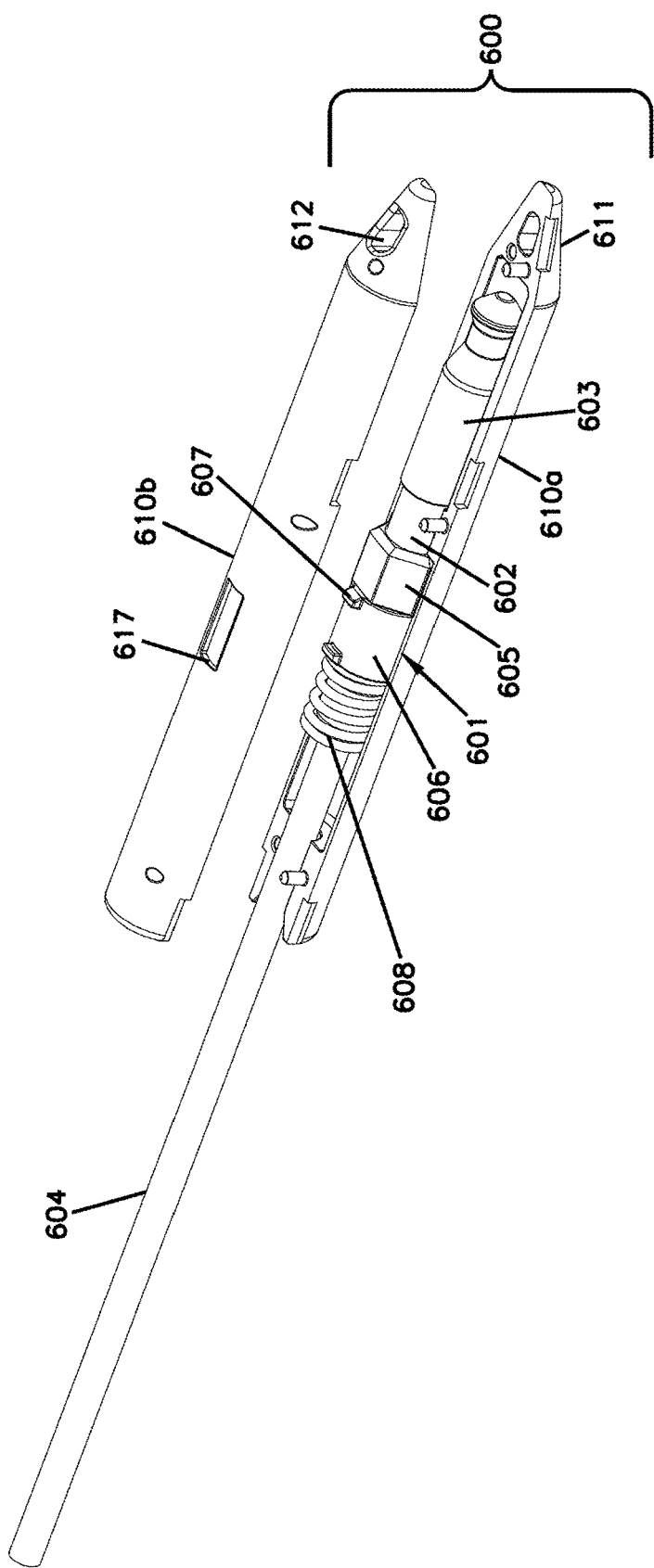
FIG. 20 is a perspective view of another example fiber optic arrangement disposed within a protective arrangement.

FIG. 20 illustrates another example protective arrangement 600 that can be mounted around an example fiber optic arrangement 601. The fiber optic arrangement 601 includes a ferrule 602 that terminates an optical fiber 604. A ferrule hub 605 carries the ferrule 602. A keying member 606 mounts over the hub 605. A spring 608 also mounts over the hub 605. In certain implementations, the ferrule hub 605 and the keying member 606 are the same as the ferrule hub 1115 and the keying member 1120 shown in FIGS. 30 and 31 below.

In certain implementations, the keying member 606 includes a first stop member 607 spaced along an axial length of the keying member 606 from a second stop member 607. In certain examples, each stop member 607 has a shoulder facing the shoulder of the other stop member 607. In certain examples, each stop member 607 defines a ramped surface facing away from the other stop member 607. In certain examples, the keying member 606 defines an axial slot 606a (FIG. 24) that extends along the axial length of the keying member 606. In the example shown, the axial slot 606a is located at an opposite circumferential side of the keying member 606 from the stop members 607.

The protective arrangement 600 can then be pulled or pushed through the duct. In certain implementations, the protective arrangement 600 includes a first housing piece 610a and a second housing piece 610b that cooperate to enclose the fiber optic arrangement 601. In certain implementations, the forward end of the protective arrangement 600 defines a tapered nose 611 to aid in navigation through ducts. In certain implementations, the tapered nose 611 defines an aperture 612. A pulling string could be inserted through the aperture to attach the pulling string to the protective arrangement 600, thereby allowing the protective arrangement 600 to be pulled through the duct.

Each housing piece 610a, 610b defines a cavity sized and shaped to accommodate the components of the fiber optic arrangement 601. For example, the cavity may be sized and shaped to accommodate the ferrule 602, dust cap 603, and ferrule hub 605 after termination of the optical fiber 604. In certain examples, the cavity is sized and shaped to accommodate a spring 608. In certain examples, the cavity is sized and shaped to accommodate a cable anchor.

In certain examples, the cavity is sized and shaped to accommodate a keying member 606. For example, at least one of the housing pieces 610a, 610b defines a window 617 to accommodate the stop members 607. In the example shown, each housing piece 610a, 610b defines a window 617 through which the stop members 607 can extend.

In certain implementations, the protective arrangement 600 is assembled about the fiber optic arrangement 601 in the factory after termination of the optical fiber 604 at the ferrule 602 and before shipping of the fiber optic arrangement 600 to an installation site.

In certain implementations, the housing pieces 610a, 610b define alignment keys that aid in mating the housing pieces 610a, 610b. In the example shown, the alignment keys include pegs and holes. In other implementations, other types of alignment keys can be used.

Figure 21:
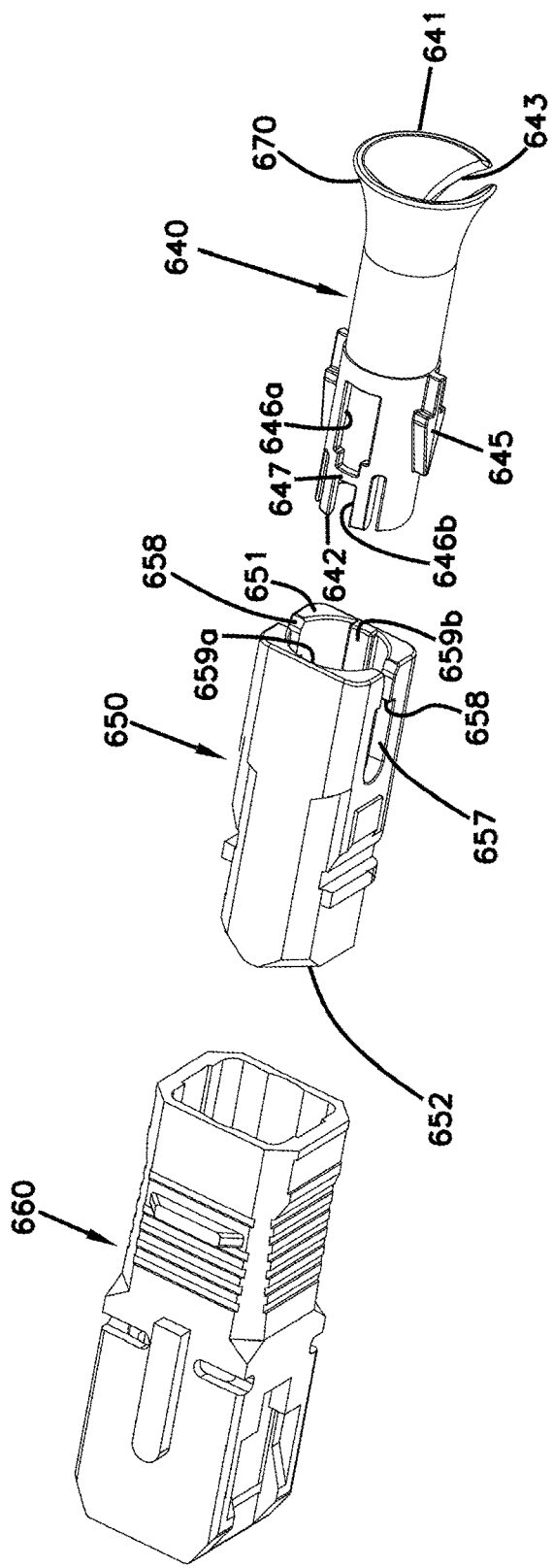
FIG. 21 is a front perspective view of example components of a fiber optic connector configured to be installed about the fiber optic arrangement of FIG. 20.
Figure 22:
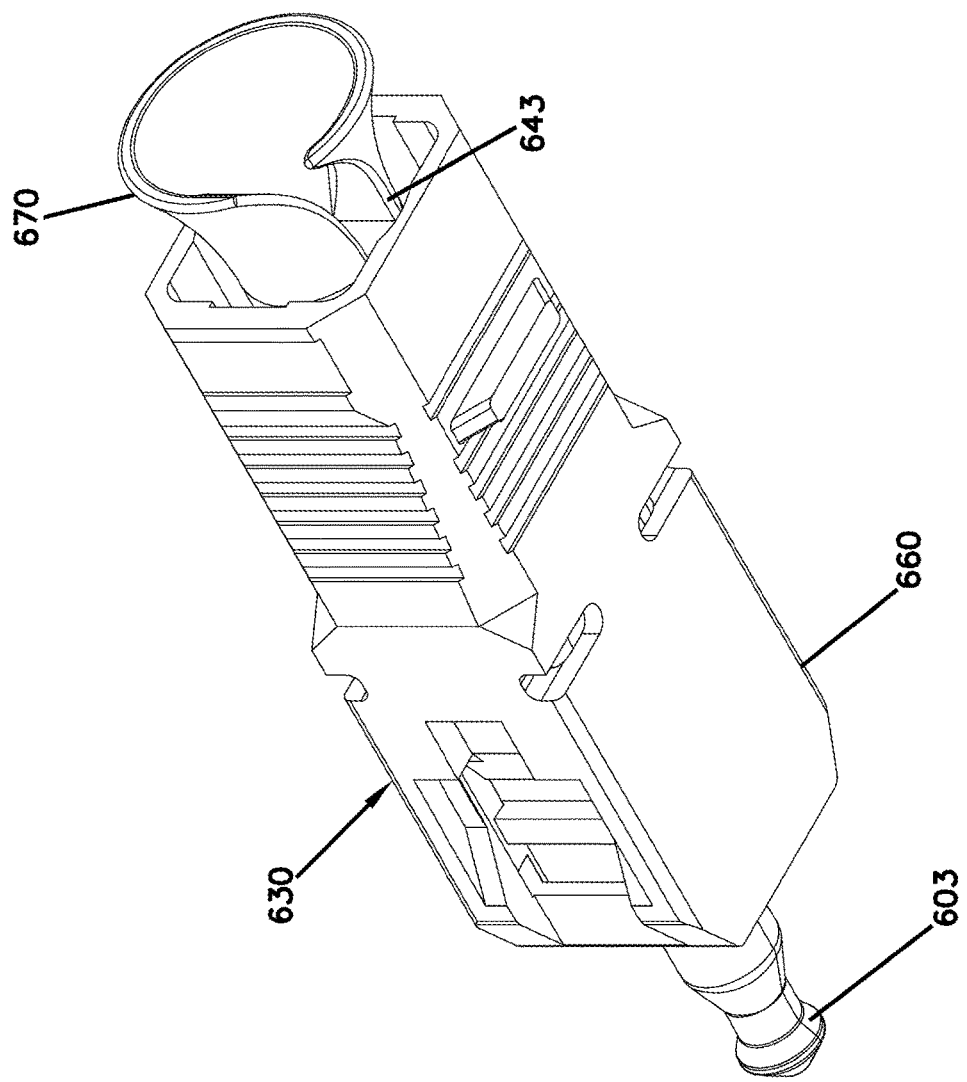
FIG. 22 is a rear perspective view of the fiber optic connector formed by installing the components of FIG. 21 about the fiber optic arrangement of FIG. 20.
Figure 23:
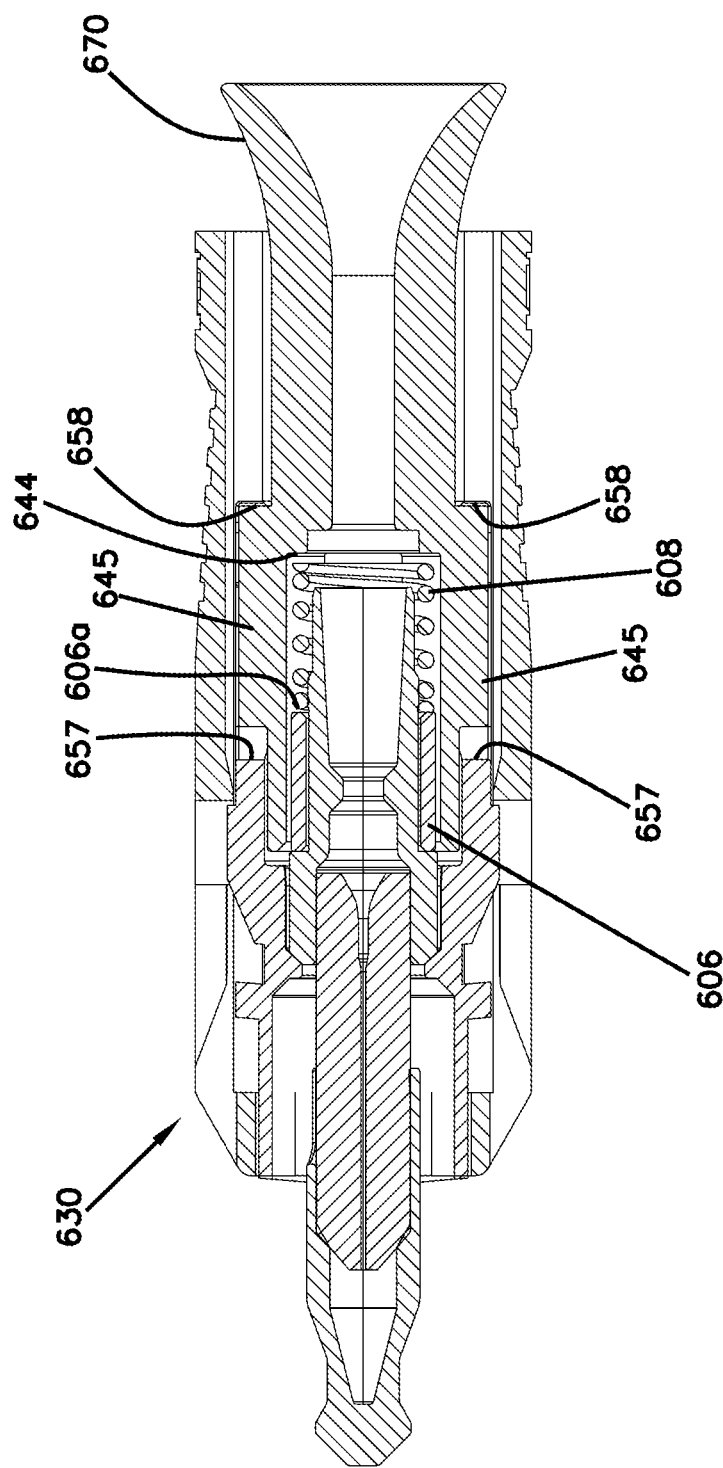
FIG. 23 is an axial cross-sectional view of the fiber optic connector of FIG. 22.
Figure 24:
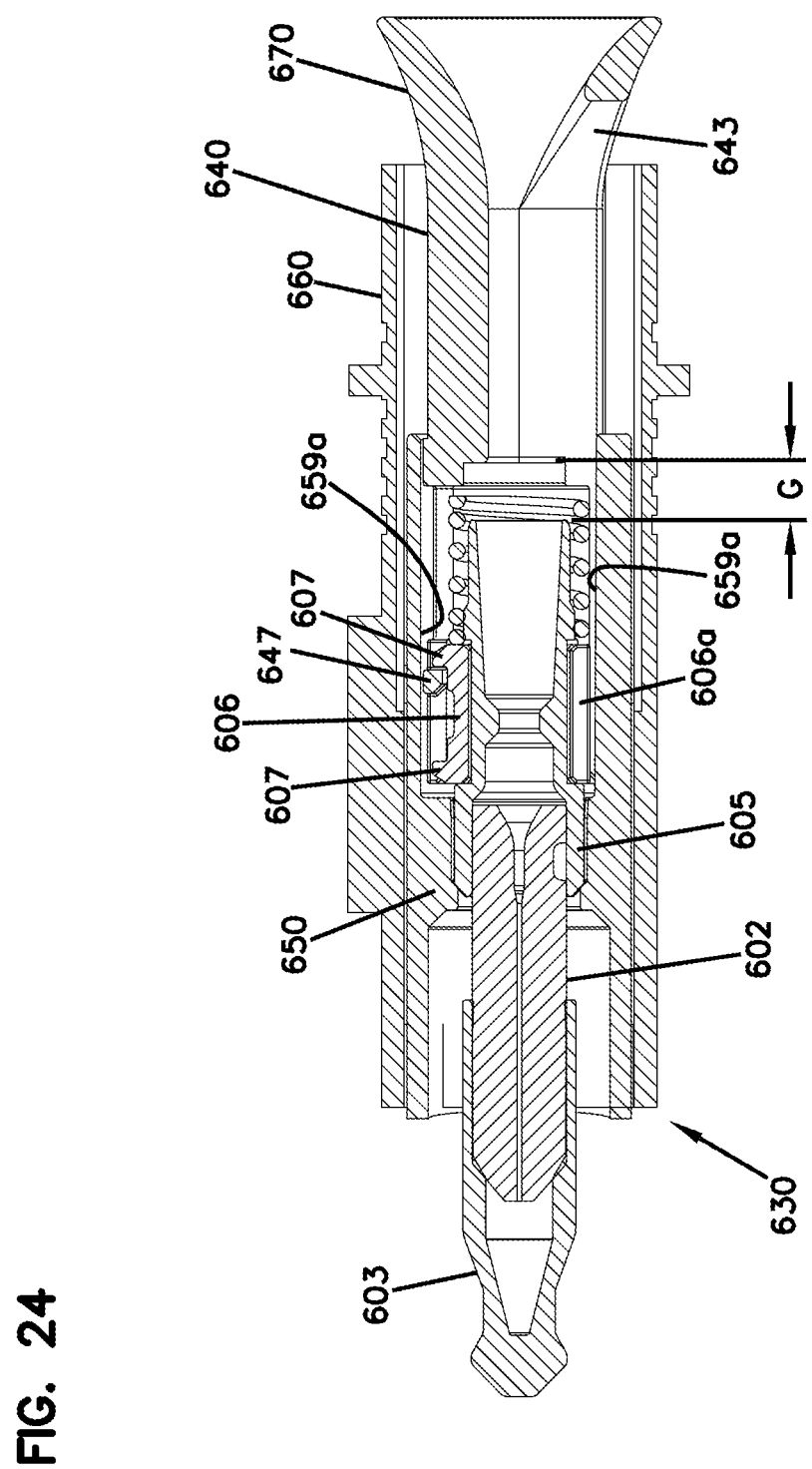
FIG. 24 is an axial cross-sectional view of the fiber optic connector of FIG. 22 rotated 90° from the cross-sectional view of FIG. 23.

FIGS. 21-24 illustrate one example optical connector 630 or components thereof that can be formed using the fiber optic arrangement 601. FIG. 21 illustrates the components of the optical connector 630 that are assembled about the fiber optic arrangement 601 in the field after the fiber optic arrangement 601 is pulled/pushed to the demarcation site. FIGS. 22-24 show the components installed around the fiber optic arrangement 601.

The field-installed components of the optical connector 630 include a proximal connector housing 640 and a distal connector housing 650. In certain examples (e.g., an SC connector), a grip body 660 can be mounted over the distal connector housing 650. The proximal housing 640 can be installed over the fiber optic arrangement 601. The proximal housing 640 engages the keying member 606 to rotationally retain the keying member 606 (and hence the hub 605) relative to the proximal housing 640. In certain implementations, the proximal housing 640 also axially limits movement of the hub 605 and ferrule 602 relative to the proximal housing 640.

An example proximal housing 640 extends along a length between a proximal end 641 and a distal end 642. An axial slot 643 runs along the length of the proximal housing 640. Accordingly, the proximal housing 640 is mounted to the optical fiber 602 by sliding the optical fiber 602 through the axial slot 643. In certain implementations, the proximal housing 640 is resilient and the slot 643 is sized so that the optical fiber 602 pushes edges of the proximal housing 640 outwardly to enlarge the slot 643 as the fiber 602 passes through the slot 643. Accordingly, the proximal housing 640 inhibits removal of the fiber 602 after snapping over the fiber 602.

The proximal housing 640 includes latch members 645 configured to hold the proximal housing 640 to the distal housing 650. In certain examples, the latch members 645 are disposed towards the distal end 642. In the example shown, the proximal housing 640 has two latch members 645 on opposite sides of the circumference of the proximal housing 640. In certain examples, the latch members 645 each have a ramp surface and a shoulder. In the example shown, each latch member 645 has an arrow shape with two ramp surfaces and two shoulders. In other examples, the latch members 645 can have any shape.

In certain implementations, the proximal housing 640 defines first and second slots 646a, 646b separated by an abutment member 647 (see FIG. 21). The first and second slots 646a, 646b are axially aligned. The first slot 646a is fully bounded around a periphery. The second slot 646*b* has an open end at the distal end of the proximal housing 640. In certain examples, the abutment member 647 includes a bar extending between the first and second slots 646*a*, 646*b*. In the example shown, the second slot 646*b* is open at the distal end 642 of the proximal housing 640. In other examples, the second slot 646*b* could be closed at the distal end 642 of the proximal housing 640.

In certain implementations, the proximal housing 640 defines a frustro-conical tail 670 that accommodates lateral pulling and bending of the optical fiber 602 as the fiber 602 exits the proximal housing 640. In some implementations, the rear of the proximal housing 640 is configured to mitigate the need for a separate strain-relief boot at the rear of the fiber optic connector 630. For example, the frustro-conical tail 670 may obviate the need for a separate strain-relief boot. Accordingly, the example fiber optic connector 630 does not include a separate strain-relief boot.

During assembly of the connector 630, the proximal housing 640 is inserted over the bare optical fiber 602 by passing the bare optical fiber 602 through the axial slot 643. The proximal housing 640 defines an interior spring stop 644 (FIG. 23) against which the spring 608 can seat when the optical connector 630 is assembled. In certain implementations, the spring stop 644 is located sufficiently rearward along the proximal housing 640 to provide a gap G (FIG. 24) between the rear of the hub 605 and the spring stop 644. Accordingly, when the optical connector 630 is coupled to another optical connector, the fiber optic arrangement 601 can be axially moved rearwardly relative to the optical connector 630 against the bias of the spring 608. For example, the fiber optic arrangement 601 can be moved rearwardly until the rear of the hub 605 contacts the spring stop 644.

The hub 605 of the fiber optic arrangement 601 is aligned with the proximal housing 640 so that the stop members 607 of the keying member 606 align with the second slot 646*b* of the proximal housing 640. The hub 605 is backed into the distal end of the proximal housing 640 so that the abutment member 647 cams over the ramped surface of the proximal stop member 607. When the proximal stop member 607 clears the abutment member 647, the proximal stop member 607 snaps into the slot 646*a*. Accordingly, the first and second slots 646*a*, 646*b* enable limited axial movement of the keying member 606 relative to the proximal housing 640.

The keying member 606 can move between a first position in which the shoulder of the proximal stop member 607 engages the abutment member 647 and a second position in which the shoulder of the distal stop member 607 engages the abutment member 647. The spring 608 biases the hub 605 distally relative to the proximal member 640 so that the shoulder of the proximal stop member 607 engages the abutment member 647. When the connector 630 is optically coupled to another connector, the ferrule 602 and hub 605 may be pushed in the proximal direction against the bias of the spring 608, but not beyond the second position.

An example distal housing 650 extends from a proximal end 651 to a distal end 652. The distal housing 650 defines a distal interior portion and a proximal interior portion separated by a reduced diameter passage. The distal housing 650 also defines an interior keying region configured to receive the first portion of the hub 605 of the fiber optic arrangement 601. In certain examples, the keying region of the distal housing 650 defines a plurality of flat surfaces. In an example, the keying region has a hex shape.

During assembly, the fiber optic arrangement 601 is inserted into the proximal end 651 of the distal housing 650 until the first portion of the hub 605 reaches the keying region. The ferrule 602 extends through the reduced diameter passage and into the distal interior portion. In an example, a distal end of the ferrule 602 extends distally beyond the distal end 652 of the distal housing 650. The reduced diameter passage inhibits distal axial movement of the hub 605 relative to the distal housing 650. The engagement between the distal portion of the hub 605 and the keying region of the distal housing 650 inhibits rotational movement of the hub 605 relative to the distal housing 650. In certain examples, the shape of the keying region also limits the number of rotational positions in which the hub 605 can be inserted into the distal housing 650.

The proximal interior portion of the distal housing 650 is sized to accommodate the keying member 606 carried by the hub 605. In certain implementations, the proximal interior portion is shaped to accommodate the keying member 606 in only one rotational orientation. For example, as shown in FIG. 14, the proximal interior portion may provide sufficient room for the stop members 607 of the keying member 606 at one side 659*a* and not at the opposite side 659*b* (e.g., see FIG. 24). Accordingly, the proximal interior portion further limits the number of rotational positions in which the hub 605 can be inserted into the distal housing 650. For example, the side 659*b* of the distal housing 650 may define a keying member sized and shaped to be received within the axial slot 643 of the proximal housing 640.

The distal housing 650 also defines apertures or slots 657 at which to receive the latch members 645 of the proximal housing 640. Each aperture or slot 657 has a distal-facing shoulder 658. A reduced width slit leads from the proximal end 651 of the distal housing 650 to each aperture or slot 657. The slit may taper outwardly at the proximal end 651 to facilitate insertion of the latch member 645 into the slit.

During assembly of the optical connector 630 at the demarcation location, the proximal housing 640 is connected to the distal housing 650. In certain implementations, the distal portion 642 of the proximal housing 640 is sized to be inserted into the proximal interior portion of the distal housing 650. The tabs 645 of the proximal housing 640 enter the slits of the distal housing 650 and pass into the apertures or slots 657 until the shoulders of the tabs 645 engage the distal-facing shoulders 658 of the apertures or slots 657. Engagement between the shoulders of the tabs 645 and the shoulders 658 of the distal housing 650 inhibit proximal axial movement of the proximal housing 640 relative to the distal housing 650.

The fiber optic arrangement 601 is sandwiched between the distal and s 650, 640. In certain implementations, a grip member 660 can be installed over the distal housing 640. In some examples, the grip member 660 is mounted to the distal housing 650 prior to assembly of the distal and s 650, 640. In other examples, the grip member 660 is mounted to the distal housing 650 after assembly of the distal and s 650, 640.

Figure 25:
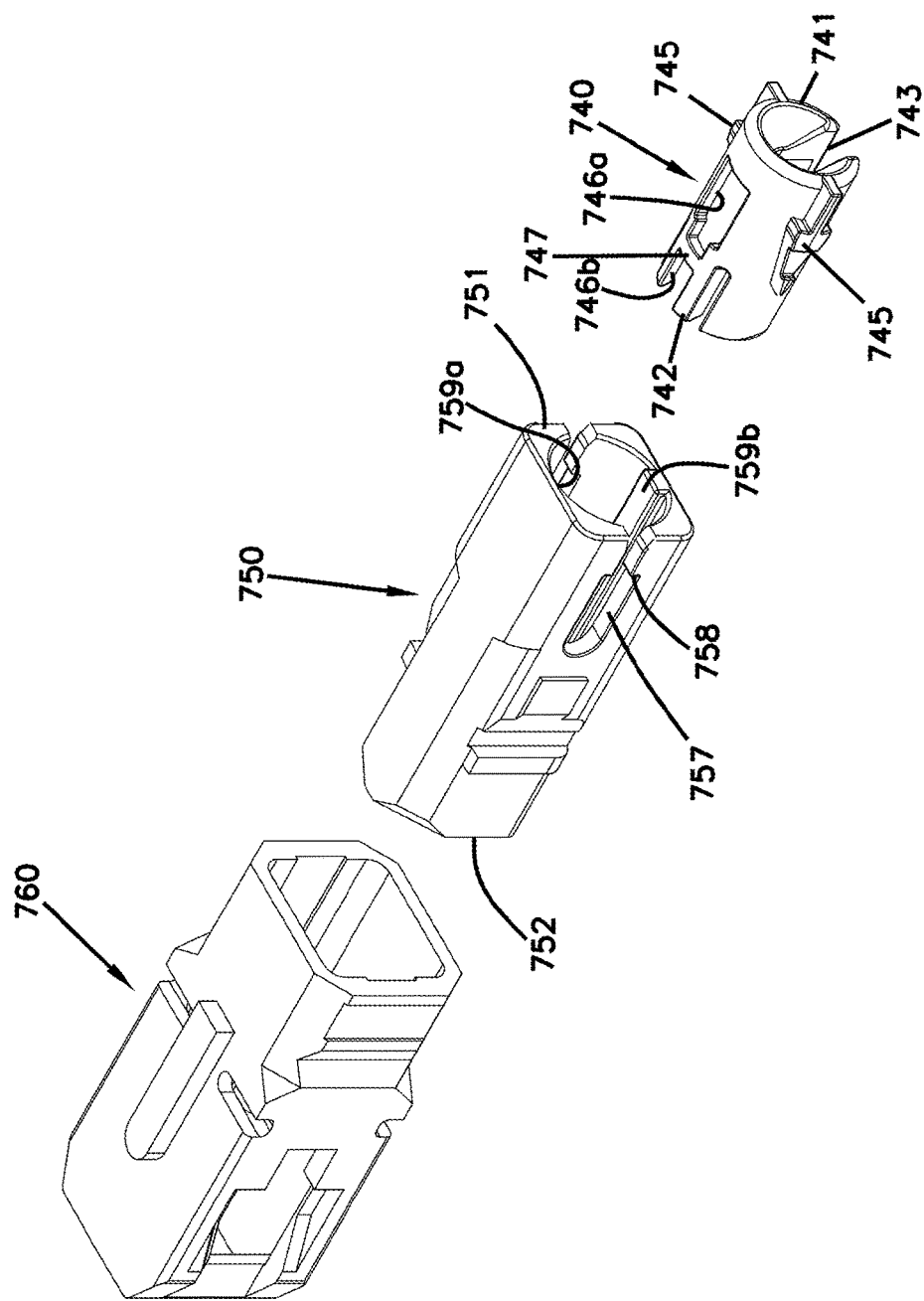
FIG. 25 is a front perspective view of example components of another fiber optic connector configured to be installed about the fiber optic arrangement of FIG. 20.
Figure 26:
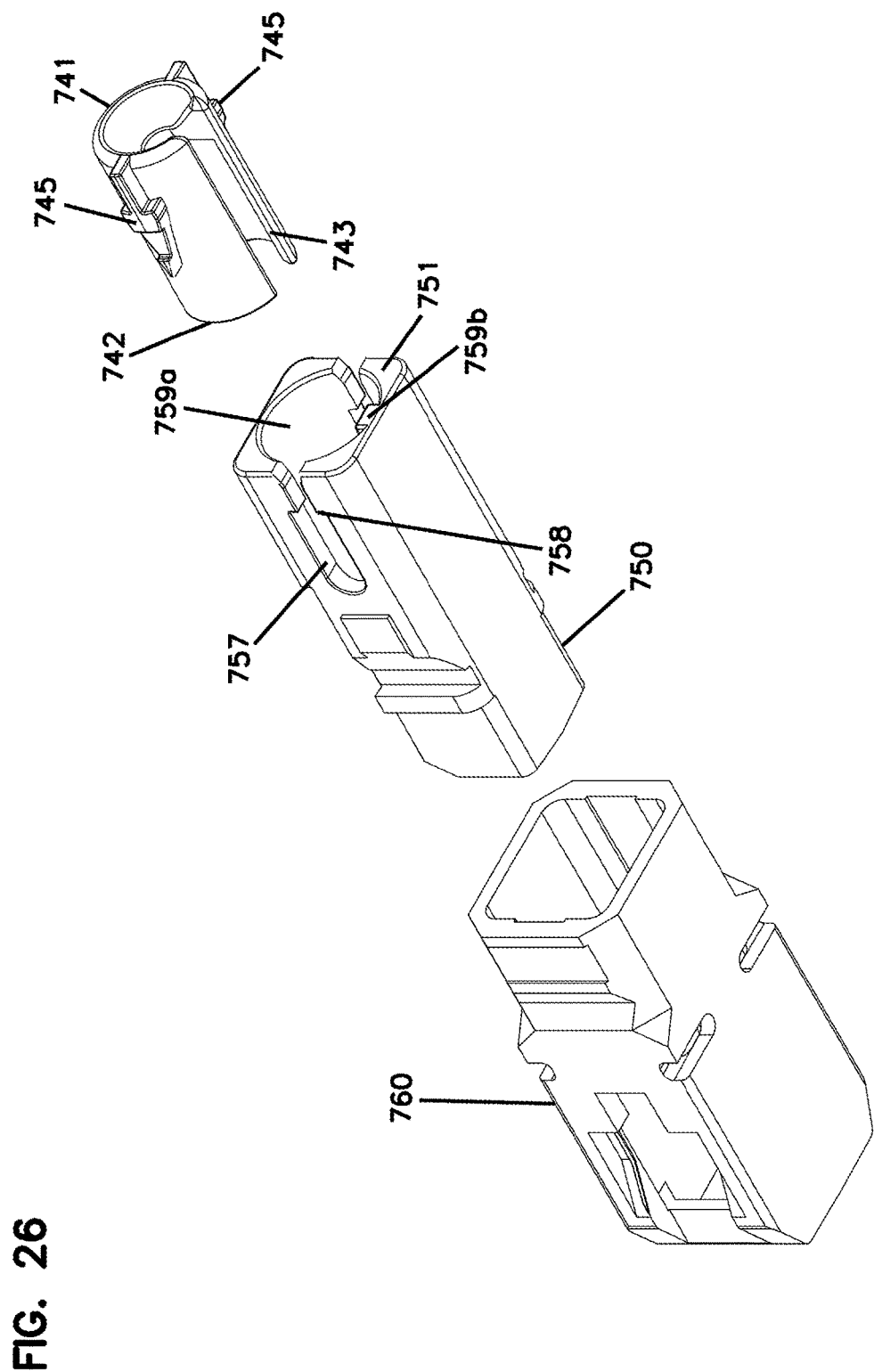
FIG. 26 is a rear perspective view of the fiber optic connector formed by installing the components of FIG. 25 about the fiber optic arrangement of FIG. 20.
Figure 27:
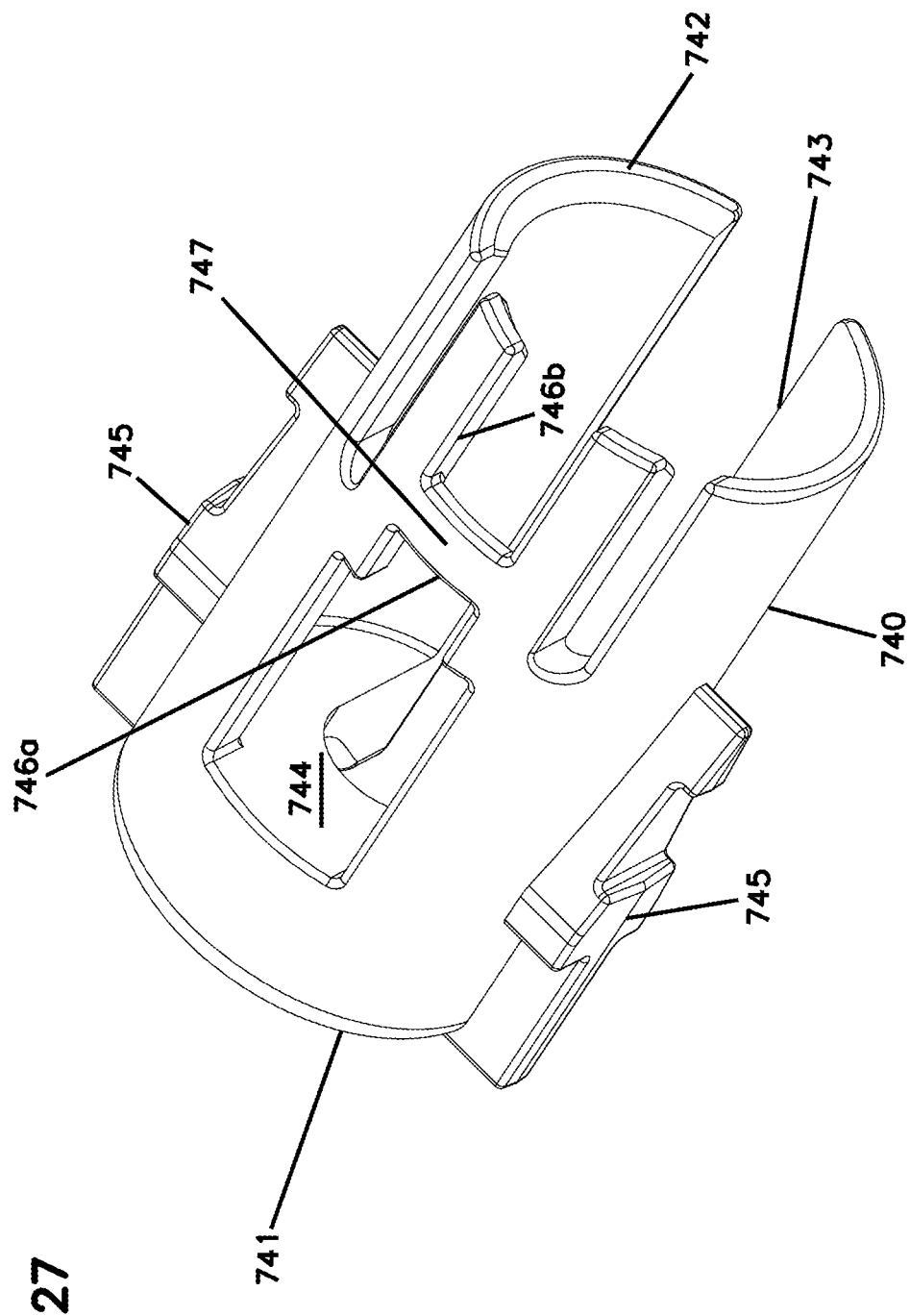
FIG. 27 is a perspective view of an example proximal housing suitable for use with the connector components of FIG. 26.
Figure 28:
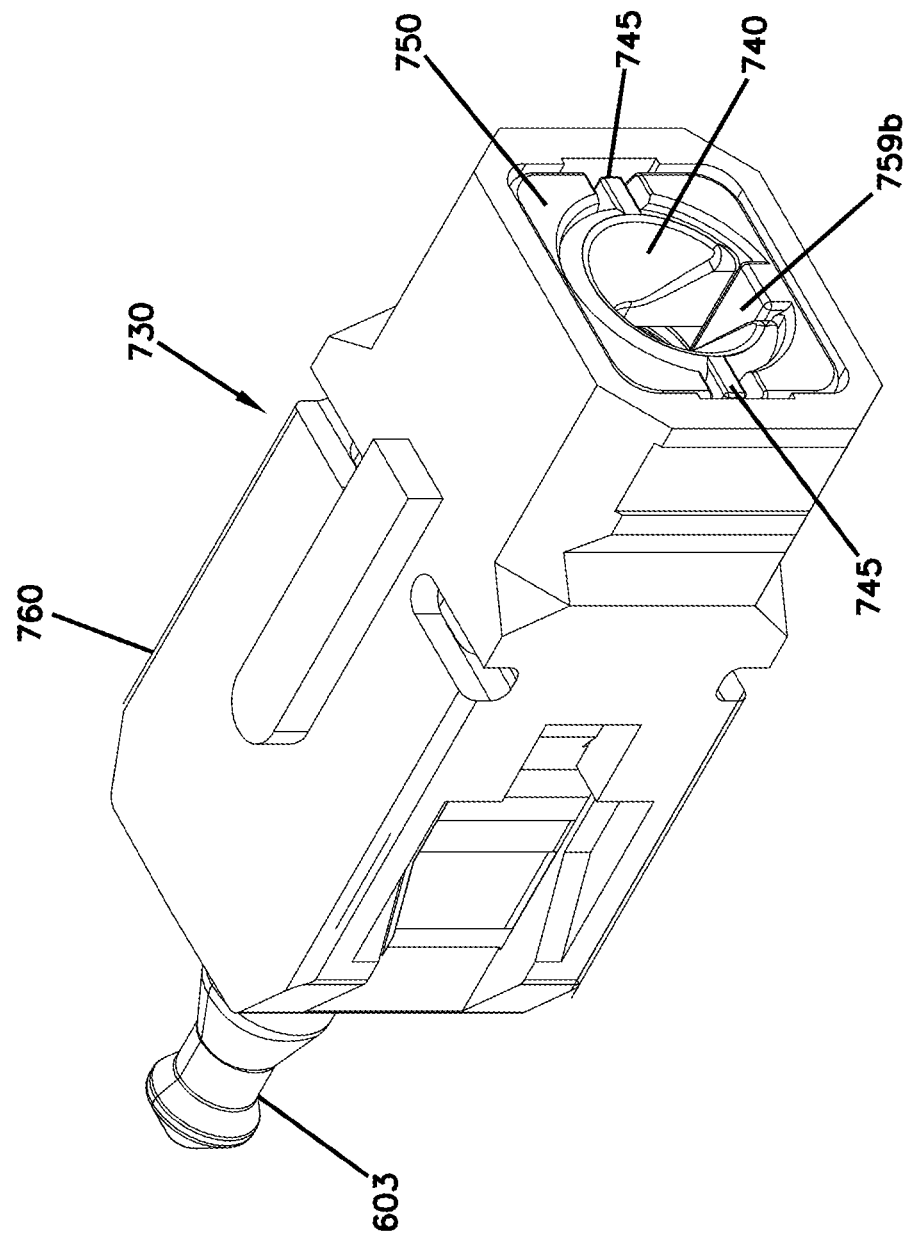
FIG. 28 is a rear perspective view of the fiber optic connector formed by installing the components of FIG. 26 about the fiber optic arrangement of FIG. 20.
Figure 29:
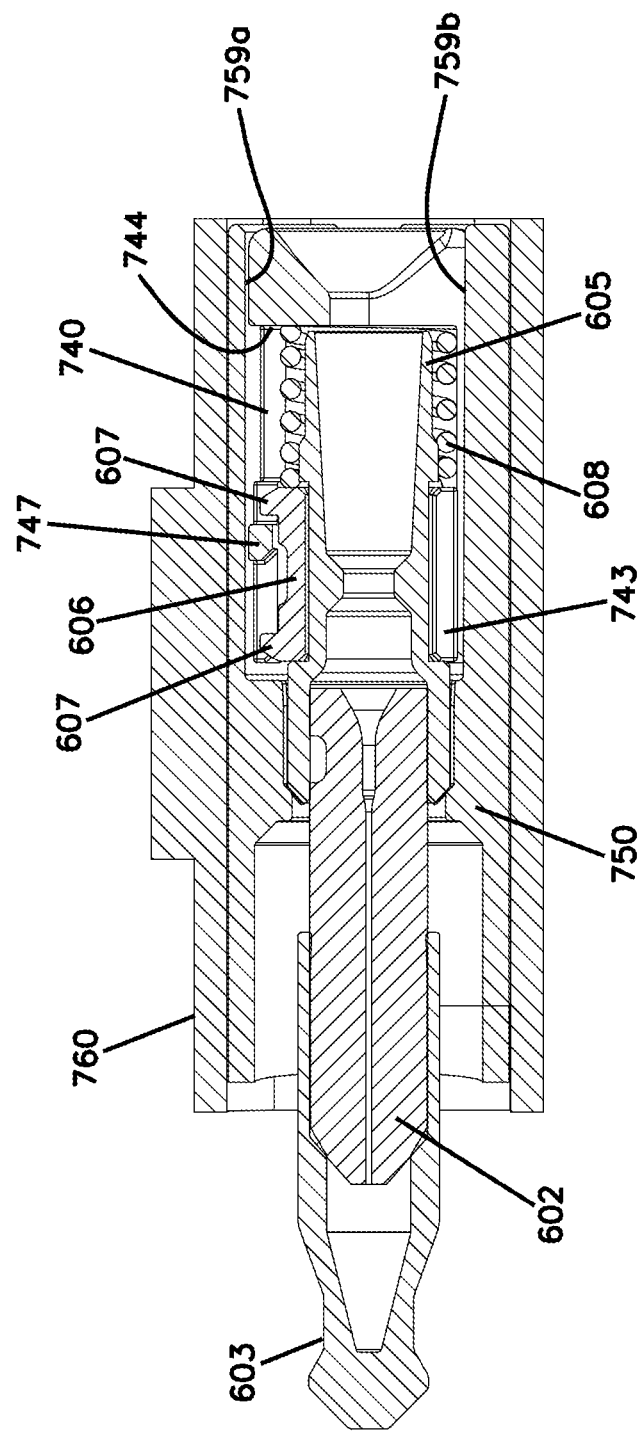
FIG. 29 is an axial cross-sectional view of the fiber optic connector of FIG. 28.

FIGS. 25-29 illustrate another example optical connector 730 or components thereof that can be formed using the fiber optic arrangement 601. FIGS. 25-27 illustrate the components of the optical connector 730 that are assembled about the fiber optic arrangement 601 in the field after the fiber optic arrangement 601 is pulled/pushed to the demarcation site. FIGS. 28 and 29 show the components installed around the fiber optic arrangement 601.

The field-installed components of the optical connector 730 include a proximal connector housing 740 and a distal connector housing 750. In certain examples (e.g., an SC connector), a grip body 760 can be mounted over the distal connector housing 750. The proximal housing 740 can be installed over the fiber optic arrangement 601. The proximal housing 740 engages the keying member 606 to rotationally retain the keying member 606 (and hence the hub 605) relative to the proximal housing 740. In certain implementations, the proximal housing 740 also axially limits movement of the hub 605 and ferrule 602 relative to the proximal housing 640.

An example proximal housing 740 extends along a length between a proximal end 741 and a distal end 742. An axial slot 743 runs along the length of the proximal housing 740. Accordingly, the proximal housing 740 is mounted to the optical fiber 602 by sliding the optical fiber 602 through the axial slot 743. In certain implementations, the proximal housing 740 is resilient and the slot 743 is sized so that the optical fiber 602 pushes edges of the proximal housing 740 outwardly to enlarge the slot 743 as the fiber 602 passes through the slot 743. Accordingly, the proximal housing 740 inhibits removal of the fiber 602 after snapping over the fiber 602.

The proximal housing 740 includes latch members 745 configured to hold the proximal housing 740 to the distal housing 750. In certain examples, the latch members 745 are disposed at the proximal end 741. In the example shown, the proximal housing 740 has two latch members 745 on opposite sides of the circumference of the proximal housing 740. In certain examples, the latch members 745 each have a ramp surface and a shoulder. In the example shown, each latch member 745 has an arrow shape with two ramp surfaces and two shoulders. In other examples, the latch members 745 can have any shape.

In certain implementations, the proximal housing 740 defines first and second slots 746a, 746b separated by an abutment member 747 (see FIG. 21). The first and second slots 746a, 746b are axially aligned. The first slot 746a is fully bounded around a periphery. The second slot 746b has an open end at the distal end of the proximal housing 740. In certain examples, the abutment member 747 includes a bar extending between the first and second slots 746a, 746b. In the example shown, the second slot 746b is open at the distal end 742 of the proximal housing 740. In other examples, the second slot 746b could be closed at the distal end 742 of the proximal housing 740.

In certain implementations, the proximal end 741 of the proximal housing 740 does not extend rearwardly beyond the proximal end 751 of the distal housing 750 when the optical connector 730 is assembled (see FIG. 28). In certain implementations, the proximal housing 740 is sized so that the proximal housing 740 is fully disposed within the distal housing 750 when the optical connector 730 is assembled (see FIG. 29). In certain implementations, the proximal housing 740 is about half the length of the distal housing 750.

During assembly of the connector 730, the proximal housing 740 is inserted over the bare optical fiber 602 by passing the bare optical fiber 602 through the axial slot 743. The hub 605 of the fiber optic arrangement 601 is aligned with the proximal housing 740 so that the stop members 707 of the keying member 706 align with the second slot 746b of the proximal housing 740. The hub 605 is backed into the distal end of the proximal housing 740 so that the abutment member 747 cams over the ramped surface of the proximal stop member 607. When the proximal stop member 607 clears the abutment member 747, the proximal stop member 607 snaps into the slot 746a. Accordingly, the first and second slots 746a, 746b enable limited axial movement of the keying member 606 relative to the proximal housing 740.

The proximal housing 740 defines an interior spring stop 744 (FIG. 29) against which the spring 608 can seat when the optical connector 730 is assembled. In certain examples, the spring stop 744 is recessed within the proximal housing 740 forwardly of the proximal end 741. In certain examples, the spring stop 744 is recessed sufficiently forwardly of the proximal end 741 that the rear end of the hub 605 abuts the spring stop 744 even when the hub 605 is biased forwardly by the spring 608.

Accordingly, when the optical connector 730 is coupled to another optical connector, the fiber optic arrangement 601 cannot be axially moved rearwardly relative to the optical connector 730 against the bias of the spring 608. In other examples, the hub 605 is spaced forwardly from the spring stop 744 sufficient to enable some rearward axial movement of the hub 605 relative to the proximal housing 740. In some such examples, however, the hub 605 and spring stop 744 are disposed so that the hub 605 axially travels less than the distance between the opposing stop members 607 of the keying member 606. In certain examples, the hub 605 travels no more than half the distance between the opposing stop members 607.

An example distal housing 750 extends from a proximal end 751 to a distal end 752. The distal housing 750 defines a distal interior portion and a proximal interior portion separated by a reduced diameter passage. The distal housing 750 also defines an interior keying region configured to receive the first portion of the hub 605 of the fiber optic arrangement 601. In certain examples, the keying region of the distal housing 750 defines a plurality of flat surfaces. In an example, the keying region has a hex shape.

During assembly, the fiber optic arrangement 601 is inserted into the proximal end 751 of the distal housing 750 until the first portion of the hub 605 reaches the keying region. The ferrule 602 extends through the reduced diameter passage and into the distal interior portion. In an example, a distal end of the ferrule 602 extends distally beyond the distal end 752 of the distal housing 750. The reduced diameter passage inhibits distal axial movement of the hub 605 relative to the distal housing 750. The engagement between the distal portion of the hub 605 and the keying region of the distal housing 750 inhibits rotational movement of the hub 605 relative to the distal housing 750. In certain examples, the shape of the keying region also limits the number of rotational positions in which the hub 605 can be inserted into the distal housing 750.

The proximal interior portion of the distal housing 750 is sized to accommodate the keying member 606 carried by the hub 605. In certain implementations, the proximal interior portion is shaped to accommodate the keying member 606 in only one rotational orientation. For example, as shown in FIG. 29, the proximal interior portion may provide sufficient room for the stop members 607 of the keying member 606 at one side 759a and not at the opposite side 759b (e.g., see FIG. 24). Accordingly, the proximal interior portion further limits the number of rotational positions in which the hub 605 can be inserted into the distal housing 750. For example, the side 759b of the distal housing 750 may define a keying member sized and shaped to be received within the axial slot 743 of the proximal housing 740 (see FIG. 28).

The distal housing 750 also defines apertures or slots 757 at which to receive the latch members 745 of the proximal housing 740. Each aperture or slot 757 has a distal-facing shoulder 758. A reduced width slit leads from the proximal end 752 of the distal housing 750 to each aperture or slot 757. The slit may taper outwardly at the proximal end 751 to facilitate insertion of the latch member 745 into the slit.

During assembly of the optical connector 730 at the demarcation location, the proximal housing 740 is connected to the distal housing 750. In certain implementations, the distal portion 742 of the proximal housing 740 is sized to be inserted into the proximal interior portion of the distal housing 750. The tabs 745 of the proximal housing 740 enter the slits of the distal housing 750 and pass into the apertures or slots 757 until the shoulders of the tabs 745 engage the distal-facing shoulders 758 of the apertures or slots 757. Engagement between the shoulders of the tabs 745 and the shoulders 758 of the distal housing 750 inhibit proximal axial movement of the proximal housing 740 relative to the distal housing 750.

The fiber optic arrangement 601 is sandwiched between the distal and s 750, 740. In certain implementations, a grip member 760 can be installed over the distal housing 740. In some examples, the grip member 760 is mounted to the distal housing 750 prior to assembly of the distal and s 750, 740. In other examples, the grip member 760 is mounted to the distal housing 750 after assembly of the distal and s 750, 740.

In certain implementations, the fiber optic arrangement 100, 300, 601 have optical fibers 105, 305, 604 having diameters of no more than 3 mm. In certain examples, the optical fibers 105, 305, 604 have diameters of no more than 2 mm. In certain examples, the optical fibers 105, 305, 604 have diameters of no more than 1.5 mm. In certain examples, the optical fibers 105, 305, 604 have diameters of no more than 1.3 mm. In certain examples, the optical fibers 105, 305, 604 have diameters of about 1.2 mm.

In other implementations, an optical connector can be assembled around larger fiber optic arrangements. For example, FIGS. 30-43 illustrate example fiber optic arrangements having diameters of larger than 1.5 mm and connector components installable around the larger fiber optic arrangements. In certain examples, the larger fiber optic arrangements have diameters of 2-5 mm. In certain examples, the larger fiber optic arrangements have diameters of 3 mm. In certain examples, the larger fiber optic arrangements have diameters of 4 mm. In certain examples, the larger fiber optic arrangements have diameters of 1.5 mm.

Figure 30:
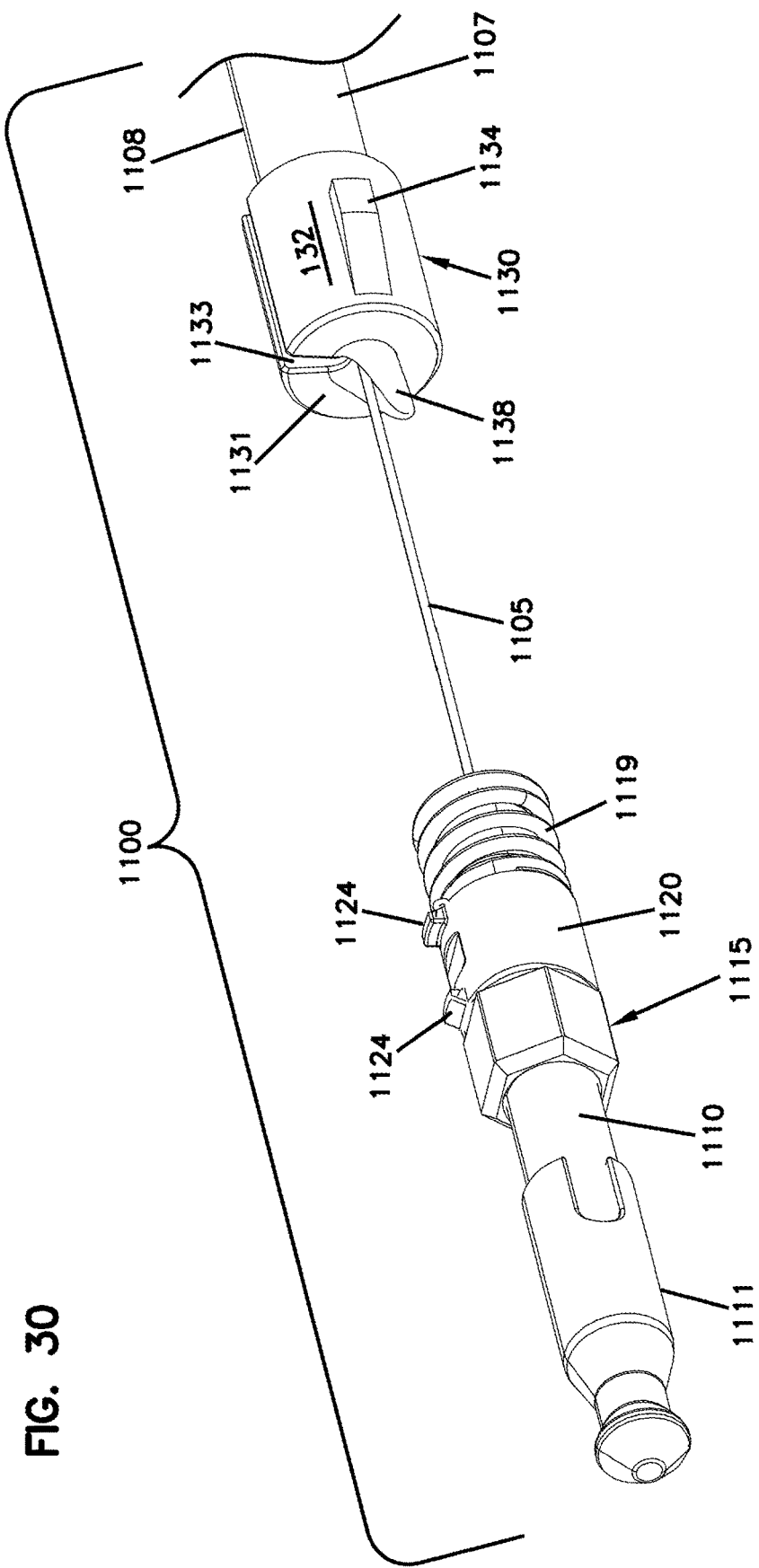
FIG. 30 illustrates a fiber optic arrangement including an optical fiber having a fiber tip held at an optical ferrule, which is coupled to a ferrule hub in accordance with the principles of the present disclosure.
Figure 31:
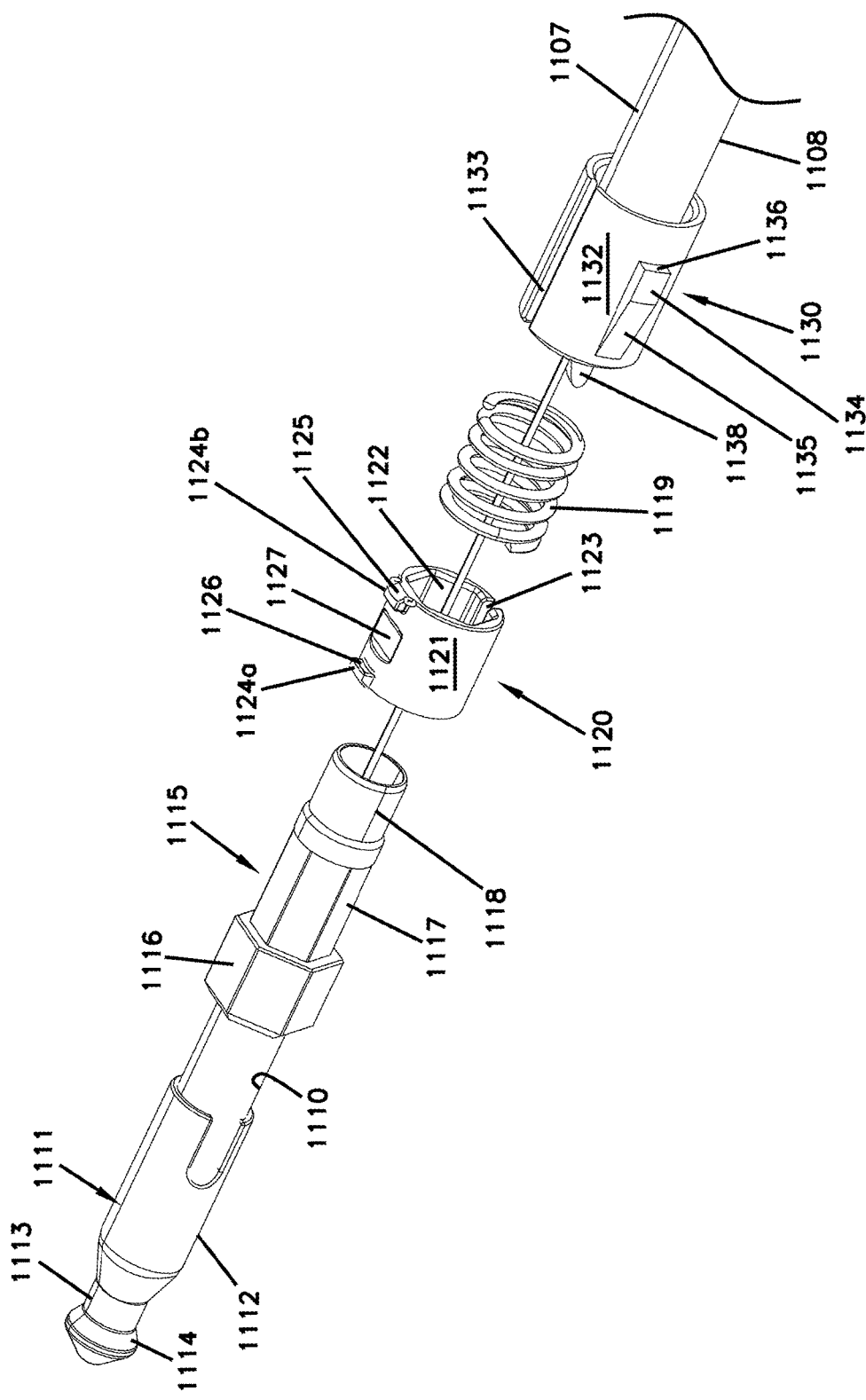
FIG. 31 is an exploded, perspective view of the fiber optic arrangement of FIG. 30.
Figure 32:
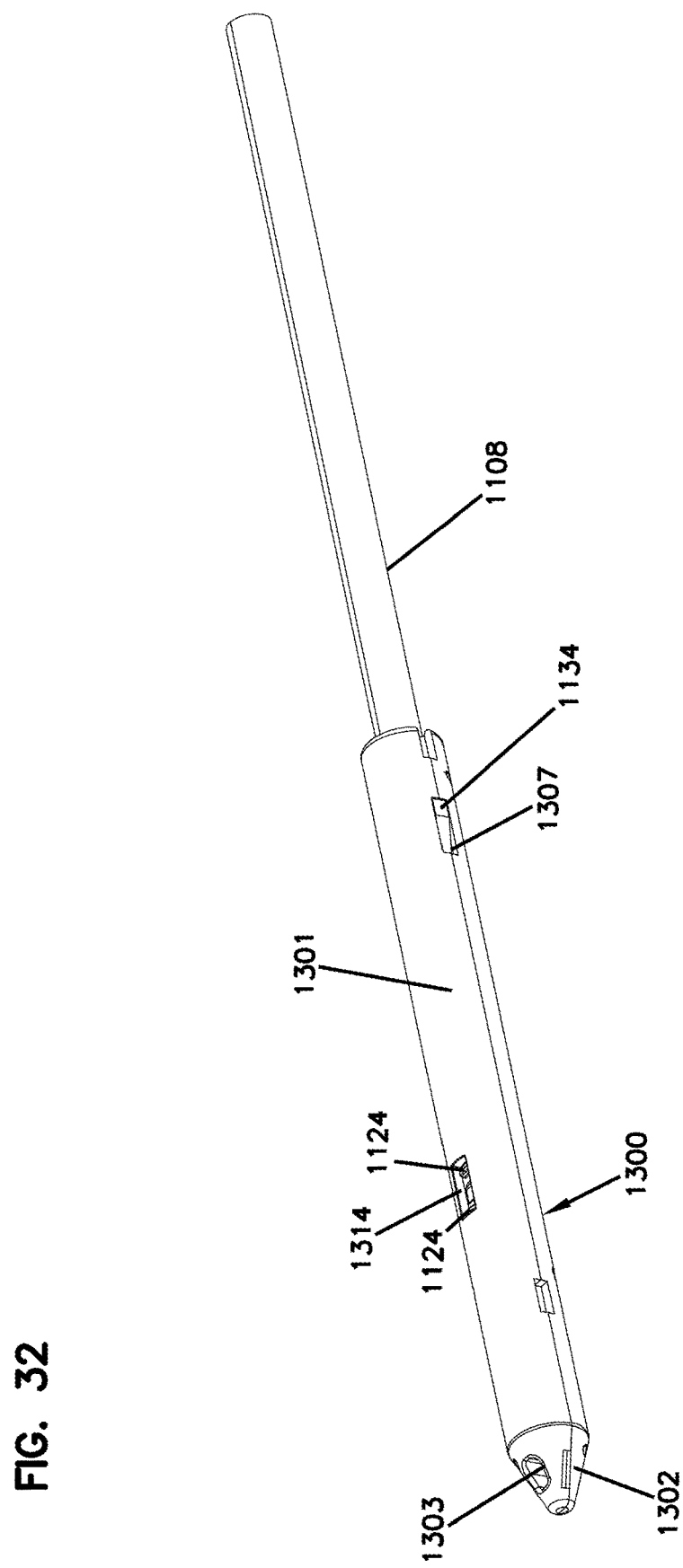
FIG. 32 is a perspective view of an example protective arrangement assembled around the fiber optic arrangement of FIG. 30.

FIGS. 30 and 31 illustrate an example fiber optic arrangement 1100 including a terminated end of an optical cable 1108. A ferrule 1110 holds the distal end of the optical fiber 1105. A ferrule hub 1115 carries the ferrule 1110. A keying member 1120 and a spring 1119 can be disposed at the ferrule hub 1115. An anchor member 1130 can be mounted to the cable 1108 to form a demarcation point at which pulling on one side of the optical fiber will not affect the other side.

To install the fiber optic arrangement 1100, the fiber optic arrangement 1100 is pulled through a hole, duct, or other path to a connection destination. A connector body is assembled around the fiber optic arrangement 1100 at the connector destination. In an example, the first end 1101 of the fiber optic arrangement 1100 is connectorized with an SC connector. In other implementations, however, the first end 1101 of the fiber optic arrangement 1100 can be connectorized with an LC connector, an ST connector, an FC connector, an LX.5 connector, or any other desired connector. The assembled connector body is plugged into a port at the connection destination.

In certain implementations, the hole, duct, or other path through which the fiber optic arrangement 1100 is pulled has a maximum internal diameter of no more than 4 mm. In certain implementations, the hole, duct, or other path through which the fiber optic arrangement 1100 is pulled has a maximum internal diameter of no more than 4.1 mm. In certain implementations, the hole, duct, or other path through which the fiber optic arrangement 1100 is pulled has a maximum internal diameter of no more than 4.2 mm. In certain implementations, the hole, duct, or other path through which the fiber optic arrangement 1100 is pulled has a maximum internal diameter of no more than 3.9 mm. In certain implementations, the hole, duct, or other path through which the fiber optic arrangement 1100 is pulled has a maximum internal diameter of no more than 3.8 mm. In certain implementations, the hole, duct, or other path through which the fiber optic arrangement 1100 is pulled has a maximum internal diameter of no more than 3.7 mm. In certain implementations, the hole, duct, or other path through which the fiber optic arrangement 1100 is pulled has a maximum internal diameter of no more than 4.3 mm. In certain implementations, the hole, duct, or other path through which the fiber optic arrangement 1100 is pulled has a maximum internal diameter of no more than 4.4 mm. In certain implementations, the hole, duct, or other path through which the fiber optic arrangement 1100 is pulled has a maximum internal diameter of no more than 4.5 mm.

In some implementations, the fiber optic arrangement 1100 has a largest outer diameter of no more than 4 mm. In some implementations, the ferrule hub 1115 defines the largest outer diameter of any part of the fiber optic arrangement 1100. In other implementations, the anchor member 1130 defines the largest outer diameter of any part of the fiber optic arrangement 1100. In certain implementations, the fiber optic arrangement 1100 has a largest outer diameter of no more than 3.8 mm. In certain implementations, the fiber optic arrangement 1100 has a largest outer diameter of no more than 3.7 mm. In certain implementations, the fiber optic arrangement 1100 has a largest outer diameter of no more than 3.6 mm. In certain implementations, the fiber optic arrangement 1100 has a largest outer diameter of no more than 3.5 mm.

To assemble the fiber optic arrangement 1100, a distal portion of a jacket 1107 is stripped from an optical fiber 1108 so that an optical fiber 1105 extends distally from the terminated jacket 1107. In certain examples, a layer of tensile strength members (e.g., aramid yarn) may be disposed between the optical fiber 1105 and the jacket 1107. In such examples, the tensile strength layer is terminated and the optical fiber 1105 extends a distance beyond the tensile strength layer.

An anchor member 1130 is disposed about the terminated end of the jacket 1107. In certain implementations, ends of the tensile strength layer extend past the jacket 1107, wrap around over the jacket 1107, and are covered by the anchor member 1130. In certain examples, epoxy or other adhesive can be applied to secure the anchor member 1130 to the jacket 1107 and/or to the tensile strength layer. In an example, the adhesive also axially fixes the optical fiber 1105 relative to the anchor member 1130. Accordingly, the anchor member 1130 may form a demarcation point along the cable 1108.

In certain examples, the anchor member 1130 includes an end face 1131 through which the optical fiber 1105 extends and a peripheral wall 1132 extending proximal of the end face 1131. A slot 1133 extends axially along the peripheral wall 1132 to provide access to a passageway therethrough. The slot 1133 also extends through the end face 1131. Accordingly, the anchor member 1130 can be installed on the cable 1108 by passing the optical fiber 1105 through the slot 1133 and then sliding the anchor member 1130 backwards onto the terminated end of the jacket 1107.

In certain implementations, the anchor member 1130 includes one or more tabs 1134 that each define a ramp surface 1135 and a shoulder 1136. In the example shown, each tab 1134 has a distal facing ramp 1135 and a proximal facing shoulder 1136. In certain examples, the anchor member 1130 has two tabs spaced 180° apart on the peripheral wall 1132. In certain examples, the anchor member 1130 includes a tapered support flange 1138 extending distally from the end face 1131 of the anchor member 1130. The optical fiber 1105 extends along and may be supported by the support flange 1138.

The distal end of the fiber 1105 is polished and inserted into a ferrule 1110. The fiber 1105 and/or the ferrule 1110 are tuned and cleaned. A dust cap 1111 covers an end face of the ferrule 1110 and an end face of the optical fiber 1105. In certain examples, the optical fiber tip and ferrule 1110 are cleaned and the dust cap 1111 is disposed over the distal of the ferrule 1110 to cover the fiber tip. In an example, the dust cap 1111 is friction fit to the ferrule 1110 in an axially fixed position until a predetermine amount of axial force is applied to the dust cap 1111. In certain implementations, the fiber processing procedure, from insertion of the fiber into the ferrule to mounting the dust cap, occurs in a factory. The dust cap 1111 maintains the cleanliness of the fiber tip during shipping and installation.

The dust cap 1111 includes a main body 1112 covering at least the distal of the ferrule 1110. A necked down portion 1113 of the main body 1112 steps or tapers radially inwardly to define an annular groove. A distal portion 1114 of the main body 1112 steps or tapers radially outwardly to define a pulling stop. In other implementations, the distal of the dust cap 1111 can define a hook or loop.

The ferrule 1110 is coupled to and/or carried by the hub 1115. As shown in FIG. 31, the hub 1115 has a first portion 1116, a second portion 1117, and a third portion 1118. The first portion 1116 is the widest portion of the hub 1115. The first portion 1116 has at least one multiple flat surface. In the example shown, the first portion 1116 includes six flat surfaces. In certain examples, one of the flat surfaces can be marked once the fiber 1105 and/or ferrule 1110 is tuned to indicate a core concentricity of the fiber 1105 and/or ferrule 1110.

The second portion 1117 is located between the first portion 1116 and the third portion 1118. The second portion 1117 defines a key for mating with a keying member 1120. In the example shown, the second portion 1117 also defines at least one flat surface. In the example shown, the second portion 1117 defines six flat surfaces. In certain examples, cross-dimensions of the second portion 1117 are smaller than cross-dimensions of the first portion 1116. In certain examples, an axial length of the second portion 1117 is longer than an axial length of the first portion 1116.

The third portion 1118 is proximal of the second portion 1117. The third portion 1118 has a cross-dimension that is smaller than the cross-dimensions of the second portion 1117. In the example shown, the third portion 1118 is tubular. In other examples, however, the third portion 1118 can have other shapes. A resilient member (e.g., a coil spring) 1119 mounts over the third portion 1118. In certain examples, the third portion 1118 of the hub 1115 is sufficiently long to support the spring 1119.

The keying member 1120 can be mounted over the second portion 1117 of the hub 1115. The keying member 1120 includes a body 1121 defining a keyway interior 1122 that mates with the key of the second portion 1117 of the ferrule hub 1115. In the example shown, the keyway interior of the keying member 1120 defines a hex shape that matches the hex shape of the second portion 1117 of the hub 1115. Accordingly, the keying member 1120 is rotationally fixed relative to the second portion 1117 when mounted over the second portion 1117.

In certain implementations, the body 1121 defines a slot 1123 sized to enable the fiber 1105 to pass through the slot 1123 and into the interior of the keying member 1120. Accordingly, the keying member 1120 is mounted to the cable 1108 by sliding the keying member 1120 over the fiber 1105 and sliding the keying member distally over the third portion 1118 of the hub 1115 and onto the second portion 1117. In certain examples, the first portion 1116 of the hub 1115 has a sufficient cross-dimension to inhibit further distal axial passage of the keying member 1120 relative to the hub 1115.

The keying member 1120 also includes one or more stop members 1124 extending radially outwardly from the body 1121. In the example shown, the keying member 1120 includes a distal stop member 1124a and a proximal stop member 1124b that are spaced apart along an axial length of the keying member 1120. In certain implementations, each stop member 1124 has an outer ramp surface 1125 and an inwardly facing shoulder 1126. The shoulders 1126 of the stop members 1124a, 1124b face each other. In certain implementations, a recessed detent 1127 is disposed between the two stop members 1124.

The fiber optic arrangement 1100 can be coiled, boxed, or otherwise stored or packaged until installation is desired. In some implementations, to install the fiber optic arrangement 1100 (e.g., at a dwelling), a pulling lead can be secured to the dust cap 1111. For example, the pulling lead can be wrapped around and secured at the groove defined at the necked down portion 1113 of the dust cap 1111. Pulling on the pulling lead causes the pulling lead to abut the pulling stop 1114, thereby pulling the fiber optic arrangement 1100. Accordingly, the pulling lead can be utilized to pull the fiber optic arrangement 1100 through a hole, duct, or other path.

Alternatively, a protective arrangement 1300 can be mounted around the fiber optic arrangement 1100. The protective arrangement 1300 can then be pulled or pushed through the duct. In certain implementations, the protective arrangement includes a main body 1301 and a tapered distal end 1302 that defines an aperture 1303. A wire, string, or other pulling member is attached to the protective arrangement 1300 through the aperture 1303 (e.g., looped or hooked through).

In certain implementations, the protective arrangement 1300 includes a first housing piece 1310 and a second housing piece 1310 that cooperate to enclose the fiber optic arrangement 1100. In the example shown, the first and second housing pieces are identical. In certain implementations, the first and second housing pieces 1310 include mating alignment members (e.g., pegs and holes) to aid in aligning the first and second housing pieces 1310.

The protective arrangement 1300 is configured to hold the components of the fiber optic arrangement 1100 in axially fixed positions relative to each other and relative to the protective arrangement 1300 during installation. In certain implementations, the protective arrangement 1300 also is configured to hold the fiber optic arrangement 1100 in a rotationally fixed position relative to the protective arrangement 1300 during installation.

Figure 33:
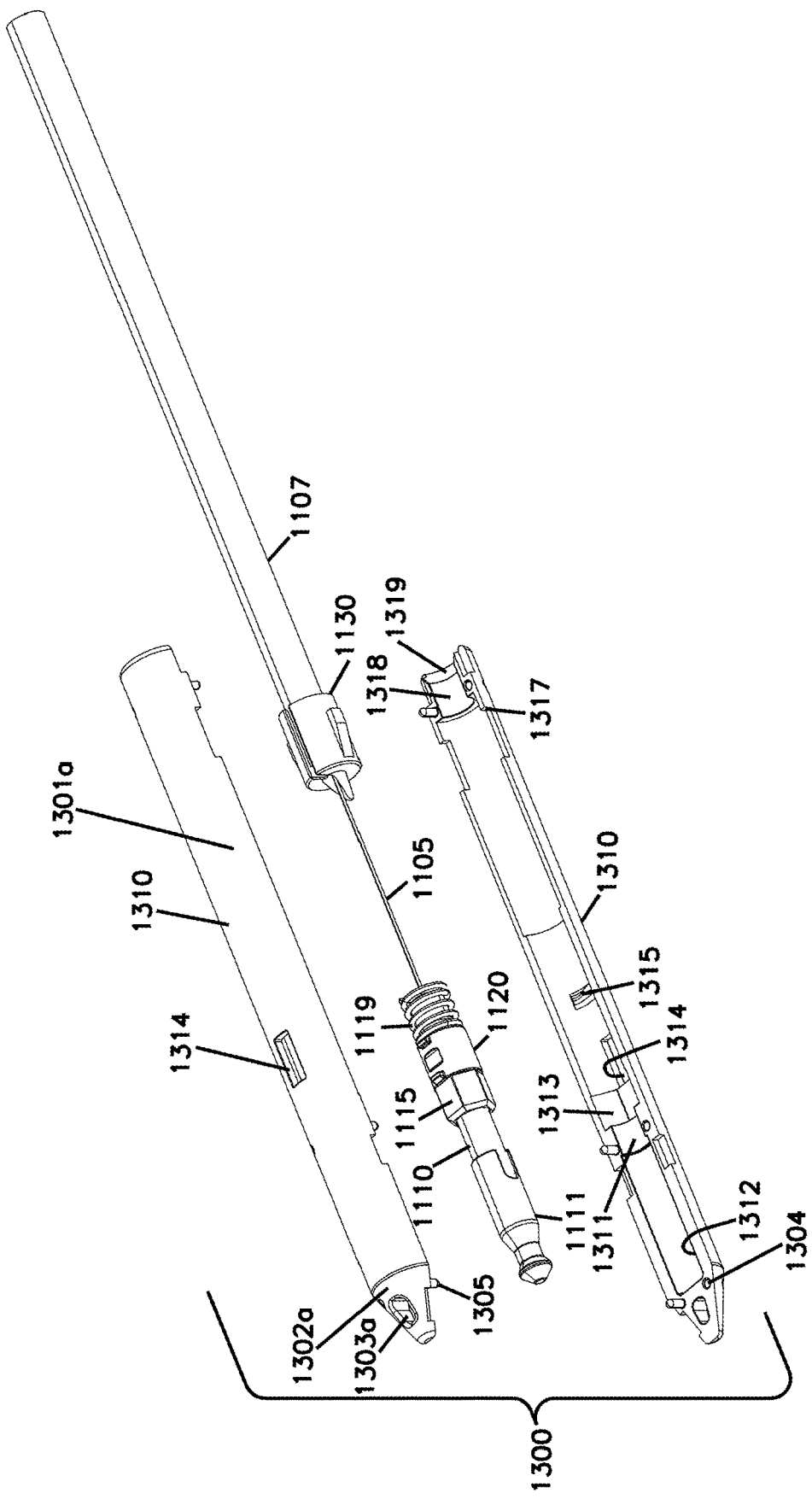
FIG. 33 shows the pieces of the protective arrangement of FIG. 32 exploded away from the fiber optic arrangement.
Figure 34:
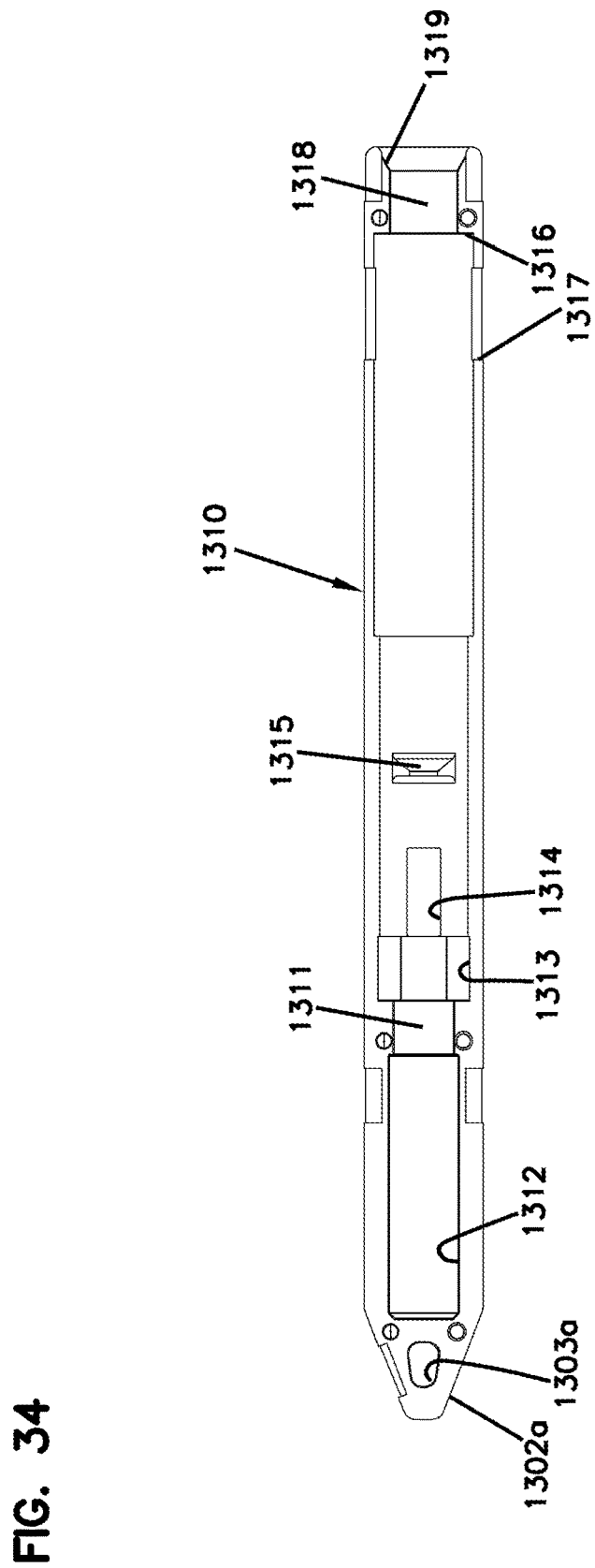
FIG. 34 is a plan view of a piece of the protective arrangement of FIG. 33.

FIGS. 33 and 34 illustrate an example housing piece 1310 defining a platform 1311 sized and shaped to support part of the ferrule 1110 of the fiber optic arrangement 1100. A portion of the housing piece 1310 distal of the platform 1311 defines a cavity sized to accommodate the dust cap 1111 over another part of the ferrule 1110. The opposite end of the housing piece 1310 defines a second platform 1318 configured to support part of the jacketed cable 1108. An outward taper 1319 distal of the second platform 1318 protects the cable 1108 when the cable 1108 bends relative to the protective arrangement 1300. In certain examples, the first and second housing pieces 1310 clamp the ferrule 1110 and cable 1108 between the platforms 1311, 1318 when assembled together.

Figure 35:
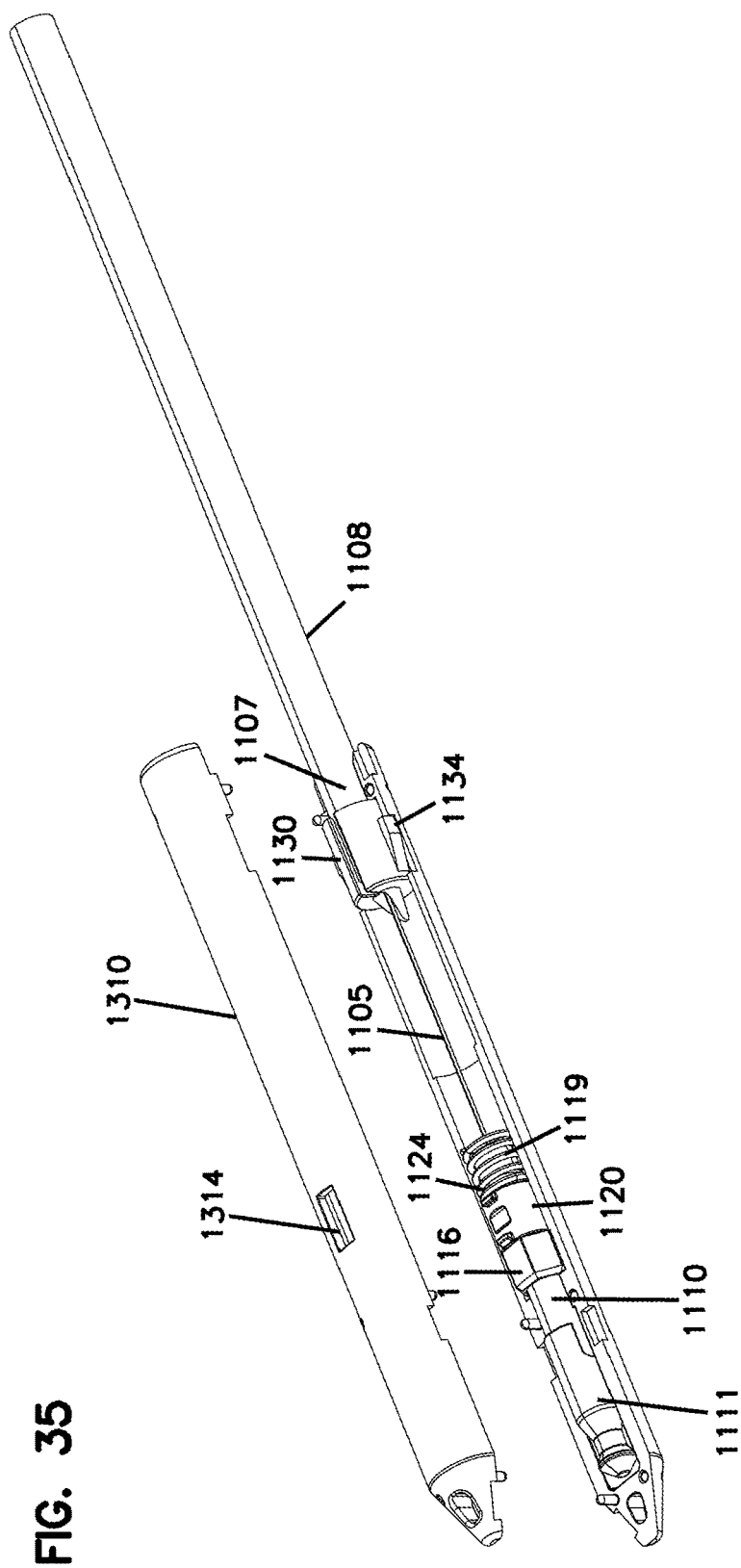
FIG. 35 shows the protective arrangement of FIG. 32 partially assembled around the fiber optic arrangement of FIG. 30.
Figure 36:
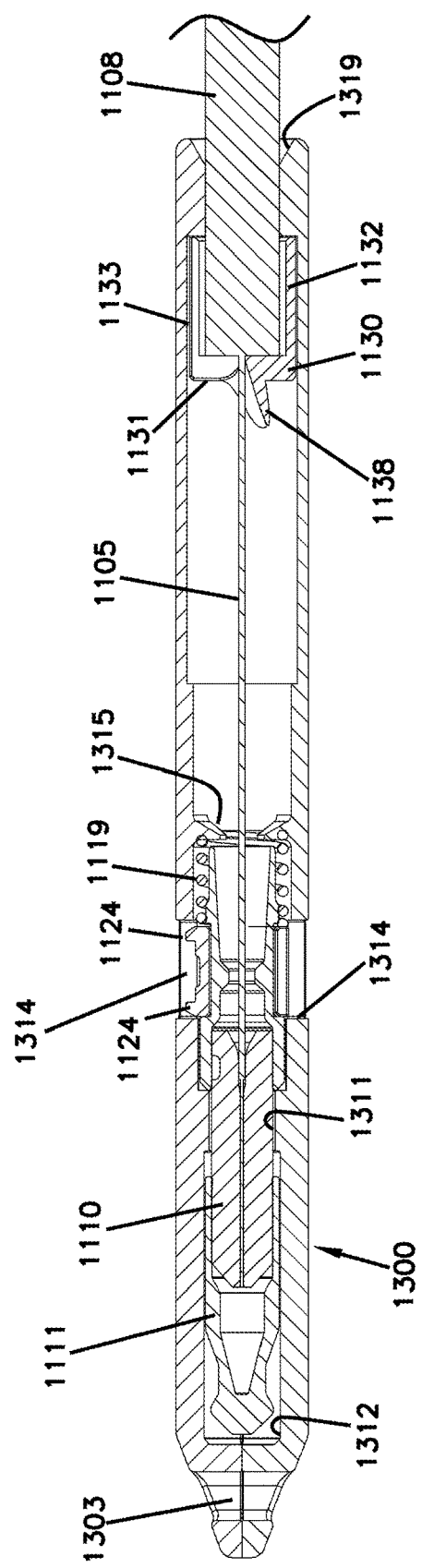
FIG. 36 is an axial cross-sectional view of the protective arrangement and fiber optic arrangement of FIG. 32.

A portion of the housing piece 1310 proximal of the platform 1311 defines a hub receiving pocket 1313. In certain examples, the pocket 1313 can be shaped to mate with the first portion 1116 of the hub 1115. In the example shown, the pocket 1313 has three flat sides that match with three of the flats of the first portion 1116 of the hub 1115. Accordingly, the pocket 1313 may inhibit rotation of the hub 1115 relative to the housing piece 1310. As shown in FIG. 33, a transition between the pocket 1313 and the first platform 1311 may inhibit distal axial movement of the first portion 1116 of the hub 1115 relative to the housing piece 1310. As shown in FIG. 35, the second platform 1318 also can aid in retaining the anchor member 1130 against proximal axial movement relative to the protective arrangement 1300.

Certain types of housing pieces 1310 also define slots 1314 for accommodating the tabs 1124 of the keying member 1120 carried by the second portion 1117 of the hub 1115. The distal tab 1124a fits at the distal end of the slot 1134 and the proximal tab 1124b fits at the proximal end of the slot 1134. The slot 1314 is sized to inhibit axial movement of the tabs 1124 (and hence the keying member 1120) relative to the slot 1134. Accordingly, interaction between the keying member 1120 and the housing piece 1310 further inhibits axial movement of the fiber optic arrangement 1100 relative to the protective arrangement 1300.

Certain types of housing pieces 1310 also define a spring pocket 1315 in which a portion of the spring 1119 is disposed. The spring pocket 1315 engages at least a portion of the spring 1119 to inhibit axial movement of the spring 1119 relative to the housing piece 1310.

Certain types of protective arrangements 1300 are configured to axially retain the anchor member 1130 in a fixed position relative to the hub 1115. In certain implementations, a protective arrangement 1300 may have one or more windows 1307 at each of which a tab 1134 of the anchor member 1130 can be received (see FIG. 32). In some examples, each housing piece 1310 defines a window 1307. In other examples, each housing piece 1310 defines a portion 1317 of one or more windows 1307.

FIGS. 37-43 illustrate assembling a fiber optic connector 1190 over the fiber optic arrangement 1100 when the fiber optic arrangement 1100 arrives at the connection destination. The protective arrangement 1300 is removed from the fiber optic arrangement 1100. Components of the fiber optic connector 1190 are assembled around the fiber optic arrangement 1100. The components of the fiber optic connector 1190 include a proximal connector housing 1140, distal connector housing 1150, and a strain relief boot 1170. In certain examples (e.g., an SC connector), a grip body 1160 can be mounted over the distal connector housing 1150.

The strain-relief boot 1170 extends from a distal end 1172 to a proximal end 1173. The distal portion 1171 of the strain-relief boot 1170 is configured to mount to the connector 1190 (e.g., to the proximal connector body 1140). The proximal portion 1174 of the boot 1170 tapers to meet the periphery of the cable 1108. The proximal portion 1174 is more flexible than the distal portion 1171. In certain examples, the proximal portion 1174 is slotted to enhance lateral flexibility.

Figure 37:
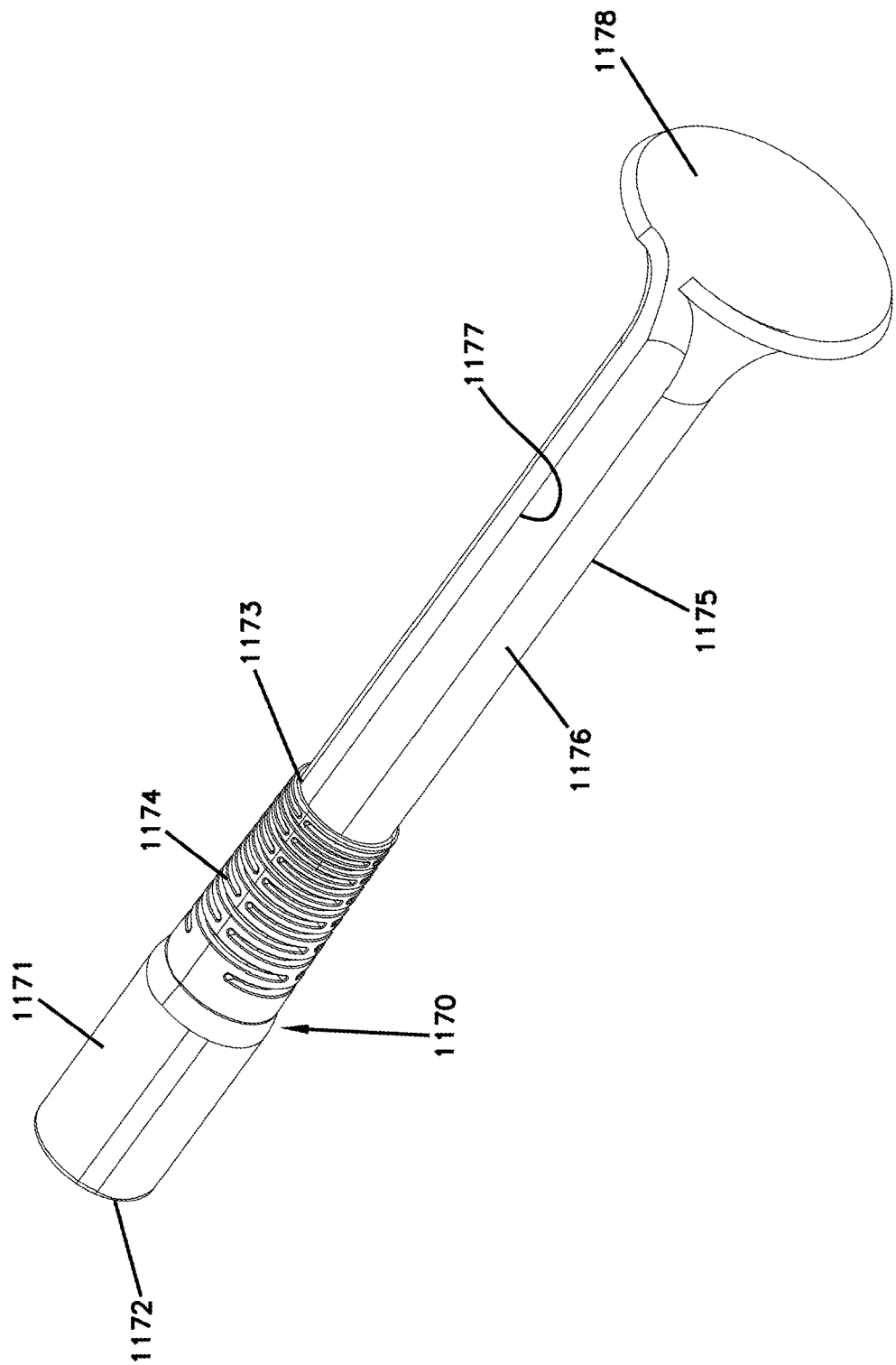
FIG. 37 illustrates a spreader opening the proximal end of an example strain-relief boot.

As shown in FIG. 37, the strain-relief boot 1170 is prepared for mounting over the cable 1108 by inserting a spreader 1175 into the proximal end 1173 of the strain-relief boot 1170. In the example shown, the spreader 1175 has a body 1176 defining an axial slot 1177 providing access to a through-passage through the body 1176. The slot 1177 allows the body 1176 to be radially collapsed sufficient to fit within the proximal end 1173 of the boot 1170. The proximal end 1178 of the body 1176 tapers radially outwardly to define a trumpet shape. The fiber optic arrangement 1100 can be inserted into the spreader 1175 through the trumpet 1178 and can be threaded through the boot 1170 until the boot 1170 is disposed over the cable 1108 proximal of the fiber optic arrangement 1100.

Next, the proximal housing 1140 can be installed over the fiber optic arrangement 1100. The proximal housing 1140 engages the anchor member 1130 to axially and rotationally retain the anchor member 1130 relative to the proximal housing 1140. The proximal housing 1140 also engages the key member 1120 to rotationally retain the keying member 1120 (and hence the hub 1115) relative to the proximal housing 1140. In certain implementations, the proximal housing 1140 also axially limits movement of the hub 1115 and ferrule 1110 relative to the proximal housing 1140.

Figure 38:
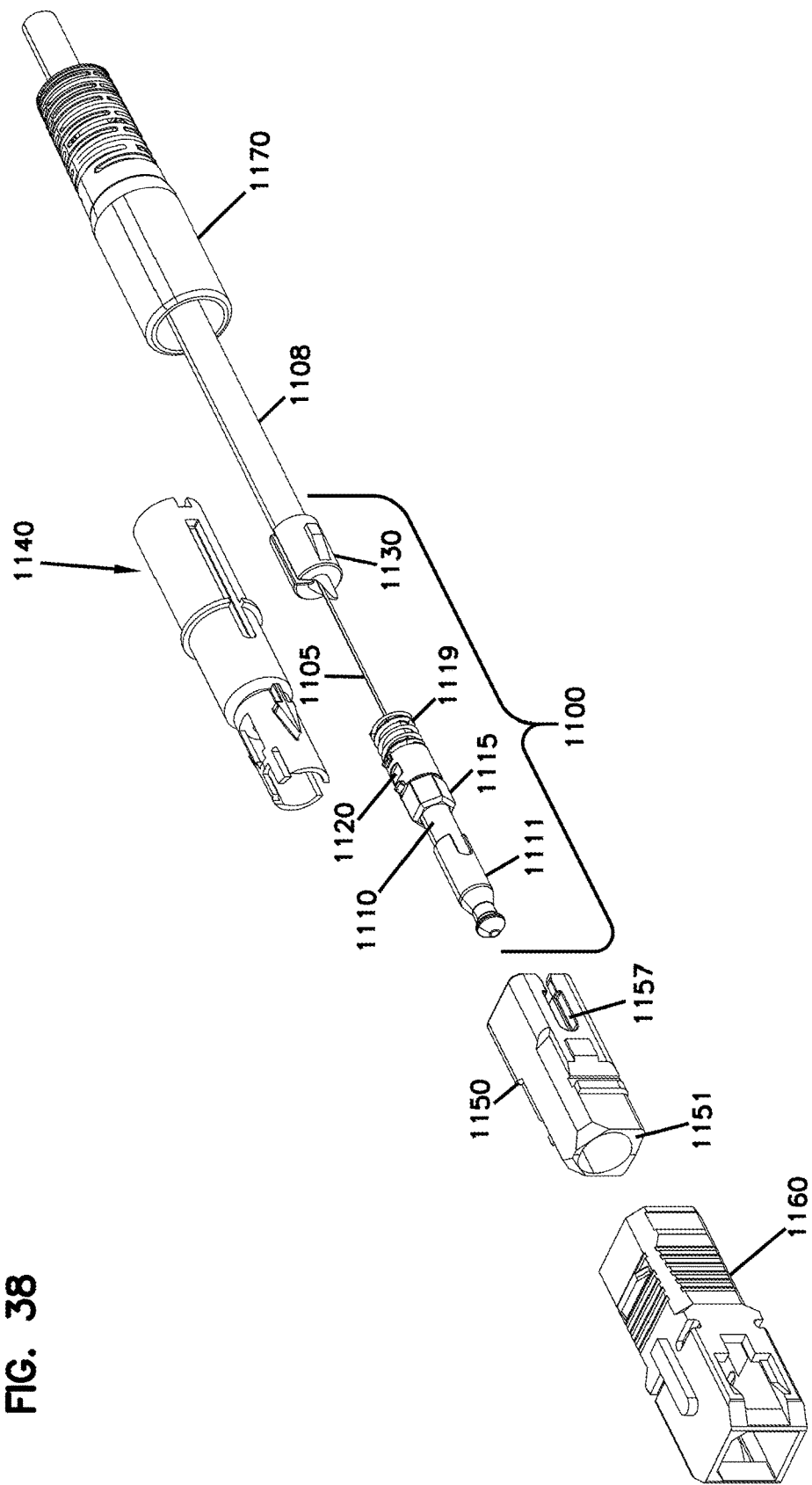
FIG. 38 is a perspective view of an example connector including a distal housing and a proximal housing, the view showing the components of the connector exploded away from the fiber optic arrangement of FIG. 32.
Figure 39:
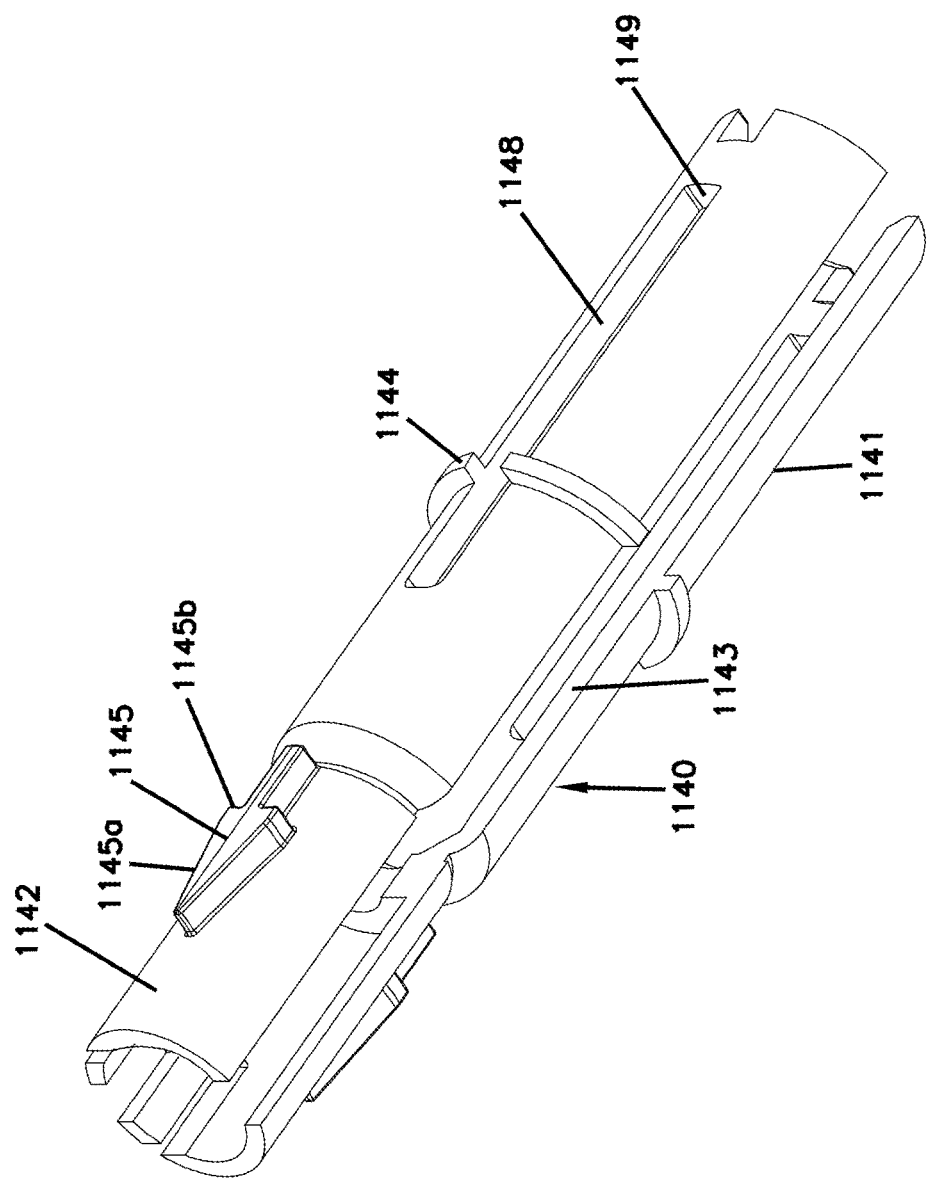
FIG. 39 is a perspective view of the proximal housing of FIG. 38.
Figure 40:
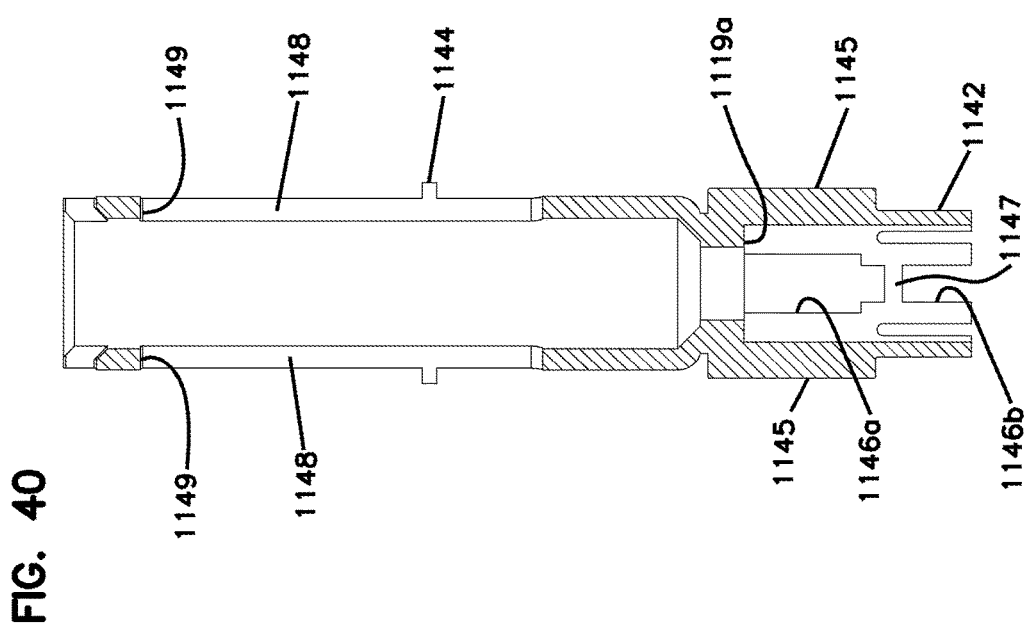
FIG. 40 is an axial cross-section of the proximal housing of FIG. 39.

FIGS. 38-40 illustrate an example proximal housing 1140 suitable for use with the fiber optic arrangement 1100. The proximal housing 1140 has a proximal body portion 1141 and a distal body portion 1142. A cross-dimension of the distal body portion 1142 is less than a cross-dimension of the proximal body portion 1141. The transition region between the proximal and distal body portions 1141, 1142 can be a taper, a radial step, or a contoured surface. An axial slot 1143 runs along the length of the proximal housing 1140 including along both the proximal body portion 1141 and the distal body portion 1142.

In certain implementations, the proximal housing 1140 has a radial flange 1144. In certain implementations, the radial flange 1144 is disposed on the proximal body portion 1141. In certain examples, the radial flange 1144 is disposed on the proximal body portion 1141 offset inwardly from the proximal end of the proximal housing 1140.

In certain implementations, the proximal housing 1140 includes latch members 1145 configured to hold the proximal housing 1140 to the distal housing 1150. In certain examples, the latch members 1145 are disposed at the distal portion 1142. In the example shown, the proximal housing 1140 has two latch members 1145 on opposite sides of the circumference of the distal portion 1142. In certain examples, the latch members 1145 each have a ramp surface 1145a and a shoulder 1145b. In the example shown, each latch member 1145 has an arrow shape with two ramp surfaces 1145a and two shoulders 1145b. In other examples, the latch members 1145 can have any shape.

In certain implementations, the proximal housing 1140 defines first and second slots 1146a, 1146b separated by an abutment member 1147 (see FIG. 40). The first and second slots 1146a, 1146b are axially aligned. The first slot 1146a is fully bounded around a periphery. The second slot 1146b has an open end at the distal end of the proximal housing 1140. In certain examples, the abutment member 1147 includes a bar extending between the first and second slots

1146*a*, 1146*b*. In the example shown, the second slot 1146*b* is defined between two flanges extending distally from the distal portion 1142 of the proximal housing 1140. In other examples, the second slot 1146*b* can be defined by the distal portion 1142 of the proximal housing 1140.

In certain implementations, the proximal housing 1140 defines one or more axial slots 1148 having distally-facing shoulders 1149 at the proximal ends of the slots 1148. In certain examples, the axial slots 1148 are disposed at opposite sides of the circumference of the proximal portion 1141 of the proximal housing 1140.

During assembly of the connector 1190, the proximal housing 1140 is inserted over the bare optical fiber 1105 by passing the bare optical fiber 1105 through the axial slot 1143. The proximal housing 1140 is moved proximally over the anchor member 1130 until the tabs 1134 of the anchor member 1130 abut the proximal end of the proximal housing 1140. The proximal end of the proximal housing 1140 begins to cam over the ramped surfaces 1135 of the tabs 1134 until the tabs 1134 reach the axial slots 1148. The tabs 1134 snap into the slots 1148 so that the shoulders 1136 of each tab 1134 engages a distal-facing shoulder 1149 of each slot 1148. Accordingly, the proximal housing 1140 limits proximal axial movement of the anchor member 1130 relative to the proximal housing 1140. In certain implementations, the proximal housing 1140 also is configured to limit distal axial movement of the anchor member 1130 relative to the proximal housing 1140.

The proximal housing 1140 also defines an interior spring stop 1119*a* (FIG. 40) against which the spring 1119 can seat the connector 1190 is assembled.

The hub 1115 of the fiber optic arrangement 1100 is aligned with the proximal housing 1140 so that the stop members 1124 of the keying member 1120 align with the second slot 1146*b* of the proximal housing 1140. The hub 1115 is backed into the distal end of the proximal housing 1140 so that the abutment member 1147 cams over the ramped surface of the proximal stop member 1124*b*. When the proximal stop member 1124*b* clears the abutment member 1147, the proximal stop member 1124*b* snaps into the second slot 1146*a*. Accordingly, the first and second slots 1146*a*, 1146*b* enable limited axial movement of the keying member 1120 relative to the proximal housing 1140.

The keying member 1120 can move between a first position in which the shoulder of the proximal stop member 1124*b* engages the abutment member 1147 and a second position in which the shoulder of the distal stop member 1124 engages the abutment member 1147. The spring 1119 biases the hub 1115 distally relative to the proximal member 1140 so that the shoulder of the proximal stop member 1124*b* engages the abutment member 1147. When the connector 1190 is optically coupled to another connector, the ferrule 1110 and hub 1115 may be pushed in the proximal direction against the bias of the spring 1119, but not beyond the second position.

Figure 41:
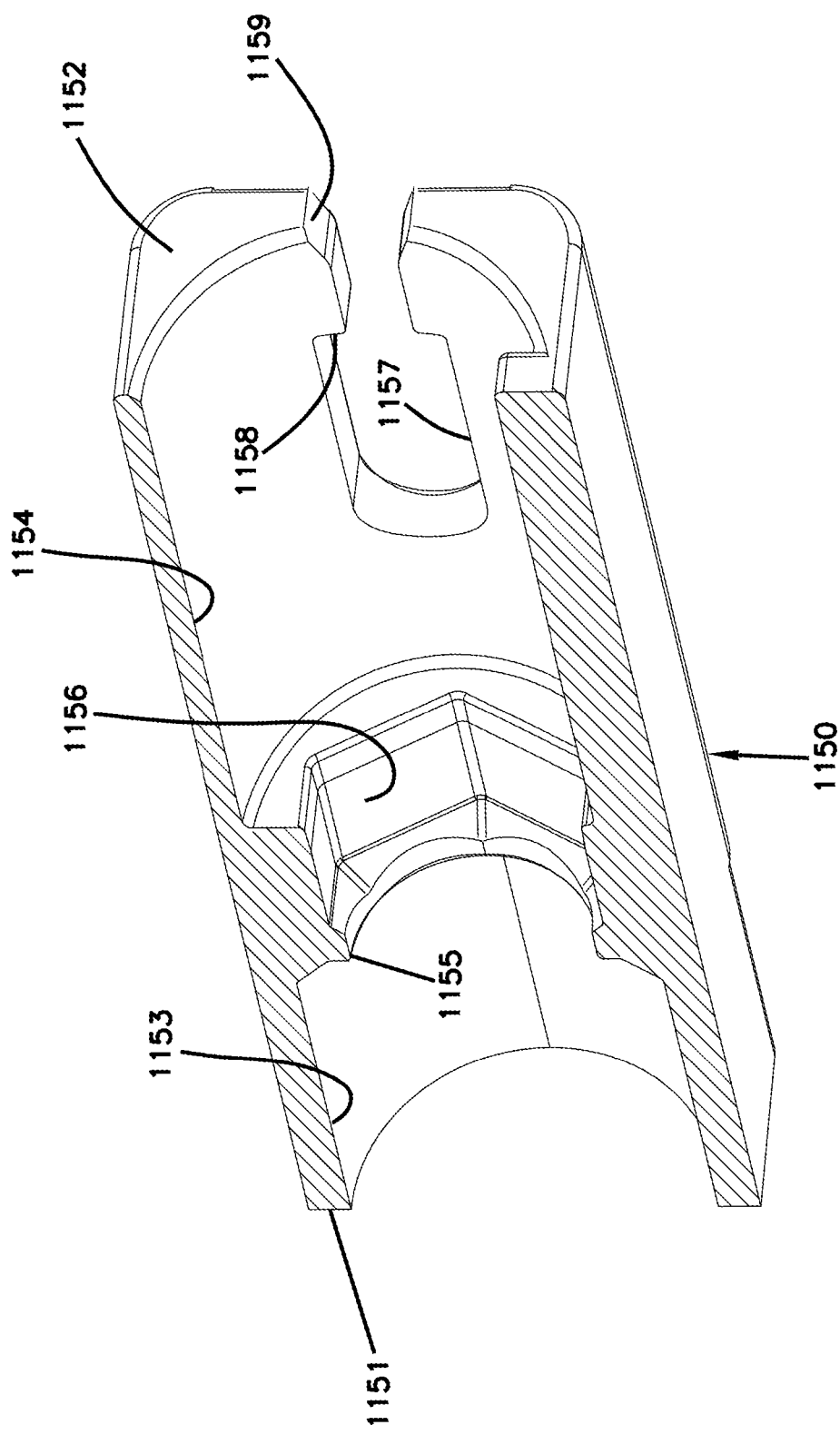
FIG. 41 is an axial cross-section of the distal housing of FIG. 38.
Figure 42:
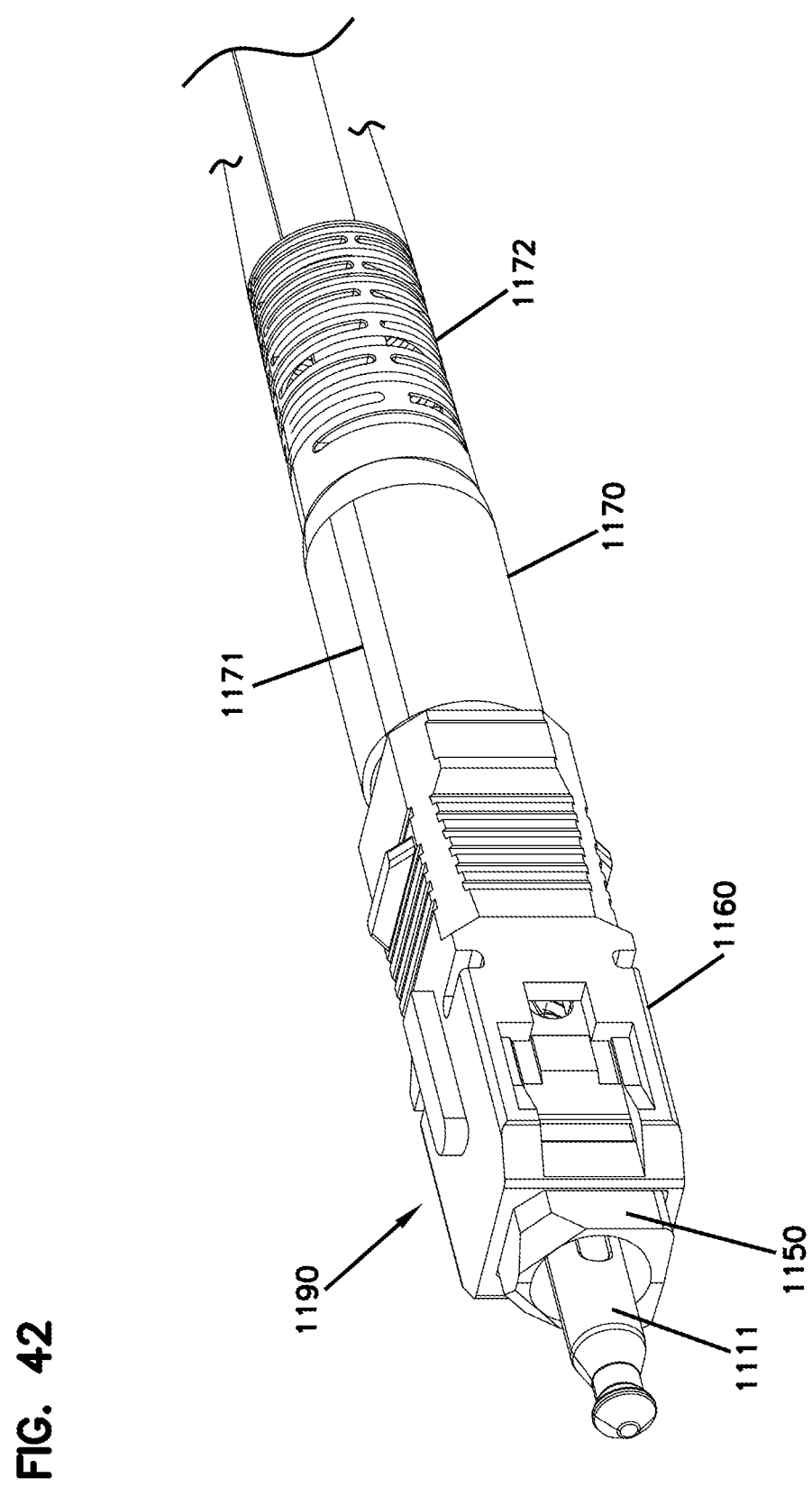
FIG. 42 is a perspective view of the assembled optical connector of FIG. 38.
Figure 43:
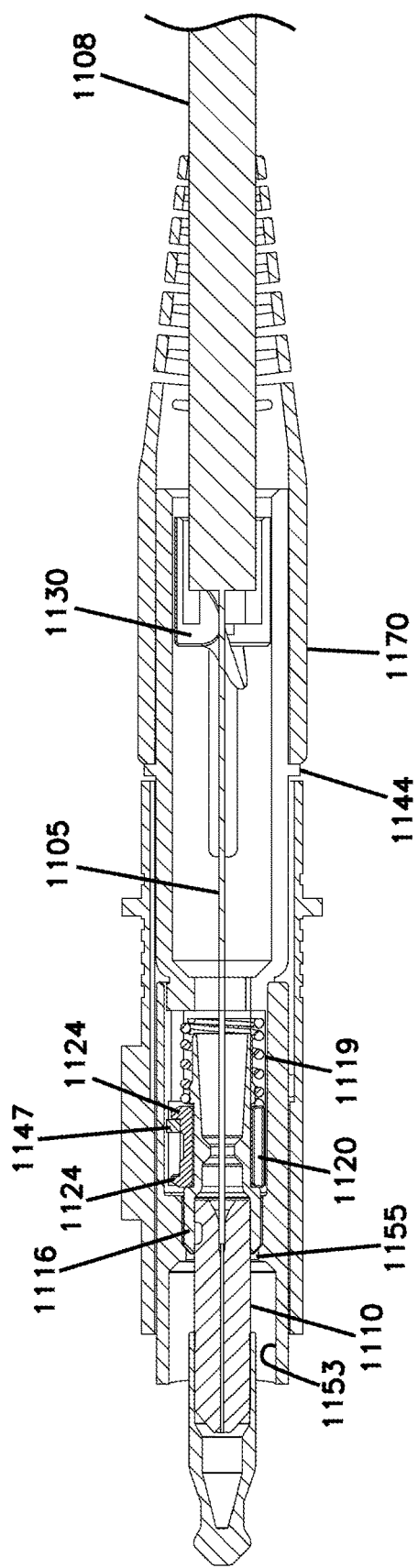
FIG. 43 is an axial cross-sectional view of the assembled optical connector of FIG. 42.

FIGS. 38 and 41 illustrate an example distal housing 1150 extending from a distal end 1151 to a proximal end 1152. The distal housing 1150 defines a distal interior portion 1153 and a proximal interior portion 1154 separated by a reduced diameter passage 1155. The distal housing 1150 also defines an interior keying region 1156 configured to receive the first portion 1116 of the hub 1115 of the fiber optic arrangement 1100. In certain examples, the keying region 1156 of the distal housing 1150 defines a plurality of flat surfaces. In the example shown, the keying region 1156 has a hex shape.

During assembly, the fiber optic arrangement 1100 is inserted into the proximal end 1152 of the distal housing 1150 until the first portion 1116 of the hub 1115 reaches the keying region 1156. The ferrule 1110 extends through the reduced diameter passage 1155 and into the distal interior portion 1153. In an example, a distal end of the ferrule 1110 extends distally beyond the distal end 1151 of the distal housing 1150. The reduced diameter passage 1155 inhibits distal axial movement of the hub 1115 relative to the distal housing 1150. The engagement between the distal portion 1116 of the hub 1115 and the keying region 1156 of the distal housing 1150 inhibits rotational movement of the hub 1115 relative to the distal housing 1150. In certain examples, the shape of the keying region 1156 also limits the number of rotational positions in which the hub 1115 can be inserted into the distal housing 1150.

The proximal interior portion 1154 of the distal housing 1150 is sized to accommodate the keying member 1120 carried by the hub 1115. In certain implementations, the proximal interior portion 1154 is shaped to accommodate the keying member 1120 in only one rotational orientation. For example, as shown in FIG. 41, the proximal interior portion 1154 may provide sufficient room for the stop members 1124 of the keying member 1120 at one side and not at the opposite side (e.g., see FIG. 41). Accordingly, the proximal interior portion 1154 further limits the number of rotational positions in which the hub 1115 can be inserted into the distal housing 1150.

The distal housing 1150 also defines slots 1157 at which to receive the latch members 1145 of the proximal housing 1140. Each slot 1157 has a distal-facing shoulder 1158. A reduced width slit 1159 leads from the proximal end 1152 of the distal housing 1150 to each slot 1157. The slit 1159 may taper outwardly at the proximal end 1152 to facilitate insertion of the latch member 1145 into the slit 1159.

During assembly of the connector 1190, the proximal housing 1140 is connected to the distal housing 1150. In certain implementations, the distal portion 1142 of the proximal housing 1140 is sized to be inserted into the proximal interior portion 1154 of the distal housing 1150. The tabs 1145 of the proximal housing 1140 enter the slits 1159 of the distal housing 1150 and pass into the slots 1157 until the shoulders 1145*b* of the tabs 1145 engage the distal-facing shoulders 1158 of the slots 1157. Engagement between the shoulders 1145*b* and the shoulders 1158 inhibit proximal axial movement of the proximal housing 1140 relative to the distal housing 1150.

When the fiber optic arrangement 1100 is sandwiched between the distal and s 1150, 1140, the strain-relief boot 1170 can be mounted over the proximal housing 1140. In certain implementations, the spreader 1175 is still holding open the proximal end 1173 of the boot 1170. The boot 1170 is moved distally until the distal portion 1171 of the boot 1170 is mounted over a portion of the proximal body portion 1141 of the proximal housing 1140. In certain implementations, the boot 1170 is moved distally over the proximal body portion 1141 until the boot 1170 reaches the radial flange 1144 of the proximal housing 1140. When the boot 1170 is properly positioned relative to the proximal housing 1140, the spreader 1175 is removed from the proximal end 1173 of the boot 1170. The proximal portion 1174 resiliently returns to its default shape, which tapers down to the width of the cable 1108.

In certain implementations, a grip member 1160 can be installed over the distal housing 1140. In some examples, the grip 1160 is mounted to the distal housing 1140 prior to assembly of the distal and s 1150, 1140. In other examples, the grip 1160 is mounted to the distal housing 1140 after assembly of the distal and s 1150, 1140.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A factory assembled optical fiber arrangement comprising:
   an optical ferrule extending from a first end to a second end;
   an optical fiber having a first end defining a fiber tip, the optical fiber extending through the optical ferrule from the second end to the first end, the fiber tip being accessible from the first end of the optical ferrule, the fiber tip being polished, the fiber tip being tuned relative to the optical ferrule;
   a ferrule hub coupled to the second end of the ferrule, the ferrule hub having a forward portion and a rearward portion, the forward portion defining flat surfaces around a circumference of the ferrule hub, one of the flat surfaces being marked to indicate a tuning orientation of the optical fiber tip, the forward portion having a largest outer diameter of no more than 4 mm; and
   a dust cap mounted to the first end of the optical ferrule to cover the fiber tip, the dust cap physically contacting the optical ferrule and not physically contacting the ferrule hub, the dust cap having a largest outer diameter that is less than 4 mm, the dust cap being configured to receive a pulling lead, the dust cap including a necked down portion around which the pulling lead can be attached.

2. The factory assembled optical fiber arrangement of claim 1, wherein the forward portion of the ferrule hub transitions to the rearward portion at a radial step.

3. The factory assembled optical fiber arrangement of claim 1, wherein the optical fiber is surrounded by a strength layer and a jacket, wherein the strength layer is secured to the optical ferrule using epoxy.

4. The factory assembled optical fiber arrangement of claim 1, wherein the optical fiber is surrounded by a strength layer and a jacket, wherein the strength layer is secured to a cable anchor using epoxy.

5. The factory assembled optical fiber arrangement of claim 1, further comprising a protective arrangement defining a cavity in which the optical ferrule, ferrule hub, and dust cap are disposed, the protective arrangement defining a tapered nose.

6. The factory assembled optical fiber arrangement of claim 5, wherein the protective arrangement is configured to be pushed through a duct.

7. The factory assembled optical fiber arrangement of claim 5, wherein the protective arrangement is configured to be pulled through a duct.

8. A fiber optic arrangement comprising:
   an optical cable having a fiber, a strength layer, and a jacket surrounding the fiber and the strength layer, the jacket being terminated so that a portion of the fiber is exposed, the portion of the fiber having a prepared fiber tip spaced from the terminated jacket;
   an optical ferrule arrangement holding the prepared fiber tip at a location spaced along the fiber from the terminated jacket, the optical ferrule arrangement also including a hub;
   a keying member installed on the hub in a particular rotational orientation based on a tuning analysis, the keying member including a key to inhibit rotation of the keying member relative to the hub; and
   a cable anchor mounted over the cable at the terminated jacket, the cable anchor being spaced along the optical fiber from the optical ferrule arrangement, the cable anchor having a radially extending end wall and an annular wall extending axially from the end wall, the end wall defining an aperture through which the fiber extends, the annular wall extending over the jacket of the optical cable, the annular wall including a tab defining a shoulder facing away from the optical ferrule arrangement.

9. The fiber optic arrangement as claimed in claim 8, further comprising a protective arrangement defining an interior in which the optical ferrule arrangement, the keying member, and the cable anchor are disposed, the protective arrangement defining a window sized to receive the tab of the cable anchor to inhibit axial movement of the cable anchor relative to the protective arrangement in a first direction, the protective arrangement also defining an interior shoulder that inhibits axial movement of the cable anchor relative to the protective arrangement in a second direction that is opposite the first direction.

10. The fiber optic arrangement as claimed in claim 9, further comprising a spring disposed over the hub.

11. The fiber optic arrangement as claimed in claim 10, wherein the protective arrangement defines a groove to receive a portion of the spring to inhibit axial movement of the spring relative to the protective arrangement.

12. The fiber optic arrangement as claimed in claim 9, wherein the protective arrangement includes a plurality of housing pieces that cooperate to define the interior.

13. The fiber optic arrangement as claimed in claim 12, wherein the housing pieces include a first housing piece and a second housing piece that are identical, wherein each of the first and second housing pieces defines an aperture that aligns with the aperture of the other housing piece to define an attachment aperture at one end of the protective arrangement.

14. The fiber optic arrangement as claimed in claim 8, wherein the key includes two spaced apart stop members.

15. The fiber optic arrangement as claimed in claim 9, wherein the protective arrangement defines a keyed region configured to receive a keyed portion of the hub to inhibit rotation of the optical ferrule arrangement relative to the protective arrangement.

16. A fiber optic connector comprising:
   a distal housing defining a proximal interior portion and a distal interior portion, the proximal interior portion defining a keyed region, the distal housing defining slots with proximal open ends;
   a proximal housing having a proximal portion and a distal portion, the distal portion sized to fit within the proximal interior portion of the distal housing, the proximal housing including tabs that fit within the slots of the distal housing to retain the proximal housing at the distal housing;
   a ferrule hub disposed within the proximal interior portion of the distal housing and within the distal portion of the proximal housing, the ferrule hub including a first keyed portion, a second portion, and a spring support portion offset from each other along a length of the ferrule hub, the first keyed portion mating with the keyed region of the distal housing;
   a keying member mounted to the second portion of the hub in a rotationally fixed position, the keying member being rotationally fixed relative to the proximal housing, the keying member being engaged with the proximal housing so as to enable limited travel of the keying member relative to the proximal housing; and a spring mounted over the spring support portion of the hub, the spring abutting an interior spring stop defined by the proximal housing.

17. The fiber optic connector as claimed in claim 16, further comprising an anchor member mounted within the proximal housing, the anchor member being rotationally fixed relative to the proximal housing.

18. The fiber optic connector as claimed in claim 17, wherein the anchor member includes a tab that slides along a slot defined in the proximal housing.

19. The fiber optic connector as claimed in claim 16, further comprising a strain-relief boot that mounts to the proximal housing.

20. A fiber optic connector comprising:
a distal housing defining a proximal interior portion and a distal interior portion, the proximal interior portion defining a keyed region, the distal housing defining slots with proximal open ends;
a proximal housing having a proximal portion and a distal portion, the distal portion sized to fit within the proximal interior portion of the distal housing, the proximal housing including tabs that fit within the slots of the distal housing to retain the proximal housing at the distal housing;
a ferrule hub disposed within the proximal interior portion of the distal housing and within the distal portion of the proximal housing, the ferrule hub including a first keyed portion, a second portion, and a spring support portion, the first keyed portion mating with the keyed region of the distal housing;
a keying member mounted to the second portion of the hub in a rotationally fixed position, the keying member being rotationally fixed relative to the proximal housing, the keying member being engaged with the proximal housing so as to enable limited travel of the keying member relative to the proximal housing;
a spring mounted over the spring support portion of the hub, the spring abutting an interior spring stop defined by the proximal housing; and
an anchor member mounted within the proximal housing, the anchor member being rotationally fixed relative to the proximal housing.

* * * * *